United States Patent
Pottathil et al.

(10) Patent No.: US 12,544,442 B2
(45) Date of Patent: Feb. 10, 2026

(54) BIOCOMPATIBLE NANOMAGNETIC DISCS AND METHODS OF USE THEREOF

(71) Applicant: ACCUDX CORPORATION, La Jolla, CA (US)

(72) Inventors: Raveendran Pottathil, La Jolla, CA (US); Sanjay Deshmukh, Aurangabad (IN); Kiran Kharat, Aurangabad (IN)

(73) Assignee: ACCUDX CORPORATION, La Jolla, CA (US)

( * ) Notice: Subject to any disclaimer, the term of this patent is extended or adjusted under 35 U.S.C. 154(b) by 1191 days.

(21) Appl. No.: 17/290,200

(22) PCT Filed: Nov. 1, 2019

(86) PCT No.: PCT/US2019/059566
§ 371 (c)(1),
(2) Date: Apr. 29, 2021

(87) PCT Pub. No.: WO2020/093029
PCT Pub. Date: May 7, 2020

(65) Prior Publication Data
US 2022/0040303 A1   Feb. 10, 2022

Related U.S. Application Data

(60) Provisional application No. 62/754,519, filed on Nov. 1, 2018.

(51) Int. Cl.
*A61K 41/00* (2020.01)
*A61K 47/69* (2017.01)
(Continued)

(52) U.S. Cl.
CPC ...... *A61K 41/0052* (2013.01); *A61K 41/0023* (2013.01); *A61K 47/6929* (2017.08);
(Continued)

(58) Field of Classification Search
CPC ............ A61K 41/0052; A61K 41/0023; A61K 47/6929; A61K 33/24; A61K 47/6867;
(Continued)

(56) References Cited

U.S. PATENT DOCUMENTS

2002/0103517 A1* 8/2002 West .................. A61K 41/0052
607/94
2005/0113297 A1* 5/2005 Francois .............. A61K 47/544
514/6.9

(Continued)

FOREIGN PATENT DOCUMENTS

| EP | 2101842 A1 | 9/2009 | |
|---|---|---|---|
| WO | WO-2009029859 A2 * | 3/2009 | ............ B82Y 25/00 |
| WO | 2020093029 A1 | 5/2020 | |

OTHER PUBLICATIONS

Jordan, A., Scholz, R., Maier-Hauff, K., van Landeghem, F. K. H., Waldoefner, N., Teichgraeber, U., Pinkernelle, J., Bruhn, H., Neumann, F., Thiesen, B., von Deimling, A., & Felix, R. (2005). The effect of thermotherapy using magnetic nanoparticles on rat malignant glioma. Journal of Neuro-Oncology, (Year: 2005).*
(Continued)

*Primary Examiner* — Alex M Valvis
*Assistant Examiner* — Julie Thi Tran
(74) *Attorney, Agent, or Firm* — Mintz, Levin, Cohn, Ferris, Glovsky and Popeo, P.C.

(57) ABSTRACT

Provided herein are compositions including biocompatible magnetizeable nanoparticles. The nanoparticles have a diameter (average diameter) from about 10 to about 300 nanometers and are biocompatible and magnetic. The nanoparticles may be a disc formed from iron oxide. The disc may be conjugated to a target-binding moiety capable of binding a target. The target may be cancer cells, pathogens, fat cells, or atherosclerotic plaques.

14 Claims, 18 Drawing Sheets

(51) Int. Cl.
  *A61M 1/34*  (2006.01)
  *A61M 1/36*  (2006.01)
  *A61N 2/00*  (2006.01)
  *A61P 3/04*  (2006.01)
  *A61P 9/10*  (2006.01)
  *A61P 35/00*  (2006.01)
  *A61P 35/02*  (2006.01)
(52) U.S. Cl.
  CPC ........ *A61M 1/3486* (2014.02); *A61M 1/3618* (2014.02); *A61M 1/362* (2014.02); *A61N 2/002* (2013.01); *A61P 3/04* (2018.01); *A61P 9/10* (2018.01); *A61P 35/00* (2018.01); *A61P 35/02* (2018.01)
(58) Field of Classification Search
  CPC .. A61M 1/3486; A61M 1/3618; A61M 1/362; A61M 1/3679; A61M 1/36; A61N 2/002; A61P 3/04; A61P 9/10; A61P 35/00; A61P 35/02; H01F 1/0054; B82Y 5/00; B82Y 25/00
  See application file for complete search history.

(56) References Cited

U.S. PATENT DOCUMENTS

| | | | |
|---|---|---|---|
| 2007/0208400 A1* | 9/2007 | Nadkarni | A61P 9/10 977/915 |
| 2015/0306220 A1 | 10/2015 | Monsalve et al. | |

OTHER PUBLICATIONS

Jordan et al. (Nov. 29, 2005) "The Effect of Thermotherapy Using Magnetic Nanoparticles on Rat Malignant Glioma", Journal of Neuro-Oncology, 78(1):7-14 (Year: 2005).*

Yang et al. (Sep. 4, 2014) "Preparation of folic acid-conjugated, doxorubicinloaded, magnetic bovine serum albumin nanospheres and their antitumor effects in vitro and in vivo", International Journal of Nanomedicine, 9:4231-4243 (Year: 2014).*

Wikipedia Foundation. (Jan. 12, 2009). Nanoparticle. Wikipedia. https://en.wikipedia.org/wiki/Nanoparticle (Date accessed: Oct. 8, 2024) (Year: 2009).*

Xu, H., Aguilar, Z. P., Yang, L., Kuang, M., Duan, H., Xiong, Y., Wei, H., & Wang, A. (2011). Antibody conjugated magnetic iron oxide nanoparticles for cancer cell separation in fresh whole blood. Biomaterials, 32(36), 9758-9765. https://doi.org/10.1016/j.biomaterials. 2011.08.076 (Year: 2011).*

Denisov, I. G., & Sligar, S. G. (2016). Nanodiscs for structural and functional studies of membrane proteins. Nature Structural & Molecular Biology, 23(6), 481-486. https://doi.org/10.1038/nsmb. 3195 (Year: 2016).*

Extended European Search Report and Search Opinion for 19880510. 3, mailed on Oct. 26, 2023, 12 pages.

Xu et al. (Dec. 2011) "Antibody Conjugated Magnetic Iron Oxide Nanoparticles for Cancer Cell Separation in Fresh Whole Blood", Biomaterial, 32(36):9758-9765(16 pages).

Chen et al. (Sep. 20, 2009) "Triblock Copolymer Coated Iron Oxide Nanoparticle Conjugate for Tumor Integrin Targeting", Biomaterials, 30(36):6912-6919.

Jordan et al. (Nov. 29, 2005) "The Effect of Thermotherapy Using Magnetic Nanoparticles on Rat Malignant Glioma", Journal of Neuro-Oncology, 78(1):7-14.

Yang et al. (Dec. 17, 2014) "Orientation Mediated Enhancement on Magnetic Hyperthermia of Fe3O4 Nanodisc", Advanced Functional Materials, 25(5):812-820.

Yang et al. (Sep. 4, 2014) "Preparation of Folic Acid-Conjugated, Doxorubicin-Loaded, Magnetic Bovine Serum Albumin Nanospheres and their Antitumor Effects in Vitro and in Vivo", International Journal of Nanomedicine, 9:4231-4243.

* cited by examiner

| Min (nm) | Max (nm) | Mid (nm) | Mean(nm) | Rpv (nm) |
|---|---|---|---|---|
| 155.133 | 168.490 | 161.812 | 160.447 | 13.357 |

| Rq (nm) | Ra (nm) | Rz (nm) | Rsk | Rku |
|---|---|---|---|---|
| 3.750 | 3.297 | 5.732 | -0.209 | 1.894 |

| Min (nm) | Max (nm) | Mid (nm) | Mean(nm) | Rpv (nm) | Rq (nm) | Ra (nm) | Rz (nm) | Rsk | Rku |
|---|---|---|---|---|---|---|---|---|---|
| -25.861 | 37.119 | 5.829 | 0.000 | 62.981 | 14.551 | 12.119 | 45.365 | -0.226 | 2.346 |

FIG. 10

| Illustration of Probe Location | | | position measuring | |
|---|---|---|---|---|
| | ////// | | 3 //////////// 2 | |
| | T-TOP | | | |
| | C-CENTRE | | 5 | |
| | B-BOTTOM | | | |
| | ////// | | 4 //////////// 1 | |

BIOCOMPATIBLE NANOMAGNETIC DISCS AND METHODS OF USE THEREOF

CROSS-REFERENCE TO RELATED APPLICATION

This application claims priority to U.S. Provisional Application Ser. No. 62/754,519 filed on Nov. 1, 2018. The Provisional Application is incorporated by reference in its entirety.

TECHNICAL FIELD

Compositions and methods provided herein relate to nanotechnology and medical uses thereof.

BACKGROUND

Molecularly targeted therapy has emerged as a promising approach to overcome the lack of specificity of conventional agents in the treatment of a number of medical conditions. For instance, chemotherapeutic agents for the treatment of cancer, cardiovascular drugs for the treatment of atherosclerotic plaques, antibiotics for bacterial infections, and cosmetic procedures to remove fat all suffer from a variety of limitations. There is a pressing need for a novel approach to address these medical conditions in a way that limits deleterious side-affects and improves efficacy.

SUMMARY

In an aspect, provided herein are compositions including biocompatible magnetizeable nanoparticles. The nanoparticles are formed from iron oxide ($Fe_3O_4$ or $Fe_2O_3$). The nanoparticles have a diameter of about 10 to about 300 nanometers and are biocompatible and magnetizeable. The nanoparticles may be disc-shaped. The nanoparticles may be conjugated to a target binding agent capable of binding a target. The target may be cancer cells, pathogens, fat cells, or atherosclerotic plaques. The target binding agent may be an antibody or an aptamer.

In an aspect, provided herein are methods of manufacturing biocompatible magnetizeable nanoparticles including (i) combining iron oxide powder with water, a biocompatible agent, and a buffer until an immiscible solution of $Fe_2O_3$ is formed; (ii) adjusting pH to about 10; (iii) adding a target-binding moiety under conditions sufficient for the target-binding moiety to conjugate to the nanoparticle and to form a solution comprising nanoparticles conjugated to target-binding moiety; and (iv) spray drying the solution to form nanoparticles with a diameter of about 10 to about 300 nanometers. The biocompatible agent may be casein or bovine serum albumin.

In an aspect, provided herein are methods of treating a subject with a disease condition. The method includes administering to a subject with a disease condition an effective amount of a composition that includes a magnetizeable nanoparticle and exposing the subject to an energy source for a time period sufficient to allow the magnetizeable nanoparticle to move in a manner that causes disruption, apoptosis, and/or ablation of the target. The nanoparticles have a diameter of about 10 to about 300 nanometers. The nanoparticles may be disc-shaped and formed from iron oxide ($Fe_3O_4$ or $Fe_2O_3$). The nanoparticles may be conjugated to a biocompatible agent. The nanoparticles may be conjugated to a target-binding moiety that binds a target. The disease condition may be cancer, bacterial infection, viral infection, obesity and/or fat accumulation, or atherosclerotic plaque. The target may be the causative agent of the disease. The target may be, for example and without limitation, cancer cells, fat cells, pathogens, or atherosclerotic plaques. The target binding moiety may be an antibody or an aptamer.

In an aspect, provided herein are methods of treating a disease lesion in a subject having a lesion associated with a disease or condition, including intravenously administering to the subject a composition comprising a nanoparticle conjugated to a biocompatible agent and/or a target-binding moiety; and after administering the conjugate, exposing the lesion to an energy sufficient to cause the nanoparticles to cause disruption, apoptosis, and/or ablation. The energy may include variable force, variable frequency magnetic field, where the variable field has a force (amplitude) of about 1 Gauss to about 300 Gauss and the variable frequency has a range of about 1 to about 500 Hz.

In an aspect, provided here in are methods of treating a subject that include administering ex vivo hemofiltration, and/or hemo-separation. The methods include administering ex vivo hemofiltration to the subject where blood is removed from the subject and passed through a device, incubating the blood or plasma with the matrix for a sufficient time to allow binding of magnetizeable nanoparticles to a target cell, where the nanoparticles are conjugated to target binding moiety; exposing the device to an energy source for a time period sufficient to allow the magnetizeable nanoparticles to move in a manner that causes disruption, apoptosis, and/or ablation of the target; and returning blood to said subject, wherein the blood is at least 80% free of target cells. The device includes (1) a filtration chamber configured to receive blood or plasma comprising target cells, and (2) a matrix comprising magnetizeable nanoparticles disposed within said device. The magnetizeable nanoparticles have a diameter of about 10 to about 300 nanometers, comprise iron oxide, and are conjugated to a target-binding moiety capable of binding target. The target-binding moiety may be selected from antibodies, aptamers, and fusion proteins.

In an aspect, provided herein is a device that includes a chamber configured to receive blood or plasma including target cells, a matrix disposed within the chamber, and is configured to remove target cells from blood or plasma. The target cells may be cancer cells or pathogens. The matrix includes magnetizeable nanoparticles that have a diameter of about 10 to about 300 nanometers, comprises iron oxide, and is conjugated to a target-binding moiety capable of binding target. The target-binding moiety may be selected from antibodies, aptamers, and fusion, proteins.

BRIEF DESCRIPTION OF THE DRAWINGS

FIG. 2A is a picture of the ElectroSpray platform system. FIG. 2B illustrates the production of nanodiscs using a shims with nanodisc indentations. A solution of iron oxide particles, biocompatible agent such as casein or bovine serum albumin, and a target-binding moiety is deposited onto the shim using the electrospray system as in FIG. 2A. These may then be lifted off or removed from the shim to produce nanodisc with a diameters of 10-300 nm. FIG. 2C is a picture of the Taylor cone produced during nanoparticle production.

FIG. 3A is a scanning electron micrograph of the nanodiscs. FIGS. 3B-F are various graphs and measurements showing the nanoparticle size distribution of about 80 to 120 nm.

FIG. 4A is a scanning electron micrograph of the nanodiscs. FIGS. 4B-F are various graphs and measurements showing an average nanoparticle size of 22 nm.

FIG. 6A shows cells treated with BMND conjugated to anti-HL-60 antibody and exposed to magnetic field (10 min) 10 Htz, 90 Guass. FIG. 6B shows cells treated with BMND conjugated to anti-HL-60 antibody and exposed to magnetic field (5 min) 10 Htz, 90 Guass. FIG. 6C show untreated control. Green cells represent apoptotic cells/dead cells (circled for clarity) and red cells represent cells with intact mitochondrial membrane.

FIG. 7A is control HL60 cells incubated with BMND conjugated to HL-60 antibody, no magnetic field exposure, and treated with secondary FITC-labelled antibody and flow cytometry separated. FIG. 7B is control blood sample with no HL60 cells spiked in, incubated with BMND conjugated to HL-60 antibody, no magnetic field exposure, and treated with secondary FITC-labelled antibody and flow cytometry separated. FIG. 7C is blood without red blood cells, spiked with HL60 cells, incubated with BMND conjugated to HL-60 antibody, magnetic field exposure, and treated with secondary FITC-labelled antibody and flow cytometry separated. FIG. 7D is blood without red blood cells, spiked with HL60 cells, incubated with BMND conjugated to HL-60 antibody, no magnetic field exposure, and treated with secondary FITC-labelled antibody and flow cytometry separated. FIG. 7E is the results from a sample of blood without red blood cells, spiked with HL60 cells, diluted $10^{-2}$, and then treated as in FIG. 7D. FIG. 7F is the results from a sample of blood without red blood cells, spiked with HL60 cells, diluted $10^{-3}$, and then treated as in FIG. 7D.

FIG. 8A is a representative tumor histogram from the positive control group. FIG. 8B is a representative tumor histogram from the negative control group. FIG. 8C is a representative tumor histogram from the paclitaxel treated group. FIG. 8D is a representative tumor histogram from the test group treated with 100 µg/kg body weigh of biocompatible magnetizeable nanodiscs conjugated to antibody that recognizes the tumor. FIG. 8E is a representative tumor histogram from the test group treated with 200 µg/kg body weigh of biocompatible magnetizeable nanodiscs conjugated to antibody that recognizes the tumor. FIG. 8F is a representative tumor histogram from the test group treated with 100 µg/kg body weigh of biocompatible magnetizeable nanodiscs conjugated to antibody that recognizes the tumor.

FIG. 10 is a diagram of test points. The chamber was divided in three planes, Top, Middle and Bottom and five points. Four corners and one middle point of each plane were selected, thus 15 points were used for measuring field strength within the chamber.

DETAILED DESCRIPTION

Definitions

Figure 1:
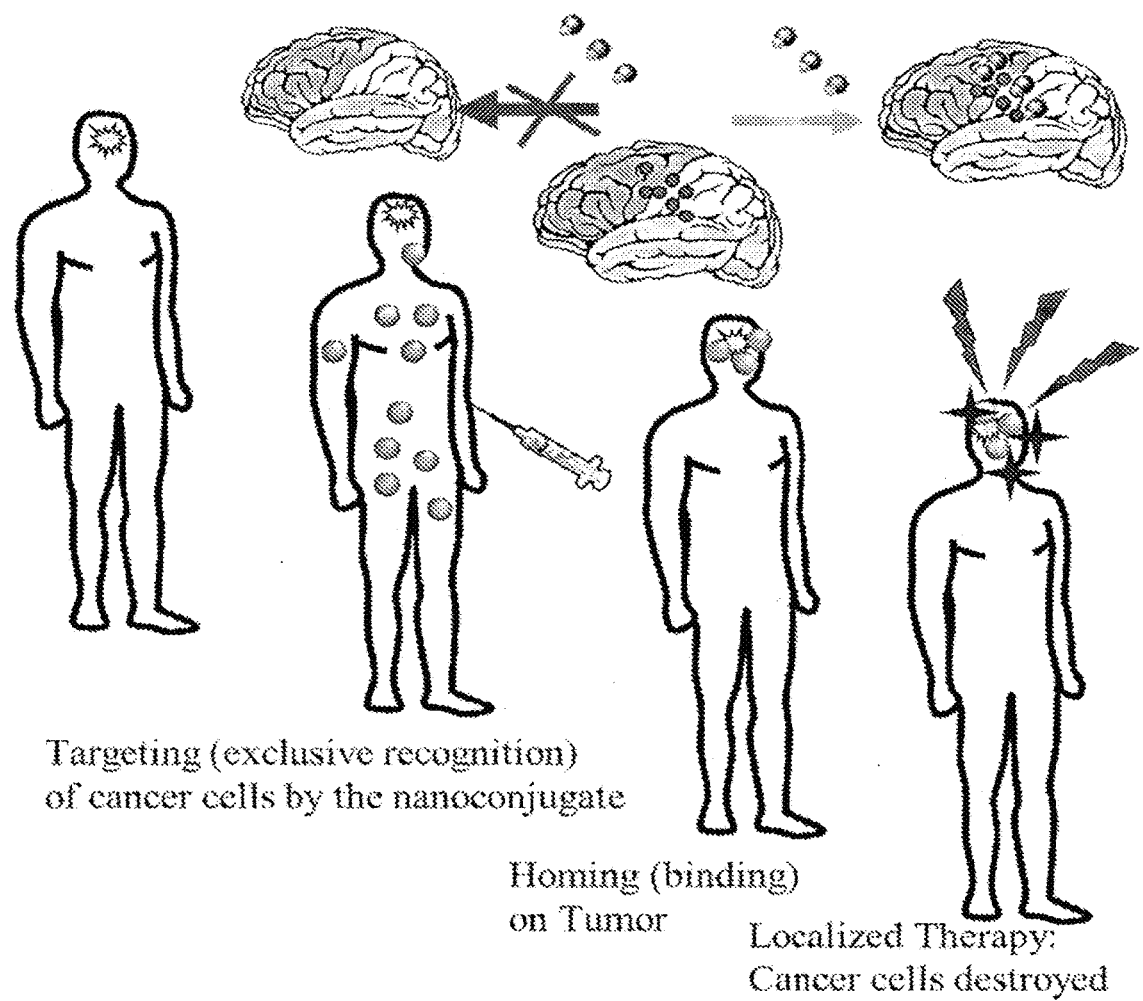
FIG. 1 is a pictorial of targeted cancer therapy using biocompatible magnetizeable nanoparticles as described herein.
Figure 2A:
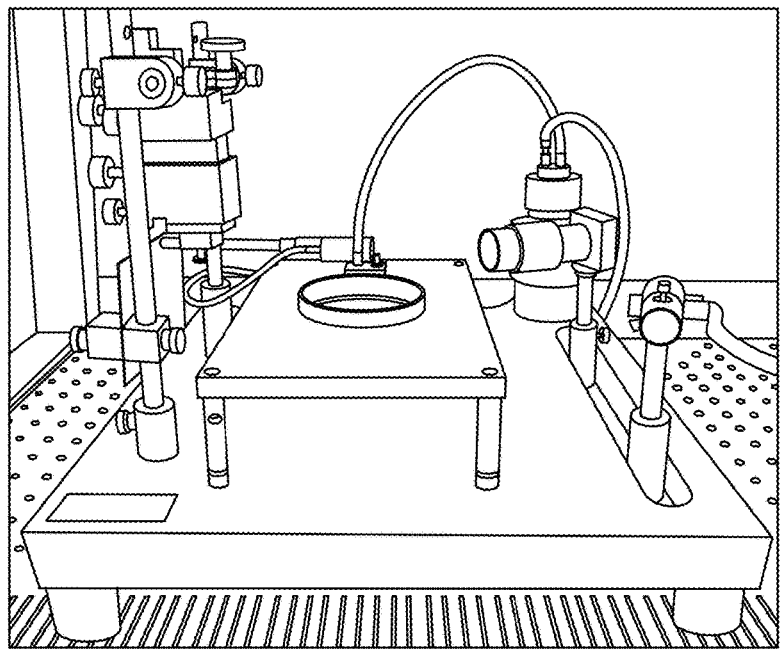
FIGS. 2A-C illustrates the method of manufacture of nanoparticles described herein.
Figure 2B:
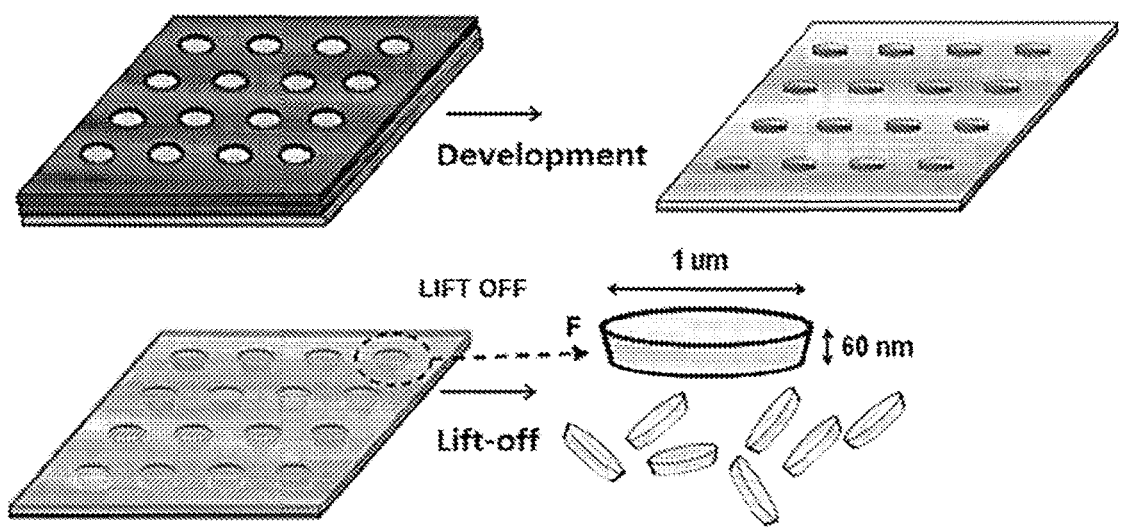
Figure 2C:
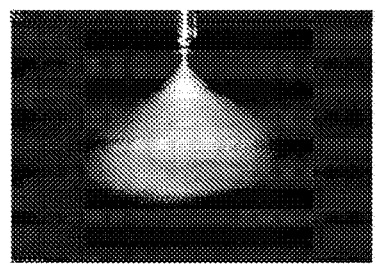
Figure 3A:
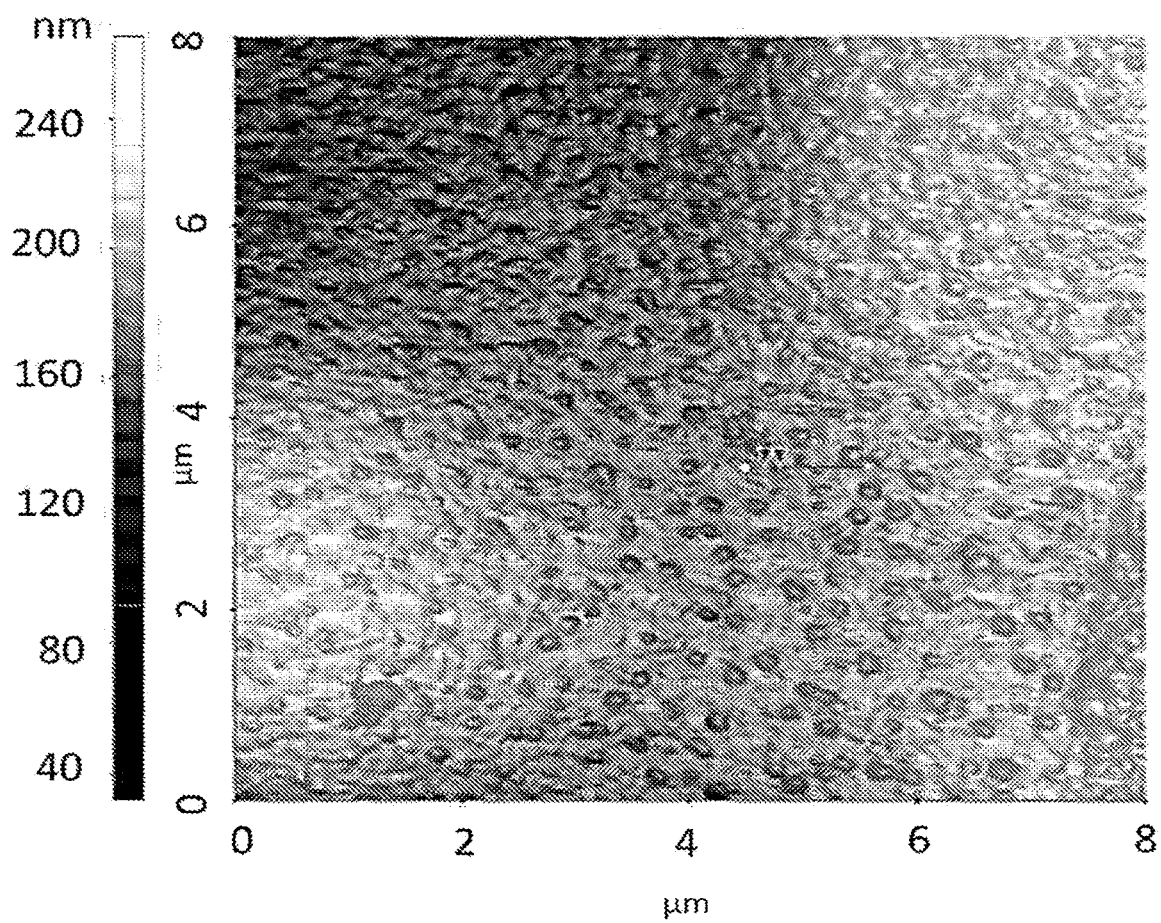
FIGS. 3A-3F shows the diameter/size range of nanoparticles produced by the methods described herein. These nanodiscs comprise IgG antibody and casein.
Figure 3B:
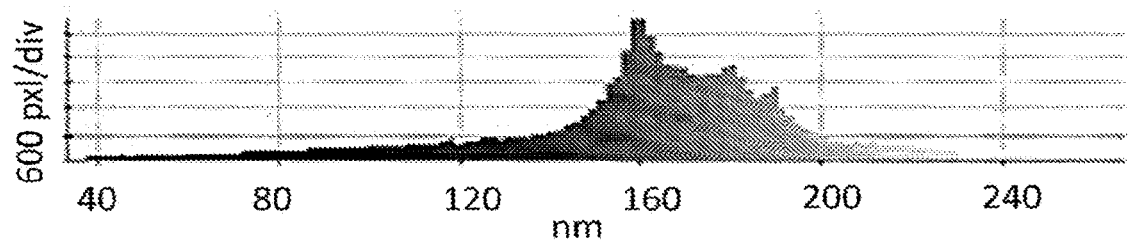
Figure 3C:
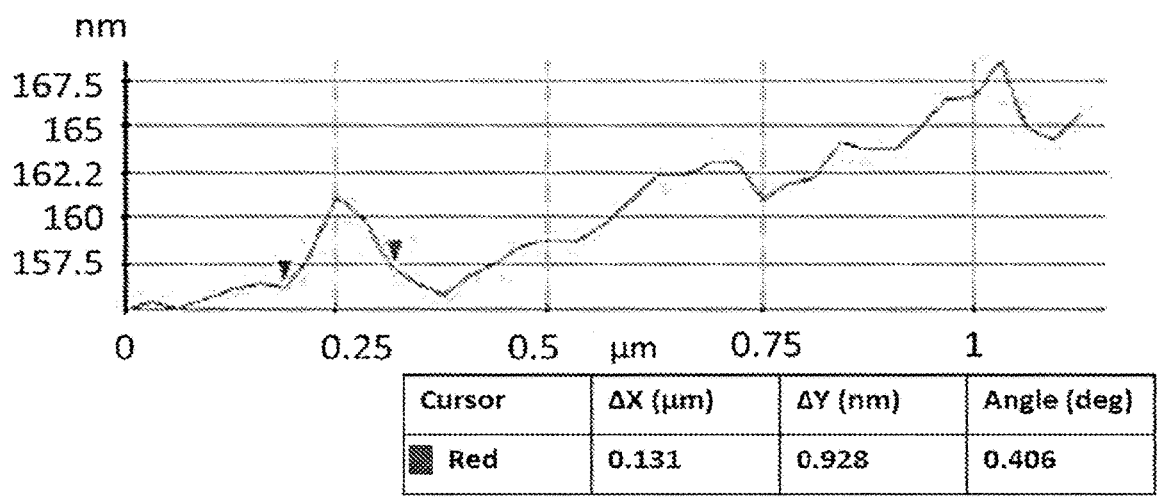
Figure 3D:
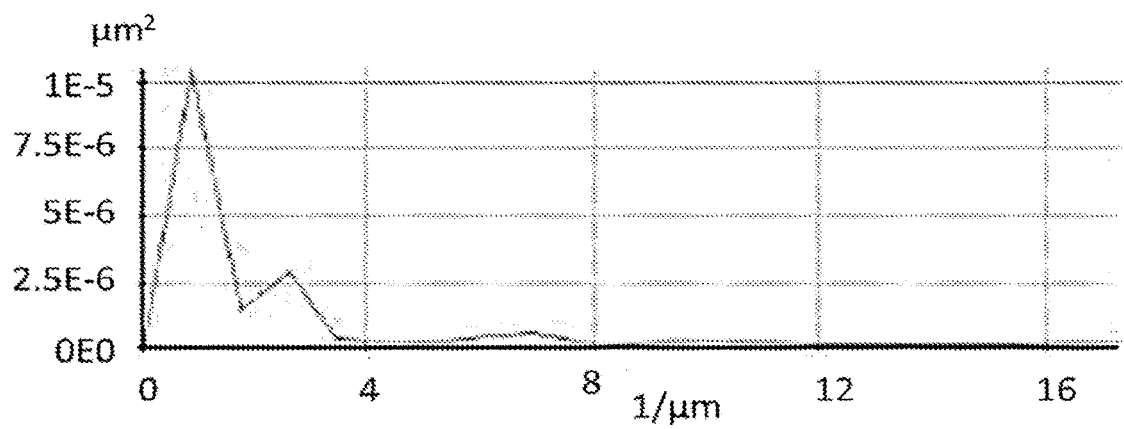
Figures 3E, 3F:
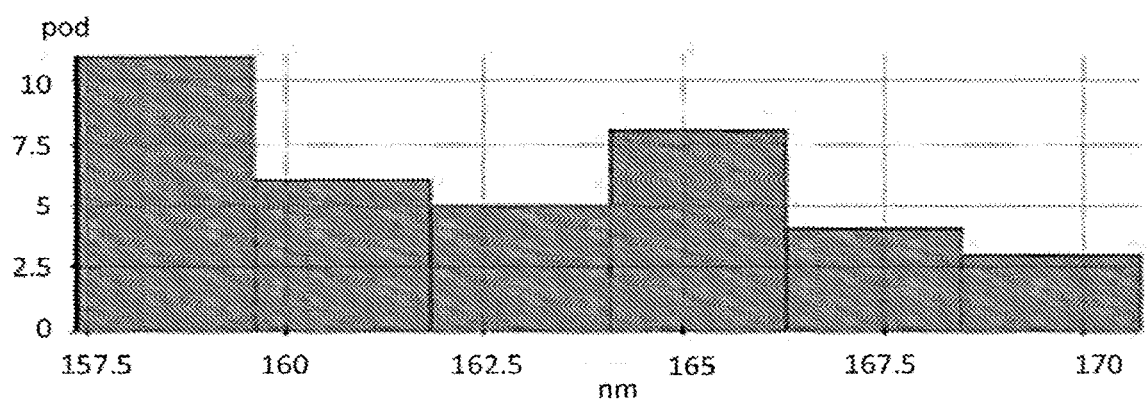
Figure 4A:
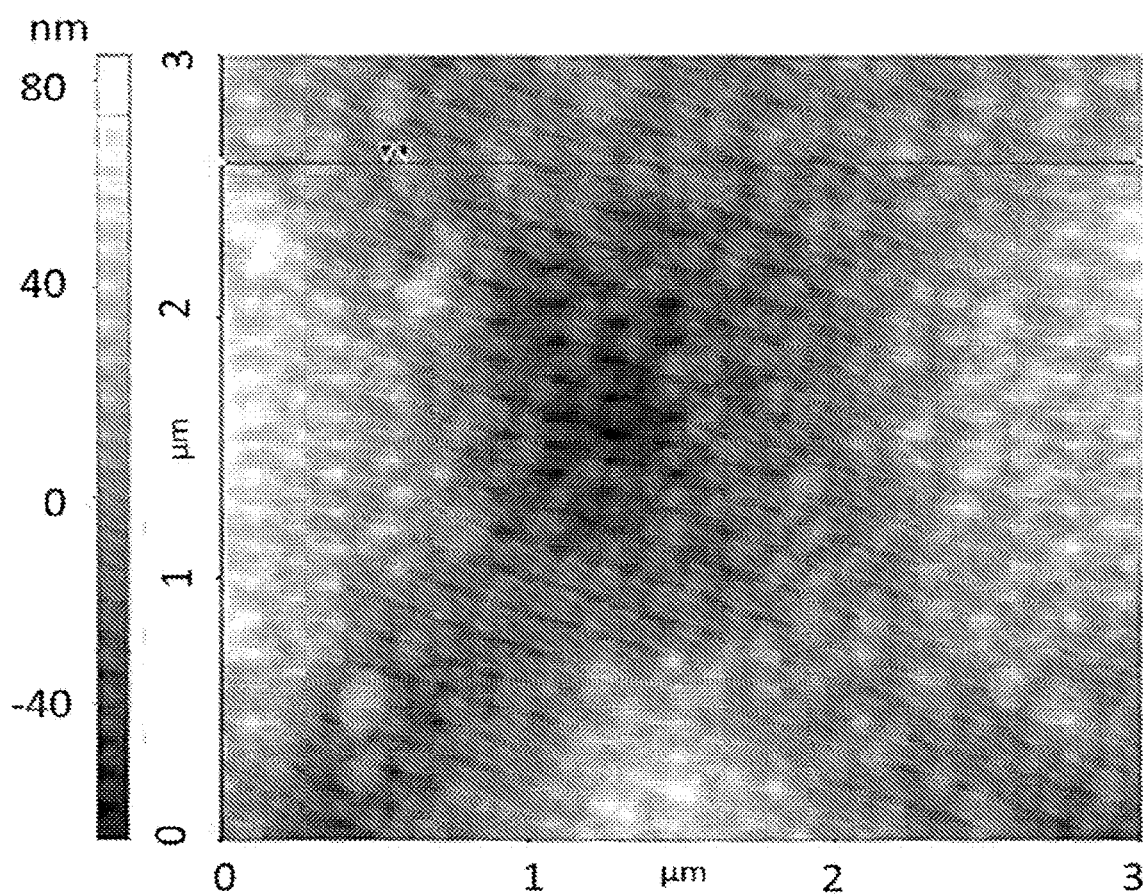
FIGS. 4A-F shows the diameter/size range of nanoparticles produced by the methods described herein. These nanodiscs comprise IPO-M6 (an HL-60 cell antibody) and bovine serum albumin.
Figure 4B:
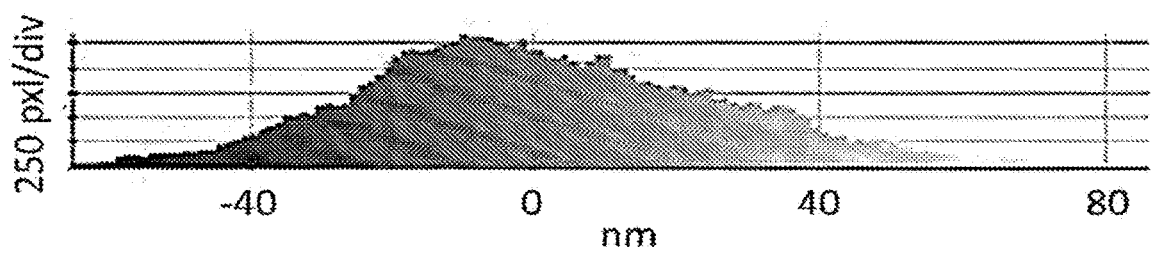
Figure 4C:
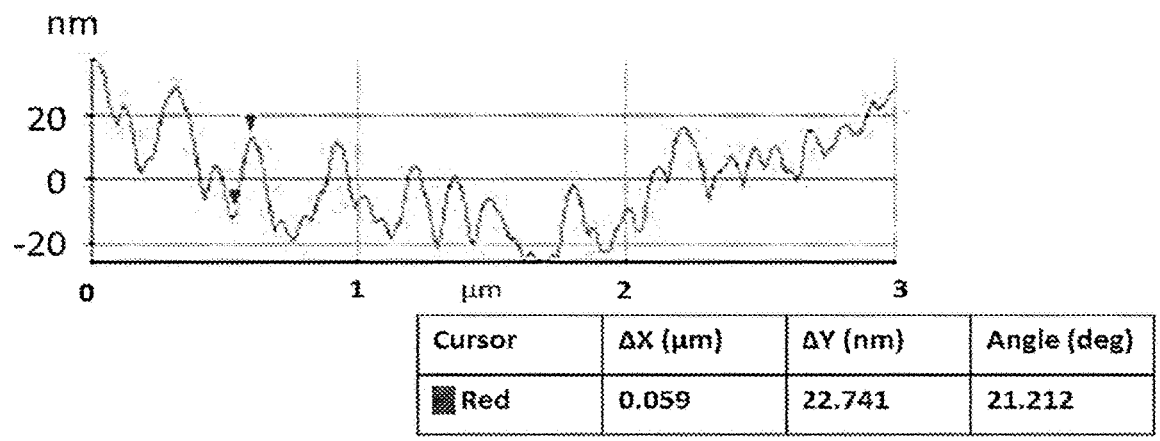
Figure 4D:
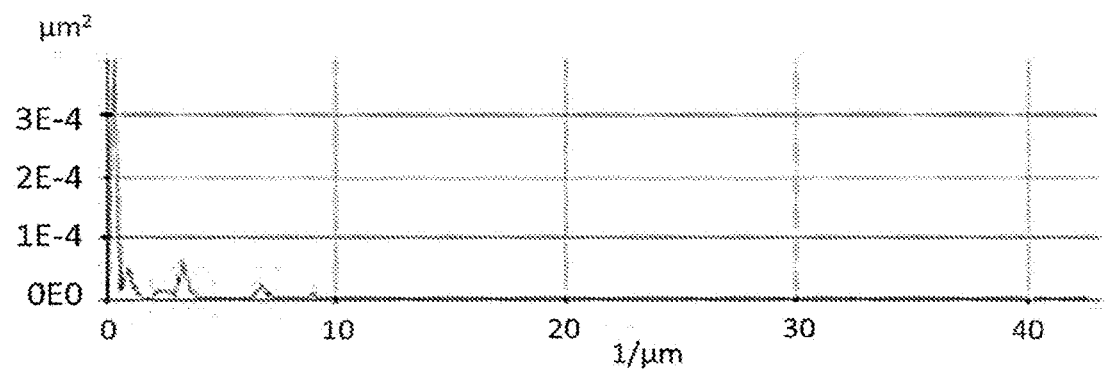
Figure 4E:
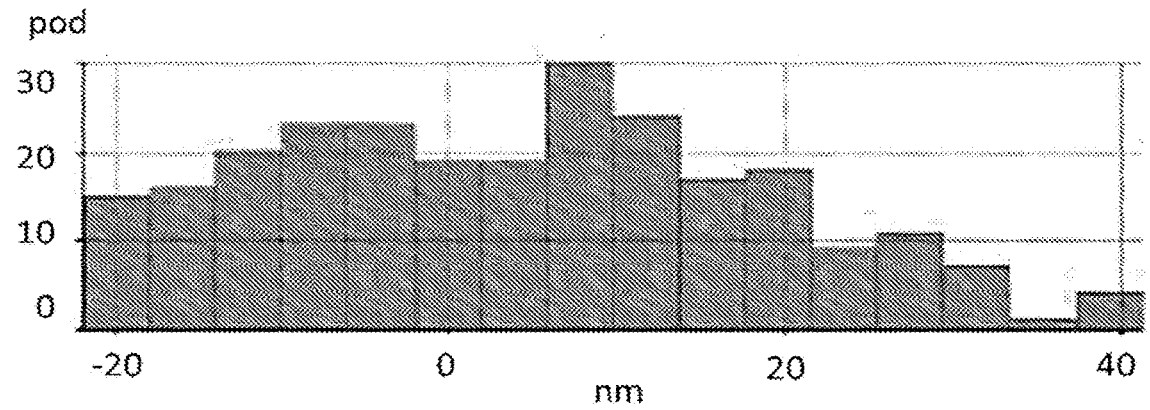
Figure 4F:
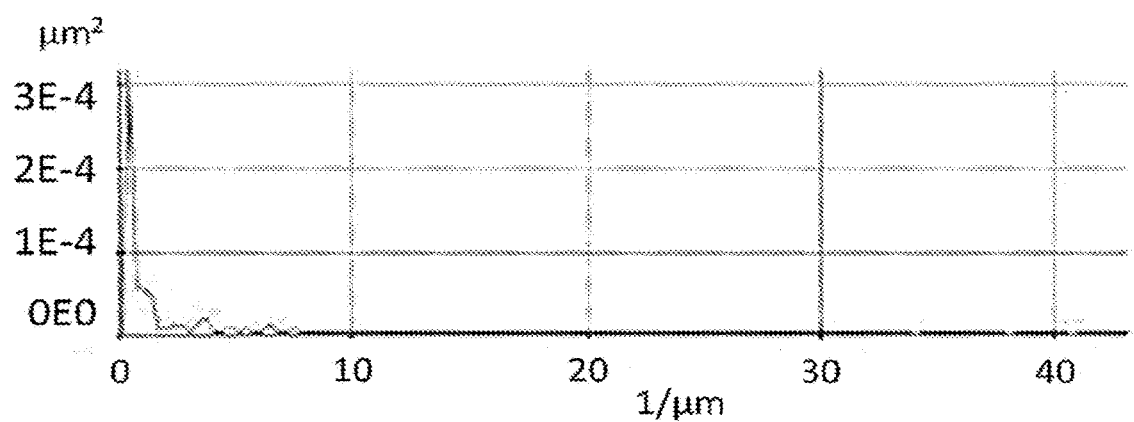
Figure 5:
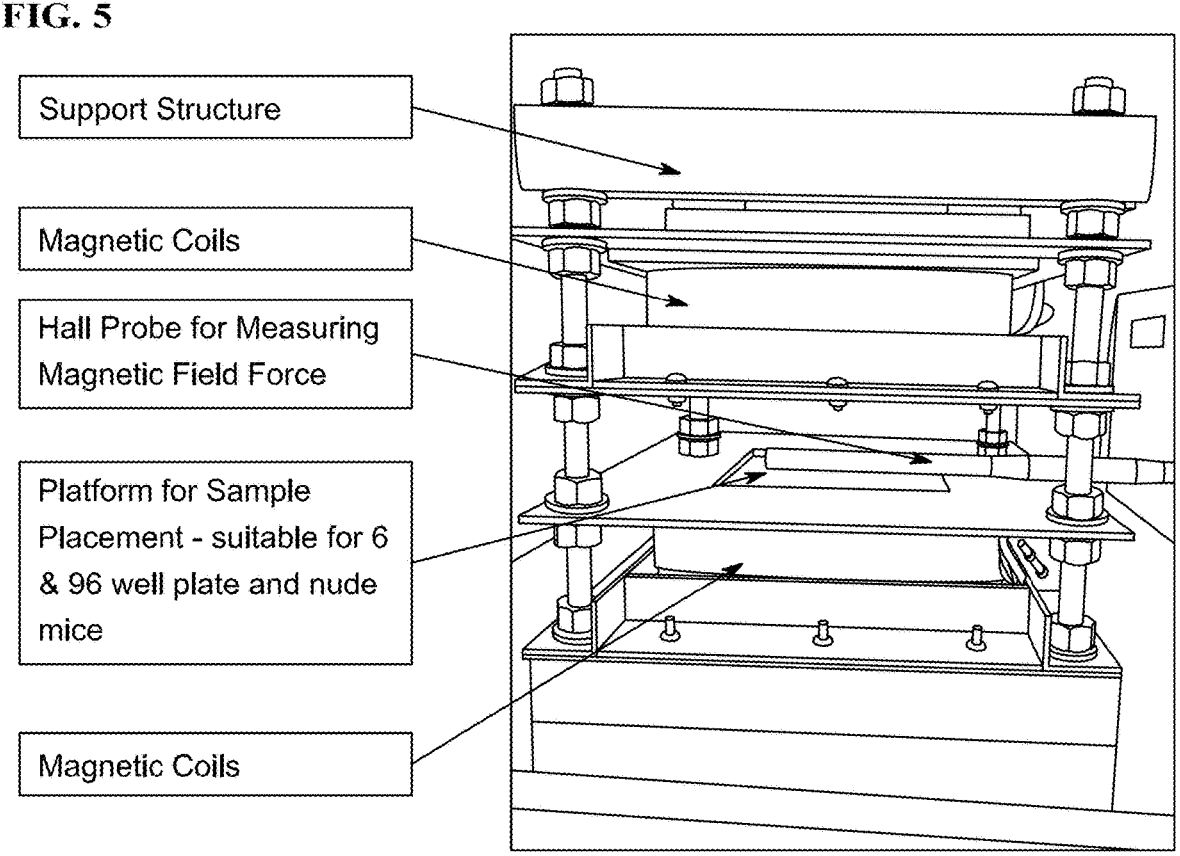
FIG. 5 depicts the magnetic oscillation device used for lab scale experiments described herein. The sample loading and treatment station is shown for in vitro, ex vivo, and in vivo methods utilizing this magnetic oscillation device. This platform is between two sets of magnetic coils capable of producting the variable force variable frequency magnetic field.

The practice of the technology will employ, unless indicated specifically to the contrary, conventional methods of chemistry, biochemistry, organic chemistry, molecular biology, microbiology, recombinant DNA techniques, genetics, immunology, and cell biology that are within the skill of the art, many of which are described below for the purpose of illustration. Such techniques are explained fully in the literature. [1-10].

All patents, patent applications, articles and publications mentioned herein, both supra, and infra, are hereby expressly incorporated herein by reference in their entireties.

Unless defined otherwise herein, all technical and scientific terms used herein have the same meaning as commonly understood by one of ordinary skill in the art to which this disclosure belongs. Various scientific dictionaries that include the terms included herein are well known and available to those in the art. Although any methods and materials similar or equivalent to those described herein find use in the practice or testing of the disclosure, some preferred methods and materials are described. Accordingly, the terms defined immediately below are more fully described by reference to the specification as a whole. It is to be understood that this disclosure is not limited to the particular methodology, protocols, and reagents described, as these may vary, depending upon the context in which they are used by those of skill in the art.

As used herein, the singular terms "a", "an", and "the" include the plural reference unless the context clearly indicates otherwise.

Reference throughout this specification to, for example, "one embodiment", "an embodiment", "another embodiment", "a particular embodiment", "a related embodiment", "a certain embodiment", "an additional embodiment", or "a further embodiment" or combinations thereof means that a particular feature, structure or characteristic described in connection with the embodiment is included in at least one embodiment of the present disclosure. Thus, the appearances of the foregoing phrases in various places throughout this specification are not necessarily all referring to the same embodiment. Furthermore, the particular features, structures, or characteristics may be combined in any suitable manner in one or more embodiments.

As used herein, the term "about" or "approximately" refers to a quantity, level, value, number, frequency, percentage, dimension, size, amount, weight or length that varies by as much as 30, 25, 20, 25, 10, 9, 8, 7, 6, 5, 4, 3, 2, or 1% to a reference quantity, level, value, concentration, measurement, number, frequency, percentage, dimension, size, amount, weight or length. In particular embodiments, the terms "about" or "approximately" when preceding a numerical value indicates the value plus or minus a range of 15%, 10%, 5%, or 1%.

Throughout this specification, unless the context requires otherwise, the words "comprise", "comprises" and "comprising" will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that no other elements are optional and may or may not be present depending upon whether or not they affect the activity or action of the listed elements.

A "nanoparticle," as used herein, is a particle wherein the longest diameter is less than or equal to 1000 nanometers. In embodiments, the nanoparticle has the shape of a disc, sphere, rod, cube, triangular, hexagonal, cylinder, spherocylinder, or ellipsoid. The longest dimension of the nanoparticle may be referred to herein as the length of the nanoparticle. The shortest dimension of the nanoparticle may be referred to herein refer as the width of the nanoparticle. The nanoparticle may have a diameter. For disc shaped nanoparticles, the diameter as used herein refers to the length of the disc from end to end. The impact of particle morphology is intertwined with many physiochemical parameters such as size, elasticity, surface chemistry, and biopersistence. Nanoparticles as described herein may be composed of any appropriate material. For example, nanoparticle cores may include appropriate metals and metal oxides thereof (e.g., a metal nanoparticle core), carbon (e.g., an organic nanoparticle core) silicon and oxides thereof (e.g., a silicon nanoparticle core) or boron and oxides thereof (e.g., a boron nanoparticle core), or mixtures thereof. In embodiments, the nanoparticle has a diameter of about 10 to about 1000 nanometers, about 100 to about 900 nanometers, from about 200 to about 800 nanometers, from about 300 to about 700 nanometers, or from 400 to about 600 nanometers. In some embodiments, the nanoparticle has a diameter of about 10 to about 300 nanometers. In some embodiments, the nanoparticle has a diameter of about 30 to about 150 nanometers. In some embodiments, the nanoparticle has a diameter of about 40 to about 70 nanometers. In some embodiments, the nanoparticle is a disc shaped particle, referred to as a nanodisc.

An "inorganic nanoparticle" refers to a nanoparticle that does not contain carbon. For example, an inorganic nanoparticle may contain a metal or metal oxide thereof (e.g., gold nanoparticle, iron nanoparticle), silicon and oxides thereof (e.g., a silica nanoparticle), or titanium and oxides thereof (e.g., titanium dioxide nanoparticle). In embodiments, the inorganic nanoparticle is a silica nanoparticle. In embodiments, the inorganic nanoparticle is a metal nanoparticle. In embodiments, the metal nanoparticle comprises a titanium, zirconium, gold, silver, platinum, cerium, arsenic, iron, aluminum or silicon. In embodiments, the metal nanoparticle comprises iron, titanium, zirconium, gold, silver, or platinum and appropriate metal oxides thereof. In embodiments, the nanoparticle is iron oxide, titanium oxide, zirconium oxide, cerium oxide, arsenic oxide, iron oxide, aluminum oxide, or silicon oxide. In embodiments, the metal oxide nanoparticle is titanium oxide or zirconium oxide. In embodiments, the nanoparticle is ferric oxide (iron oxide). In embodiments, the metal nanoparticle is an iron nanoparticle. In embodiments, the inorganic nanoparticle further includes a moiety that contains carbon.

Nanoparticles described herein may be "magnetic" or "magnetizeable." The terms "magnetic" and "magnetizeable" are used interchangeably. The term "magnetic nanoparticle", "magnetizable nanoparticle", "magnetic nanodisc", and "magnetizable nanodisc" are used interchangeably herein. Magnetic nanoparticles are a class of nanoparticle that can be manipulated using magnetic fields. Such particles commonly consist of two components, a magnetic material, often iron, nickel and/or cobalt, and a chemical component that has functionality. Magnetic nanoparticle clusters that are composed of a number of individual, magnetic nanoparticles are known as magnetic nanobeads with a diameter of 50-200 nanometers. In embodiments described herein, the magnetizeable nanoparticle is an iron oxide nanoparticle. In embodiments described herein, the magnetizeable nanoparticle is an iron oxide nanodisc. In embodiments described herein, the magnetizeable nanoparticle is an iron oxide nanoparticle with a diameter of about 10 to about 300 nanometers. In embodiments described herein, the magnetizeable nanoparticle is an iron oxide nanoparticle with a diameter of about 20 to about 150 nanometers. In embodiments described herein, the magnetizeable nanoparticle is an iron oxide nanoparticle with a diameter of about 40 to about 70 nanometers. In embodiments described herein, the magnetizeable nanoparticle is an iron oxide nanodisc. In embodiments described herein, the magnetizeable nanoparticle is an iron oxide nanodisc with a diameter of about 10 to about 300 nanometers. In embodiments described herein, the magnetizeable nanoparticle is an iron oxide nanodisc with a diameter of about 20 to about 150 nanometers. In embodiments described herein, the magnetizeable nanoparticle is an iron oxide nanodisc with a diameter of about 40 to about 70 nanometers.

Ferrite nanoparticles or iron oxide nanoparticles (iron oxides in crystal structure of maghemite or magnetite) are disclosed herein. Once ferrite particles become smaller than about 128 nm, they become superparamagnetic which prevents self-agglomeration since they exhibit their magnetic behavior only when an external magnetic field is applied. The magnetic moment of ferrite nanoparticles can be greatly increased by controlled clustering of a number of individual superparamagnetic nanoparticles into superparamagnetic nanoparticle clusters, namely magnetic nanobeads. With the external magnetic field switched off, the remanence falls back to zero. Just like non-magnetic oxide nanoparticles, the surface of ferrite nanoparticles may be modified by surfactants, silica, silicones or phosphoric acid derivatives to increase their stability in solution. The surface of a maghemite or magnetite magnetic nanoparticle is relatively inert and does not usually allow strong covalent bonds with functionalization molecules. However, the reactivity of the magnetic nanoparticles can be improved by coating a layer of biocompatible compound onto their surface. The biocompatible agent may be casein. The biocompatible agent may be bovine serum albumin (BSA). The biocompatible agent can be easily modified with various surface functional groups via covalent bonds between organo-silane molecules and the agent. Ferrite nanoparticle clusters with narrow size distribution consisting of superparamagnetic oxide nanoparticles (~80 maghemite superparamagnetic nanoparticles per bead) conjugated to a biocompatible agent have several advantages over metallic nanoparticles: higher chemical stability (important for biomedical applications), narrow size distribution (important for biomedical applications), higher colloidal stability since they do not magnetically agglomerate, magnetic moment can be tuned with the nanoparticle cluster size, retained superparamagnetic properties (independent of the nanoparticle cluster size), and sbiocompatible surface enables straightforward covalent functionalization. In embodiments described herein, the biocompatible compound onto their surface of magnetizeable nanoparticle comprises casein. In embodiments described herein, the biocompatible compound onto their surface of magnetizeable nanoparticle comprises bovine serum albumin.

As used herein, the term "magnetic field" refers to a vector field that describes the magnetic influence of electric charges in relative motion and magnetized materials. The effects of magnetic fields are commonly seen in permanent magnets, which pull on magnetic materials (such as iron) and attract or repel other magnets. Magnetic fields surround and are created by magnetized material and by moving electric charges (electric currents) such as those used in electromagnets. They exert forces on nearby moving electrical charges and torques on nearby magnets. In addition, a magnetic field that varies with location exerts a force on magnetic materials. Both the strength and direction of a magnetic field vary with location. As such, it is described mathematically as a vector field. In electromagnetics, the term "magnetic field" is used for two distinct but closely related fields denoted by the symbols B and H. In the International System of Units, H, magnetic field strength, is measured in the SI base units of ampere per meter B, magnetic flux density, is measured in tesla (in SI base units: kilogram per second$^2$ per ampere), which is equivalent to newton per meter per ampere. H and B differ in how they account for magnetization. In a vacuum, B and H are the same aside from units; but in a magnetized material, $B/\mu_0$ and H differ by the magnetization M of the material at that point in the material. Magnetic fields are produced by moving electric charges and the intrinsic magnetic moments of elementary particles associated with a fundamental quantum property, their spin. Magnetic fields and electric fields are interrelated.

Superparamagnetism is a form of magnetism which appears in small ferromagnetic or ferrimagnetic nanoparticles. In sufficiently small nanoparticles, magnetization can randomly flip direction under the influence of temperature. The typical time between two flips is called the Néel relaxation time. In the absence of an external magnetic field, when the time used to measure the magnetization of the nanoparticles is much longer than the Néel relaxation time, their magnetization appears to be in average zero; they are said to be in the superparamagnetic state. In this state, an external magnetic field is able to magnetize the nanoparticles, similarly to a paramagnet. However, their magnetic susceptibility is much larger than that of paramagnets. When an external magnetic field H is applied to an assembly of superparamagnetic nanoparticles, their magnetic moments tend to align along the applied field, leading to a net magnetization. The magnetization curve of the assembly, i.e. the magnetization as a function of the applied field, is a reversible S-shaped increasing function.

As used herein, the terms "variable force variable frequency" or "variable strength variable frequency" magnetic field refer to a magnetic field that is adjustable in strength and/or frequency by a device. In embodiments, provided herein is a device is capable of varying the force (strength or amplitude), frequency, or combination thereof of a magnetic field.

As used herein, the term "atomic force microscopy" or "AFM" refers to a type of scanning probe microscopy (SPM), with demonstrated resolution on the order of fractions of a nanometer, more than 1000 times better than the optical diffraction limit. The information is gathered by "feeling" or "touching" the surface with a mechanical probe. Piezoelectric elements that facilitate tiny but accurate and precise movements on (electronic) command enable precise scanning.

As used herein, the term "casein" is used according to its plain and ordinary meaning and refers to a family of related phosphoproteins (αS1, αS2, β, κ). These proteins are commonly found in mammalian milk. Casein contains a high number of proline residues, which do not interact. There are also no disulfide bridges. As a result, it has relatively little tertiary structure. It is relatively hydrophobic, making it poorly soluble in water. It is found in milk as a suspension of particles, called casein micelles, which show only limited resemblance with surfactant-type micelles in a sense that the hydrophilic parts reside at the surface and they are spherical. However, in sharp contrast to surfactant micelles, the interior of a casein micelle is highly hydrated. The caseins in the micelles are held together by calcium ions and hydrophobic interactions. The isoelectric point of casein is 4.6. The purified protein is water-insoluble. While it is also insoluble in neutral salt solutions, it is readily dispersible in dilute alkalis and in salt solutions such as aqueous sodium oxalate and sodium acetate.

As used herein the terms "bovine serum albumin, "BSA" and "Fraction V" refer to a serum albumin protein derived from cows. BSA is a small, stable, moderately non-reactive protein with numerous biochemical applications.

As used herein, the term "target" refers to a cell or molecule or region of interest to which a binding moiety is capable of attaching. In embodiments, a target is a cell. In embodiments, the target is a cancer cell or fat cell (also referred to as an adipocyte). In embodiments, the target is a pathogen such as a virus or bacteria. In embodiments, the target is an atherosclerotic plaque or portion thereof.

As used herein, the term "target-binding moiety" refers to a compound or entity capable of binding a target. In embodiments, a target binding moiety is selected from an antibody, aptamer, lectin, and fusion protein. In embodiments, the target-binding moiety is conjugated to the magnetizeable nanoparticle. Methods of conjugating nanoparticles are known to those of skill in the art. In embodiments, an antibody capable of binding a target is conjugated to the magnetizeable nanoparticle. In embodiments, an aptamer capable of binding a target is conjugated to the nanoparticle.

As used herein, the term "electrospray" refers to an apparatus that employs electricity to disperse a liquid or for the fine aerosol resulting from this process. High voltage is applied to a liquid supplied through an emitter (usually a glass or metallic capillary). Ideally the liquid reaching the emitter tip forms a Taylor cone, which emits a liquid jet through its apex. Varicose waves on the surface of the jet lead to the formation of small and highly charged liquid droplets, which are radially dispersed due to Coulomb repulsion. Electrospray may be used in nanotechnology, for example to deposit single particles on surfaces. This is done by spraying colloids on average containing only one particle per droplet. The solvent evaporates, leaving an aerosol stream of single particles of the desired type. The ionizing property of the process is not crucial for the application but may be used in electrostatic precipitation of the particles. Instead of depositing nanoparticles, nanoparticles and nano structures can also fabricated in situ by depositing metal ions to desired locations. Electrochemical reduction of ions to atoms and in situ assembly was believed to be the mechanism of nano structure formation.

As used herein, the terms "disease" or "condition" refer to a state of being or health status of a patient or subject capable of being treated with the compounds or methods provided herein. The disease may be a cancer. The disease may be an autoimmune disease. The disease may be an inflammatory disease. The disease may be an infectious disease. The condition may be obesity, morbid obesity, excess fat, and/or fat accumulation. The disease may be atherosclerosis including atherosclerotic plaque.

As used herein, the term "therapeutic agent" refers to an agent (e.g., compound or composition described herein) that when administered to a subject will have the intended prophylactic effect, e.g., preventing or delaying the onset (or reoccurrence) of an injury, disease, pathology or condition, or reducing the likelihood of the onset (or reoccurrence) of an injury, disease, pathology, or condition, or their symptoms or the intended therapeutic effect, e.g., treatment or amelioration of an injury, disease, pathology or condition, or their symptoms including any objective or subjective parameter of treatment such as abatement; remission; diminishing of symptoms or making the injury, pathology or condition more tolerable to the patient; slowing in the rate of degeneration or decline; making the final point of degeneration less debilitating; or improving a patient's physical or mental well-being.

As used herein, the term "inhibitor" refers to a compound (e.g. compounds described herein) that reduces activity when compared to a control, such as absence of the compound or a compound with known inactivity.

As used herein, the term "contacting" refers to allowing two species to react, interact, or physically touch, wherein the two species may be a nanoparticle as described herein and a cell, protein, antibody, aptamer, or another compound.

As used herein, the term "activation", "activate", "activating", "activator" and the like in reference to a protein-inhibitor interaction means positively affecting (e.g. increasing) the activity or function of the protein relative to the activity or function of the protein in the absence of the activator. In embodiments activation means positively affecting (e.g. increasing) the concentration or levels of the protein relative to the concentration or level of the protein in the absence of the activator. The terms may reference activation, or activating, sensitizing, or up-regulating signal transduction or enzymatic activity or the amount of a protein decreased in a disease. Thus, activation may include, at least in part, partially or totally increasing stimulation, increasing or enabling activation, or activating, sensitizing, or up-regulating signal transduction or enzymatic activity or the amount of a protein associated with a disease (e.g., a protein which is decreased in a disease relative to a non-diseased control). Activation may include, at least in part, partially or totally increasing stimulation, increasing or enabling activation, or activating, sensitizing, or up-regulating signal transduction or enzymatic activity or the amount of a protein As used herein, the terms "agonist," "activator," "upregulator," etc. refer to a substance capable of detectably increasing the expression or activity of a given gene or protein. The agonist can increase expression or activity 10%, 20%, 30%, 40%, 50%, 60%, 70%, 80%, 90% or more in comparison to a control in the absence of the agonist. In certain instances, expression or activity is 1.5-fold, 2-fold, 3-fold, 4-fold, 5-fold, 10-fold or higher than the expression or activity in the absence of the agonist.

As used herein, the terms "inhibition", "inhibit", "inhibiting" and the like in reference to a protein-inhibitor interaction means negatively affecting (e.g. decreasing) the activity or function of the protein relative to the activity or function of the protein in the absence of the inhibitor. In embodiments inhibition means negatively affecting (e.g. decreasing) the concentration or levels of the protein relative to the concentration or level of the protein in the absence of the inhibitor. In embodiments, inhibition refers to reduction of a disease or symptoms of disease. In embodiments, inhibition refers to a reduction in the activity of a particular protein target. Thus, inhibition includes, at least in part, partially or totally blocking stimulation, decreasing, preventing, or delaying activation, or inactivating, desensitizing, or down-regulating signal transduction or enzymatic activity or the amount of a protein. In embodiments, inhibition refers to a reduction of activity of a target protein resulting from a direct interaction (e.g. an inhibitor binds to the target protein). In embodiments, inhibition refers to a reduction of activity of a target protein from an indirect interaction (e.g. an inhibitor binds to a protein that activates the target protein, thereby preventing target protein activation).

As used herein, the terms "inhibitor," "repressor" or "antagonist" or "downregulator" interchangeably refer to a substance capable of detectably decreasing the expression or activity of a given gene or protein. The antagonist can decrease expression or activity 10%, 20%, 30%, 40%, 50%, 60%, 70%, 80%, 90% or more in comparison to a control in the absence of the antagonist. In certain instances, expression or activity is 1.5-fold, 2-fold, 3-fold, 4-fold, 5-fold, 10-fold or lower than the expression or activity in the absence of the antagonist.

As used herein, the term "expression" includes any step involved in the production of the polypeptide including, but not limited to, transcription, post-transcriptional modification, translation, post-translational modification, and secretion. Expression can be detected using conventional techniques for detecting protein (e.g., immunoassay, ELISA, Western blotting, flow cytometry, immunofluorescence, immunohistochemistry, etc.).

As used herein, the term "modulate" is used in accordance with its plain ordinary meaning and refers to the act of changing or varying one or more properties. "Modulation" refers to the process of changing or varying one or more properties. As used herein, modulate may refer to varying magnetic field by varying frequency or strength.

As used herein, the term "associated" or "associated with" in the context of a substance or substance activity or function associated with a disease (e.g. a protein associated disease, a cancer (e.g., cancer, inflammatory disease, autoimmune disease, or infectious disease)) means that the disease (e.g. cancer, inflammatory disease, autoimmune disease, or infectious disease) is caused by (in whole or in part), or a symptom of the disease is caused by (in whole or in part) the substance or substance activity or function. As used herein, what is described as being associated with a disease, if a causative agent, could be a target for treatment of the disease.

As used herein, the term "cancer" refers to all types of cancer, neoplasm or malignant tumors found in mammals (e.g. humans), including leukemias, lymphomas, carcinomas and sarcomas. Examples of cancers that may be treated with a compound or method provided herein include brain cancer, glioma, glioblastoma, neuroblastoma, prostate cancer, colorectal cancer, pancreatic cancer, Medulloblastoma, melanoma, cervical cancer, gastric cancer, ovarian cancer, lung cancer, cancer of the head, cancer of the thyroid, endocrine system, breast, cervix, head & neck, liver, kidney, lung, ovary, rectum, stomach, uterus, Hodgkin's Disease, and Non-Hodgkin's Lymphomas. Additional examples include, thyroid carcinoma, cholangiocarcinoma, pancreatic adenocarcinoma, skin cutaneous melanoma, colon adenocarcinoma, rectum adenocarcinoma, stomach adenocarcinoma, esophageal carcinoma, head and neck squamous cell carcinoma, breast invasive carcinoma, lung adenocarcinoma, lung squamous cell carcinoma, non-small cell lung carcinoma, mesothelioma, multiple myeloma, neuroblastoma, glioma, glioblastoma multiforme, ovarian cancer, rhabdomyosarcoma, primary thrombocytosis, primary macroglobulinemia, primary brain tumors, malignant pancreatic insulanoma, malignant carcinoid, urinary bladder cancer, premalignant skin lesions, testicular cancer, thyroid cancer, neuroblastoma, esophageal cancer, genitourinary tract cancer, malignant hypercalcemia, endometrial cancer, adrenal cortical cancer, neoplasms of the endocrine or exocrine pancreas, medullary thyroid cancer, medullary thyroid carcinoma, melanoma, colorectal cancer, papillary thyroid cancer, hepatocellular carcinoma, or prostate cancer. In embodiments, the cancer is a blood cancer. In embodiments, the blood cancer is lymphoma. In embodiments, the blood cancer is leukemia. In embodiments, the cancer is a tumor.

As used herein, the term "leukemia" refers broadly to progressive, malignant diseases of the blood-forming organs and is generally characterized by a distorted proliferation and development of leukocytes and their precursors in the blood and bone marrow. Leukemia is generally clinically classified on the basis of (1) the duration and character of the disease-acute or chronic; (2) the type of cell involved; myeloid (myelogenous), lymphoid (lymphogenous), or monocytic; and (3) the increase or non-increase in the number abnormal cells in the blood-leukemic or aleukemic (subleukemic). Example leukemias that may be treated with a compound or method provided herein include, for example, acute nonlymphocytic leukemia, chronic lymphocytic leukemia, acute granulocytic leukemia, chronic granulocytic leukemia, acute promyelocytic leukemia, adult T-cell leukemia, aleukemic leukemia, a leukocythemic leukemia, basophylic leukemia, blast cell leukemia, bovine leukemia, chronic myelocytic leukemia, leukemia cutis, embryonal leukemia, eosinophilic leukemia, Gross' leukemia, hairy-cell leukemia, hemoblastic leukemia, hemocytoblastic leukemia, histiocytic leukemia, stem cell leukemia, acute monocytic leukemia, leukopenic leukemia, lymphatic leukemia, lymphoblastic leukemia, lymphocytic leukemia, lymphogenous leukemia, lymphoid leukemia, lymphosarcoma cell leukemia, mast cell leukemia, megakaryocytic leukemia, micromyeloblastic leukemia, monocytic leukemia, myeloblastic leukemia, myelocytic leukemia, myeloid granulocytic leukemia, myelomonocytic leukemia, Naegeli leukemia, plasma cell leukemia, multiple myeloma, plasmacytic leukemia, promyelocytic leukemia, Rieder cell leukemia, Schilling's leukemia, stem cell leukemia, subleukemic leukemia, or undifferentiated cell leukemia.

As used herein, the term "lymphoma" refers to a group of cancers affecting hematopoietic and lymphoid tissues. It begins in lymphocytes, the blood cells that are found primarily in lymph nodes, spleen, thymus, and bone marrow. Two main types of lymphoma are non-Hodgkin lymphoma and Hodgkin's disease. Hodgkin's disease represents approximately 15% of all diagnosed lymphomas. This is a cancer associated with Reed-Sternberg malignant B lymphocytes. Non-Hodgkin's lymphomas (NHL) can be classified based on the rate at which cancer grows and the type of cells involved. There are aggressive (high grade) and indolent (low grade) types of NHL. Based on the type of cells involved, there are B-cell and T-cell NHLs. Example B-cell lymphomas that may be treated with a compound or method provided herein include, but are not limited to, small lymphocytic lymphoma, Mantle cell lymphoma, follicular lymphoma, marginal zone lymphoma, extranodal (MALT) lymphoma, nodal (monocytoid B-cell) lymphoma, splenic lymphoma, diffuse large cell B-lymphoma, Burkitt's lymphoma, lymphoblastic lymphoma, immunoblastic large cell lymphoma, or precursor B-lymphoblastic lymphoma. Example T-cell lymphomas that may be treated with a compound or method provided herein include, but are not limited to, cutaneous T-cell lymphoma, peripheral T-cell lymphoma, anaplastic large cell lymphoma, mycosis fungoides, and precursor T-lymphoblastic lymphoma.

As used herein, the term "sarcoma" generally refers to a tumor which is made up of a substance like the embryonic connective tissue and is generally composed of closely packed cells embedded in a fibrillar or homogeneous substance. Sarcomas that may be treated with a compound or method provided herein include a chondrosarcoma, fibrosarcoma, lymphosarcoma, melanosarcoma, myxosarcoma, osteosarcoma, Abemethy's sarcoma, adipose sarcoma, liposarcoma, alveolar soft part sarcoma, ameloblastic sarcoma, botryoid sarcoma, chloroma sarcoma, chorio carcinoma, embryonal sarcoma, Wilms' tumor sarcoma, endometrial sarcoma, stromal sarcoma, Ewing's sarcoma, fascial sarcoma, fibroblastic sarcoma, giant cell sarcoma, granulocytic sarcoma, Hodgkin's sarcoma, idiopathic multiple pigmented hemorrhagic sarcoma, immunoblastic sarcoma of B cells, lymphoma, immunoblastic sarcoma of T-cells, Jensen's sarcoma, Kaposi's sarcoma, Kupffer cell sarcoma, angiosarcoma, leukosarcoma, malignant mesenchymoma sarcoma, parosteal sarcoma, reticulocytic sarcoma, Rous sarcoma, serocystic sarcoma, synovial sarcoma, or telangiectaltic sarcoma.

As used herein, the term "melanoma" is taken to mean a tumor arising from the melanocytic system of the skin and other organs. Melanomas that may be treated with a compound or method provided herein include, for example, acral-lentiginous melanoma, amelanotic melanoma, benign juvenile melanoma, Cloudman's melanoma, S91 melanoma, Harding-Passey melanoma, juvenile melanoma, lentigo maligna melanoma, malignant melanoma, nodular melanoma, subungal melanoma, or superficial spreading melanoma.

As used herein, the term "carcinoma" refers to a malignant new growth made up of epithelial cells tending to infiltrate the surrounding tissues and give rise to metastases. Example carcinomas that may be treated with a compound or method provided herein include, for example, medullary thyroid carcinoma, familial medullary thyroid carcinoma, acinar carcinoma, acinous carcinoma, adenocystic carcinoma, adenoid cystic carcinoma, carcinoma adenomatosum, carcinoma of adrenal cortex, alveolar carcinoma, alveolar cell carcinoma, basal cell carcinoma, carcinoma basocellulare, basaloid carcinoma, basosquamous cell carcinoma, bronchioalveolar carcinoma, bronchiolar carcinoma, bronchogenic carcinoma, cerebriform carcinoma, cholangiocellular carcinoma, chorionic carcinoma, colloid carcinoma, comedo carcinoma, corpus carcinoma, cribriform carcinoma, carcinoma en cuirasse, carcinoma cutaneum, cylindrical carcinoma, cylindrical cell carcinoma, duct carcinoma, carcinoma durum, embryonal carcinoma, encephaloid carcinoma, epiermoid carcinoma, carcinoma epitheliale adenoides, exophytic carcinoma, carcinoma ex ulcere, carcinoma fibrosum, gelatiniforni carcinoma, gelatinous carcinoma, giant cell carcinoma, carcinoma gigantocellulare, glandular carcinoma, granulosa cell carcinoma, hair-matrix carcinoma, hematoid carcinoma, hepatocellular carcinoma, Hurthle cell carcinoma, hyaline carcinoma, hypernephroid carcinoma, infantile embryonal carcinoma, carcinoma in situ, intraepidermal carcinoma, intraepithelial carcinoma, Krompecher's carcinoma, Kulchitzky-cell carcinoma, large-cell carcinoma, lenticular carcinoma, carcinoma lenticulare, lipomatous carcinoma, lymphoepithelial carcinoma, carcinoma medullare, medullary carcinoma, melanotic carcinoma, carcinoma molle, mucinous carcinoma, carcinoma muciparum, carcinoma mucocellulare, mucoepidermoid carcinoma, carcinoma mucosum, mucous carcinoma, carcinoma myxomatodes, nasopharyngeal carcinoma, oat cell carcinoma, carcinoma ossificans, osteoid carcinoma, papillary carcinoma, periportal carcinoma, pre-invasive carcinoma, prickle cell carcinoma, pultaceous carcinoma, renal cell carcinoma of kidney, reserve cell carcinoma, carcinoma sarcomatodes, schneiderian carcinoma, scirrhous carcinoma, carcinoma scroti, signet-ring cell carcinoma, carcinoma simplex, small-cell carcinoma, solanoid carcinoma, spheroidal cell carcinoma, spindle cell carcinoma, carcinoma spongiosum, squamous carcinoma, squamous cell carcinoma, string carcinoma, carcinoma telangiectaticum, carcinoma telangiectodes, transitional cell carcinoma, carcinoma tuberosum, tuberous carcinoma, verrucous carcinoma, or carcinoma villosum.

As used herein, the terms "metastasis," "metastatic," and "metastatic cancer" can be used interchangeably and refer to the spread of a proliferative disease or disorder, e.g., cancer, from one organ or another non-adjacent organ or body part. "Metastatic cancer" is also called "Stage IV cancer." Cancer occurs at an originating site, e.g., breast, which site is referred to as a primary tumor, e.g., primary breast cancer. Some cancer cells in the primary tumor or originating site acquire the ability to penetrate and infiltrate surrounding normal tissue in the local area and/or the ability to penetrate the walls of the lymphatic system or vascular system circulating through the system to other sites and tissues in the body. A second clinically detectable tumor formed from cancer cells of a primary tumor is referred to as a metastatic or secondary tumor. When cancer cells metastasize, the metastatic tumor and its cells are presumed to be similar to those of the original tumor. Thus, if lung cancer metastasizes to the breast, the secondary tumor at the site of the breast consists of abnormal lung cells and not abnormal breast cells. The secondary tumor in the breast is referred to a metastatic lung cancer. Thus, the phrase metastatic cancer refers to a disease in which a subject has or had a primary tumor and has one or more secondary tumors. The phrases non-metastatic cancer or subjects with cancer that is not metastatic refers to diseases in which subjects have a primary tumor but not one or more secondary tumors. For example, metastatic lung cancer refers to a disease in a subject with or with a history of a primary lung tumor and with one or more secondary tumors at a second location or multiple locations, e.g., in the breast.

As used herein, the term "cutaneous metastasis" or "skin metastasis" refer to secondary malignant cell growths in the skin, wherein the malignant cells originate from a primary cancer site (e.g., breast). In cutaneous metastasis, cancerous cells from a primary cancer site may migrate to the skin where they divide and cause lesions. Cutaneous metastasis may result from the migration of cancer cells from breast cancer tumors to the skin.

As used herein, the term "visceral metastasis" refer to secondary malignant cell growths in the internal organs (e.g., heart, lungs, liver, pancreas, intestines) or body cavities (e.g., pleura, peritoneum), wherein the malignant cells originate from a primary cancer site (e.g., head and neck, liver, breast). In visceral metastasis, cancerous cells from a primary cancer site may migrate to the internal organs where they divide and cause lesions. Visceral metastasis may result from the migration of cancer cells from liver cancer tumors or head and neck tumors to internal organs.

As used herein, the term "HL-60" refers to a human leukemia cell line that has been used for laboratory research on blood cell formation and physiology. HL-60 proliferates continuously in suspension culture in nutrient and antibiotic chemicals. The doubling time is about 36-48 hours. The cell line was derived from a 36-year-old woman who was originally reported to have acute promyelocytic leukemia at the MD Anderson Cancer Center. HL-60 cells predominantly show neutrophilic promyelocytic morphology.

As used herein, the term "IPO-M6" refers to a mouse HL-60 monoclonal antibody. It reacts with Reacts with human leukemia cell line HL60.

As used herein, the term "cardiovascular disease" refers to a class of diseases that involve the heart or blood vessels. Cardiovascular disease includes, but is not limited to, coronary artery diseases (CAD), myocardial infarction (commonly known as a heart attack), stroke, hypertensive heart disease, rheumatic heart disease, cardiomyopathy, congestive heart failure, cardiac arrhythmias (i.e., atrial fibrillation, ventricular tachycardia, etc.), cerebrovascular disease, peripheral arterial disease, aortic stenosis, and arterial thrombosis.

As used herein, the term "atherosclerosis" refers to a disease in which the inside of an artery narrows due to the buildup of plaque. Initially, there are generally no symptoms. [1] When severe, it can result in coronary artery disease, stroke, peripheral artery disease, or kidney problems, depending on which arteries are affected. Symptoms, if they occur, generally do not begin until middle age. Atherosclerosis is a general term describing any hardening (and loss of elasticity) of medium or large arteries arteriolosclerosis is any hardening (and loss of elasticity) of arterioles (small arteries); atherosclerosis is a hardening of an artery specifically due to an atheromatous plaque. The term atherogenic is used for substances or processes that cause formation of atheroma. The plaque may comprise fat, cholesterol, calcium and other substances found in blood. In embodiments, the nanoparticles described herein may include a target-binding moiety capable of binding a component of the plaque such as fat, cholesterol, calcium and other substances found in blood.

As used herein, the term "atherogenesis" is the developmental process of atheromatous plaques. It is characterized by a remodeling of arteries leading to sub-endothelial accumulation of fatty substances called plaques. The buildup of an atheromatous plaque is a slow process, developed over a period of several years through a complex series of cellular events occurring within the arterial wall and in response to a variety of local vascular circulating factors. One recent hypothesis suggests that, for unknown reasons, leukocytes, such as monocytes or basophils, begin to attack the endothelium of the artery lumen in cardiac muscle. The ensuing inflammation leads to formation of atheromatous plaques in the arterial tunica intima, a region of the vessel wall located between the endothelium and the tunica media. The bulk of these lesions is made of excess fat, collagen, and elastin. At first, as the plaques grow, only wall thickening occurs without any narrowing. Stenosis is a late event, which may never occur and is often the result of repeated plaque rupture and healing responses, not just the atherosclerotic process by itself.

As used herein, the term "treating" or "treatment" refers to any approach for obtaining beneficial or desired results in a subject's condition, including clinical results. Beneficial or desired clinical results can include, but are not limited to, alleviation or amelioration of one or more symptoms or conditions, diminishment of the extent of a disease, stabilizing (i.e., not worsening) the state of disease, prevention of a disease's transmission or spread, delay or slowing of disease progression, amelioration or palliation of the disease state, diminishment of the reoccurrence of disease, and remission, whether partial or total and whether detectable or undetectable. In other words, "treatment" as used herein includes any cure, amelioration, or prevention of a disease. Treatment may prevent the disease from occurring; inhibit the disease's spread; relieve the disease's symptoms (e.g., ocular pain, seeing halos around lights, red eye, very high intraocular pressure), fully or partially remove the disease's underlying cause, shorten a disease's duration, or do a combination of these things.

As used herein, the term "prevent" refers to a decrease in the occurrence of disease symptoms in a patient. As indicated above, the prevention may be complete (no detectable symptoms) or partial, such that fewer symptoms are observed than would likely occur absent treatment.

As used herein, the term "nanoablation" refers to the destruction of a target by nanoparticles. In embodiments, nanoablation is achieved via nanoparticle binding to a target cell ot fragment thereof, induction of oscillation of the nanoparticle by application of a variable force variable frequency magnetic force, and subsequent apoptosis of the cell. In embodiments, nanoablation is achieved via nanoparticle binding to a target cell, induction of oscillation of the nanoparticle by application of a variable force variable frequency magnetic force, and subsequent rupture of the cell.

As used herein, the term "patient" or "subject in need thereof" refers to a living organism suffering from or prone to a disease or condition that can be treated by administration of a pharmaceutical composition as provided herein. Non-limiting examples include humans, other mammals, bovines, rats, mice, dogs, monkeys, goat, sheep, cows, deer, and other non-mammalian animals. In some embodiments, a patient is human.

As used herein, the term "effective amount" is an amount sufficient for a compound to accomplish a stated purpose relative to the absence of the compound (e.g. achieve the effect for which it is administered, treat a disease, reduce enzyme activity, increase enzyme activity, reduce a signaling pathway, or reduce one or more symptoms of a disease or condition). An example of an "effective amount" is an amount sufficient to contribute to the treatment, prevention, or reduction of a symptom or symptoms of a disease, which could also be referred to as a "therapeutically effective amount." A "reduction" of a symptom or symptoms (and grammatical equivalents of this phrase) means decreasing of the severity or frequency of the symptom(s), or elimination of the symptom(s). An "activity decreasing amount," as used herein, refers to an amount of antagonist required to decrease the activity of an enzyme relative to the absence of the antagonist. A "function disrupting amount," as used herein, refers to the amount of antagonist required to disrupt the function of an enzyme or protein relative to the absence of the antagonist. The exact amounts will depend on the purpose of the treatment, and will be ascertainable by one skilled in the art using known techniques [11-14].

For any composition described herein, the therapeutically effective amount can be initially determined from cell culture assays. Target concentrations will be those concentrations of active compound(s) that are capable of achieving the methods described herein, as measured using the methods described herein or known in the art.

As is well known in the art, therapeutically effective amounts for use in humans can also be determined from animal models. For example, a dose for humans can be formulated to achieve a concentration that has been found to be effective in animals. The dosage in humans can be adjusted by monitoring compounds effectiveness and adjusting the dosage upwards or downwards, as described above. Adjusting the dose to achieve maximal efficacy in humans based on the methods described above and other methods is well within the capabilities of the ordinarily skilled artisan.

As used herein, the term "therapeutically effective amount" refers to that amount of the therapeutic agent sufficient to ameliorate the disorder, as described above. For example, for the given parameter, a therapeutically effective amount will show an increase or decrease of at least 5%, 10%, 15%, 20%, 25%, 40%, 50%, 60%, 75%, 80%, 90%, or at least 100%. Therapeutic efficacy can also be expressed as "-fold" increase or decrease. For example, a therapeutically effective amount can have at least a 1.2-fold, 1.5-fold, 2-fold, 5-fold, or more effect over a control.

Dosages may be varied depending upon the requirements of the patient and the compound being employed. The dose administered to a patient, in the context of the present disclosure, should be sufficient to effect a beneficial therapeutic response in the patient over time. The size of the dose also will be determined by the existence, nature, and extent of any adverse side-effects. Determination of the proper dosage for a particular situation is within the skill of the practitioner. Generally, treatment is initiated with smaller dosages which are less than the optimum dose of the compound. Thereafter, the dosage is increased by small increments until the optimum effect under circumstances is reached. Dosage amounts and intervals can be adjusted individually to provide levels of the administered compound effective for the particular clinical indication being treated. This will provide a therapeutic regimen that is commensurate with the severity of the individual's disease state.

As used herein, the term "administering" means oral administration, administration as a suppository, topical contact, intravenous, parenteral, intraperitoneal, intramuscular, intralesional, intrathecal, intranasal or subcutaneous administration, or the implantation of a slow-release device, e.g., a mini-osmotic pump, to a subject. Administration is by any route, including parenteral and transmucosal (e.g., buccal, sublingual, palatal, gingival, nasal, vaginal, rectal, or transdermal). Parenteral administration includes, e.g., intravenous, intramuscular, intra-arteriole, intradermal, subcutaneous, intraperitoneal, intraventricular, and intracranial. Other modes of delivery include, but are not limited to, the use of liposomal formulations, intravenous infusion, transdermal patches, etc. In embodiments, the administering does not include administration of any active agent other than the recited active agent.

As used herein, the term "co-administer" refers to a composition described herein is administered at the same time, just prior to, or just after the administration of one or more additional therapies. The compounds provided herein can be administered alone or can be coadministered to the patient. Coadministration is meant to include simultaneous or sequential administration of the compounds individually or in combination (more than one compound). Thus, the preparations can also be combined, when desired, with other active substances (e.g. to reduce metabolic degradation). The compositions of the present disclosure can be delivered transdermally, by a topical route, or formulated as applicator sticks, solutions, suspensions, emulsions, gels, creams, ointments, pastes, jellies, paints, powders, and aerosols.

A "cell" as used herein, refers to a cell carrying out metabolic or other function sufficient to preserve or replicate its genomic DNA. A cell can be identified by well-known methods in the art including, for example, presence of an intact membrane, staining by a particular dye, ability to produce progeny or, in the case of a gamete, ability to combine with a second gamete to produce a viable offspring. Cells may include prokaryotic and eukaryotic cells. Prokaryotic cells include but are not limited to bacteria. Eukaryotic cells include but are not limited to yeast cells and cells derived from plants and animals, for example mammalian, insect (e.g., spodoptera) and human cells.

As used herein, the term "fat cell" as used herein refers to adipocytes, also known as lipocytes, which are the cells that primarily compose adipose tissue, specialized in storing energy as fat. Adipocytes are derived from mesenchymal stem cells which give rise to adipocytes, osteoblasts, myocytes and other cell types through adipogenesis.

As used herein, the term "control" or "control experiment" is used in accordance with its plain ordinary meaning and refers to an experiment in which the subjects or reagents of the experiment are treated as in a parallel experiment except for omission of a procedure, reagent, or variable of the experiment. In some instances, the control is used as a standard of comparison in evaluating experimental effects. In some embodiments, a control is the measurement of the activity of a protein in the absence of a compound as described herein (including embodiments and examples).

As used herein, the term "cancer model organism," is an organism exhibiting a phenotype indicative of cancer, or the activity of cancer causing elements, within the organism. The term cancer is defined above. A wide variety of organisms may serve as cancer model organisms, and include for example, cancer cells and mammalian organisms such as rodents (e.g. mouse or rat) and primates (such as humans). Cancer cell lines are widely understood by those skilled in the art as cells exhibiting phenotypes or genotypes similar to in vivo cancers. Cancer cell lines as used herein includes cell lines from animals (e.g. mice) and from humans.

An "anticancer agent" as used herein refers to a molecule (e.g. compound, peptide, protein, or nucleic acid) used to treat cancer through destruction or inhibition of cancer cells or tissues. Anticancer agents may be selective for certain cancers or certain tissues. In embodiments, the magnetizeable nanoparticle including a target binding agent is an anti-cancer agent. In other embodiments, the anti-cancer agent is a separate compound or drug.

"Anti-cancer agent" and "anticancer agent" are used in accordance with their plain ordinary meaning and refers to a composition (e.g. compound, drug, antagonist, inhibitor, modulator) having antineoplastic properties or the ability to inhibit the growth or proliferation of cells. In some embodiments, an anti-cancer agent is a chemotherapeutic. In some embodiments, an anti-cancer agent is an agent identified herein having utility in methods of treating cancer. In some embodiments, an anti-cancer agent is an agent approved by the FDA or similar regulatory agency of a country other than the USA, for treating cancer.

As used herein, the terms "specific", "specifically", "specificity", or the like of a composition refers to the composition's ability to cause a particular action, such as inhibition, to a particular molecular target with minimal or no action to other proteins in the cell.).

As used herein, the term "infection" or "infectious disease" refers to a disease or condition that can be caused by organisms such as a bacterium, virus, fungi or any other pathogenic microbial agents. In embodiments, the infectious disease is caused by a pathogenic bacteria. Pathogenic bacteria are bacteria which cause diseases (e.g., in humans). In embodiments, the infectious disease is a bacteria associated disease (e.g., tuberculosis, which is caused by *Mycobacterium tuberculosis*). Non-limiting bacteria associated diseases include pneumonia, which may be caused by bacteria such as *Streptococcus* and *Pseudomonas*; or foodborne illnesses, which can be caused by bacteria such as *Shigella, Campylobacter*, and *Salmonella*. Bacteria associated diseases also includes tetanus, typhoid fever, diphtheria, syphilis, and leprosy.

As used herein, the term "detectable agent" or "detectable moiety" refers to a composition detectable by appropriate means such as spectroscopic, photochemical, biochemical, immunochemical, chemical, magnetic resonance imaging, or other physical means. For example, useful detectable agents include $^{18}$F, $^{32}$P, $^{33}$P, $^{45}$Ti, $^{47}$Sc, $^{52}$Fe, $^{59}$Fe, $^{62}$Cu, $^{64}$Cu, $^{67}$Cu, $^{67}$Ga, $^{68}$Ga, $^{77}$As, $^{86}$Y, $^{90}$Y, $^{89}$Sr, $^{89}$Zr, $^{94}$Tc, $^{94}$Tc, $^{99m}$Tc, $^{99}$Mo, $^{105}$Pd, $^{105}$Rh, $^{111}$Ag, $^{111}$In, $^{123}$I, $^{124}$I, $^{125}$I, $^{131}$I, $^{142}$Pr, $^{143}$Pr, $^{149}$Pm, $^{153}$Sm, $^{154-158}$Gd, $^{161}$Tb, $^{166}$Dy, $^{166}$Ho, $^{169}$Er, $^{175}$Lu, $^{177}$Lu, $^{186}$Re, $^{188}$Re, $^{189}$Re, $^{194}$Ir, $^{198}$Au, $^{199}$Au, $^{211}$At, $^{211}$Pb, $^{212}$Bi, $^{212}$Pb, $^{213}$Bi, $^{223}$Ra, $^{225}$Ac, Cr, V, Mn, Fe, Co, Ni, Cu, La, Ce, Pr, Nd, Pm, Sm, Eu, Gd, Tb, Dy, Ho, Er, Tm, Yb, Lu, $^{32}$P, fluorophore (e.g. fluorescent dyes), electron-dense reagents, enzymes (e.g., as commonly used in an ELISA), biotin, digoxigenin, paramagnetic molecules, paramagnetic nanoparticles, ultrasmall superparamagnetic iron oxide ("USPIO") nanoparticles, USPIO nanoparticle aggregates, superparamagnetic iron oxide ("SPIO") nanoparticles, SPIO nanoparticle aggregates, monochrystalline iron oxe nanoparticles, monochrystalline iron oxide, nanoparticle contrast agents, liposomes or other delivery vehicles containing Gadolinium chelate ("Gd-chelate") molecules, Gadolinium, radioisotopes, radionuclides (e.g. carbon-11, nitrogen-13, oxygen-15, fluorine-18, rubidium-82), fluorodeoxyglucose (e.g. fluorine-18 labeled), any gamma ray emitting radionuclides, positron-emitting radionuclide, radiolabeled glucose, radiolabeled water, radiolabeled ammonia, biocolloids, microbubbles (e.g. including microbubble shells including albumin, galactose, lipid, and/or polymers; microbubble gas core including air, heavy gas(es), perfluorocarbon, nitrogen, octafluoropropane, perflexane lipid microsphere, perflutren, etc.), iodinated contrast agents (e.g. iohexol, iodixanol, ioversol, iopamidol, ioxilan, iopromide, diatrizoate, metrizoate, ioxaglate), barium sulfate, thorium dioxide, gold, gold nanoparticles, gold nanoparticle aggregates, fluorophores, two-photon fluorophores, or haptens and proteins or other entities which can be made detectable, e.g., by incorporating a radiolabel into a peptide or antibody specifically reactive with a target peptide. A detectable moiety is a monovalent detectable agent or a detectable agent capable of forming a bond with another composition.

Descriptions of compounds of the present disclosure are limited by principles of chemical bonding known to those skilled in the art. Accordingly, where a group may be substituted by one or more of a number of substituents, such substitutions are selected so as to comply with principles of chemical bonding and to give compounds which are not inherently unstable and/or would be known to one of ordinary skill in the art as likely to be unstable under ambient conditions, such as aqueous, neutral, and several known physiological conditions. For example, a heterocycloalkyl or heteroaryl is attached to the remainder of the molecule via a ring heteroatom in compliance with principles of chemical bonding known to those skilled in the art thereby avoiding inherently unstable compounds.

As used herein, the term "coupling reagent" is used in accordance with its plain ordinary meaning in the arts and refers to a substance (e.g., a compound or solution) which participates in chemical reaction and results in the formation of a covalent bond (e.g., between bioconjugate reactive moieties, between a bioconjugate reactive moiety and the coupling reagent). In embodiments, the level of reagent is depleted in the course of a chemical reaction. This is in contrast to a solvent, which typically does not get consumed over the course of the chemical reaction.

As used herein, the term "solution" refers to a liquid mixture in which the minor component (e.g., a solute or compound) is uniformly distributed within the major component (e.g., a solvent). In embodiments, the solution includes magnetizeable nanoparticles conjugated to target-binding agent distributed in buffer.

As used herein, the term "salt" refers to acid or base salts of the compounds used in the methods of the present disclosure. Illustrative examples of acceptable salts are mineral acid (hydrochloric acid, hydrobromic acid, phosphoric acid, and the like) salts, organic acid (acetic acid, propionic acid, glutamic acid, citric acid and the like) salts, quaternary ammonium (methyl iodide, ethyl iodide, and the like) salts.

As used herein, the terms "bind" and "bound" are used in accordance with its plain and ordinary meaning and refer to the association between atoms or molecules. The association can be direct or indirect. For example, bound atoms or molecules may be direct, e.g., by covalent bond or linker (e.g. a first linker or second linker), or indirect, e.g., by non-covalent bond (e.g. electrostatic interactions (e.g. ionic bond, hydrogen bond, halogen bond), van der Waals interactions (e.g. dipole-dipole, dipole-induced dipole, London dispersion), ring stacking (pi effects), hydrophobic interactions and the like).

As used herein, the term "capable of binding" refers to a moiety (e.g. a compound, antibody, or aptamer as described herein) that is able to measurably bind to a target (e.g., cancer cell via ligand-antibody interaction). In embodiments, where a moiety is capable of binding a target, the moiety is capable of binding with a $K_d$ of less than about 10 μM, 5 μM, 1 μM, 500 nM, 250 nM, 100 nM, 75 nM, 50 nM, 25 nM, 15 nM, 10 nM, 5 nM, 1 nM, or about 0.1 nM.

As used herein, the term "conjugated" when referring to two moieties means the two moieties are bonded, wherein the bond or bonds connecting the two moieties may be covalent or non-covalent. In embodiments, the two moieties are covalently bonded to each other (e.g. directly or through a covalently bonded intermediary). In embodiments, the two moieties are non-covalently bonded (e.g. through ionic bond(s), van der Waal's bond(s)/interactions, hydrogen bond(s), polar bond(s), or combinations or mixtures thereof).

As used herein, the terms "marker", "biomarker", and "protein marker" are used interchangeably throughout the disclosure. As used herein, a protein marker refers generally to a protein or polypeptide, the level or concentration of which is associated with a particular biological state (i.e. cancer, obesity, or atherosclerosis) or cell type (i.e. cancer cell or adipocyte). Panels, assays, kits and methods of the present disclosure may comprise antibodies, binding fragments thereof or other types of binding moieties, which are specific for the protein marker described herein.

As used herein, the terms "polypeptide" and "protein", used interchangeably herein, refer to a polymeric form of amino acids of any length, which can include coded and non-coded amino acids, chemically or biochemically modified or derivatized amino acids, and polypeptides having modified peptide backbones. In various embodiments, detecting the levels of naturally occurring biomarker proteins in a biological sample is contemplated for use within diagnostic, prognostic, or monitoring methods disclosed herein. The term also includes fusion proteins, including, but not limited to, naturally occurring fusion proteins with a heterologous amino acid sequence, fusions with heterologous and homologous leader sequences, with or without N-terminal methionine residues; immunologically tagged proteins; and the like.

As used herein, the term "antibody" is used in the broadest sense and specifically covers, but is not limited to, monoclonal antibodies, polyclonal antibodies, multispecific antibodies (e.g., bispecific antibodies) formed from at least two intact antibodies, single chain antibodies (e.g., scFv), and antibody fragments or other derivatives, so long as they exhibit the desired biological specificity. The term "antibody" refers to a polypeptide encoded by an immunoglobulin gene or functional fragments thereof that specifically binds and recognizes an antigen. The recognized immunoglobulin genes include the kappa, lambda, alpha, gamma, delta, epsilon, and mu constant region genes, as well as the myriad immunoglobulin variable region genes. Light chains are classified as either kappa or lambda. Heavy chains are classified as gamma, mu, alpha, delta, or epsilon, which in turn define the immunoglobulin classes, IgG, IgM, IgA, IgD and IgE, respectively.

As used herein, the term "monoclonal antibody" refers to an antibody obtained from a population of substantially homogeneous antibodies, i.e., the individual antibodies comprising the population are identical except for possible naturally occurring mutations that can be present in minor amounts. In certain specific embodiments, the monoclonal antibody is an antibody specific for a biomarker described herein.

Monoclonal antibodies may be highly specific, being directed against a single antigenic site. Furthermore, in contrast to conventional (polyclonal) antibody preparations, which typically include different antibodies directed against different determinants (epitopes), each monoclonal antibody is directed against a single determinant on the antigen. In addition to their specificity, the monoclonal antibodies are advantageous in that they are synthesized by the hybridoma culture, uncontaminated by other immunoglobulins. The modifier "monoclonal" indicates the character of the antibody as being obtained from a substantially homogeneous population of antibodies, and is not to be construed as requiring production of the antibody by any particular method.

The monoclonal antibodies herein specifically include "chimeric" antibodies in which a portion of the heavy and/or light chain is identical with or homologous to corresponding sequences in antibodies derived from a particular species or belonging to a particular antibody class or subclass, while the remainder of the chain(s) is identical with or homologous to corresponding sequences in antibodies derived from another species or belonging to another antibody class or subclass, as well as fragments of such antibodies, so long as they exhibit the desired biological activity and/or specificity. Methods of making chimeric antibodies are known in the art.

As used herein, the term "functional fragments" of antibodies refers to those fragments that retain sufficient binding affinity and specificity for a biomarker to permit a determination of the level of the biomarker in a biological sample. In some cases, a functional fragment will bind to a biomarker with substantially the same affinity and/or specificity as an intact full chain molecule from which it may have been derived.

As used herein, the term "isolated" antibody is one that has been identified and separated and/or recovered from a component of its natural environment. Contaminant components of its natural environment are materials that would interfere with diagnostic or prognostic uses for the antibody, and may include enzymes, hormones, and other proteinaceous or non-proteinaceous solutes. In specific embodiments, the antibody will be purified to greater than 95% by weight of antibody, e.g., as determined by the Lowry method, and most preferably more than 99% by weight.

As used herein, the term "detectably labeled antibody" refers to an antibody (or antibody fragment) which retains binding specificity for a biomarker described herein, and which has an attached detectable label or moiety. The detectable label can be attached by any suitable means, e.g., by chemical conjugation or genetic engineering techniques. Methods for production of detectably labeled proteins are known in the art. Detectable labels may be selected from a variety of such labels known in the art, including, but not limited to, haptens, radioisotopes, fluorophores, paramagnetic labels, enzymes (e.g., horseradish peroxidase), or other moieties or compounds which either emit a detectable signal (e.g., radioactivity, fluorescence, color) or emit a detectable signal after exposure of the label to its substrate. Various detectable label/substrate pairs (e.g., horseradish peroxidase/diaminobenzidine, avidin/streptavidin, luciferase/luciferin)), methods for labeling antibodies, and methods for using labeled antibodies are well known in the art.

As used herein, the term "selective" or "selectivity" or the like of a compound refers to the compound's ability to discriminate between molecular targets (e.g. a compound having selectivity toward cancer cells, fat cells, atherosclerotic plaques, and the like).

As used herein, the term "specifically (or selectively) binds" to an antibody or "specifically (or selectively) immunoreactive with," when referring to a protein or peptide, refers to a binding reaction that is determinative of the presence of the protein, often in a heterogeneous population of proteins and other biologics. Thus, under designated immunoassay conditions, the specified antibodies bind to a particular protein at least two times the background and more typically more than 10 to 100 times background. Specific binding to an antibody under such conditions requires an antibody that is selected for its specificity for a particular protein. For example, polyclonal antibodies can be selected to obtain only a subset of antibodies that are specifically immunoreactive with the selected antigen and not with other proteins. This selection may be achieved by subtracting out antibodies that cross-react with other molecules. A variety of immunoassay formats may be used to select antibodies specifically immunoreactive with a particular protein. For example, solid-phase ELISA immunoassays are routinely used to select antibodies specifically immunoreactive with a protein.

An example immunoglobulin (antibody) structural unit comprises a tetramer. Each tetramer is composed of two identical pairs of polypeptide chains, each pair having one "light" (about 25 kDa) and one "heavy" chain (about 50-70 kDa). The N-terminus of each chain defines a variable region of about 100 to 110 or more amino acids primarily responsible for antigen recognition. The terms "variable heavy chain," "$V_H$," or "VH" refer to the variable region of an immunoglobulin heavy chain, including an Fv, scFv, dsFv or Fab; while the terms "variable light chain," "$V_L$" or "VL" refer to the variable region of an immunoglobulin light chain, including of an Fv, scFv, dsFv or Fab.

Examples of antibody functional fragments include, but are not limited to, complete antibody molecules, antibody fragments, such as Fv, single chain Fv (scFv), complementarity determining regions (CDRs), VL (light chain variable region), VH (heavy chain variable region), Fab, F(ab)2' and any combination of those or any other functional portion of an immunoglobulin peptide capable of binding to target antigen (see, e.g., FUNDAMENTAL IMMUNOLOGY (Paul ed., 4th ed. 2001). As appreciated by one of skill in the art, various antibody fragments can be obtained by a variety of methods, for example, digestion of an intact antibody with an enzyme, such as pepsin; or de novo synthesis. Antibody fragments are often synthesized de novo either chemically or by using recombinant DNA methodology. Thus, the term antibody, as used herein, includes antibody fragments either produced by the modification of whole antibodies, or those synthesized de novo using recombinant DNA methodologies (e.g., single chain Fv) or those identified using phage display libraries. The term "antibody" also includes bivalent or bispecific molecules, diabodies, triabodies, and tetrabodies.

As used herein, the term "chimeric antibody" refers to an antibody molecule in which (a) the constant region, or a portion thereof, is altered, replaced or exchanged so that the antigen binding site (variable region) is linked to a constant region of a different or altered class, effector function and/or species, or an entirely different molecule which confers new properties to the chimeric antibody, e.g., an enzyme, toxin, hormone, growth factor, drug, etc.; or (b) the variable region, or a portion thereof, is altered, replaced or exchanged with a variable region having a different or altered antigen specificity. The preferred antibodies of, and use thereof provided herein include humanized and/or chimeric monoclonal antibodies.

As used herein, the term "aptamer" refers to oligonucleotide or peptide molecules that bind to a specific target molecule. Aptamers are usually created by selecting them from a large random sequence pool, but natural aptamers also exist in riboswitches. Aptamers can be combined with ribozymes to self-cleave in the presence of their target molecule. These compound molecules have additional research, industrial and clinical applications. More specifically, aptamers can be classified as 1) DNA or RNA or XNA aptamers. They consist of (usually short) strands of oligonucleotides and 2) peptide aptamers. They consist of one (or more) short variable peptide domains, attached at both ends to a protein scaffold.

For specific proteins described herein, the named protein includes any of the protein's naturally occurring forms, variants or homologs that maintain the protein transcription factor activity (e.g., within at least 50%, 80%, 90%, 95%, 96%, 97%, 98%, 99% or 100% activity compared to the native protein). In some embodiments, variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring form. In other embodiments, the protein is the protein as identified by its NCBI sequence reference. In other embodiments, the protein is the protein as identified by its NCBI sequence reference, homolog or functional fragment thereof.

As used herein, the term "pharmaceutically acceptable salts" refers to salts of the active compounds that are prepared with relatively nontoxic acids or bases, depending on the particular substituents found on the compounds described herein. When compounds of the present disclosure contain relatively acidic functionalities, base addition salts can be obtained by contacting the neutral form of such compounds with a sufficient amount of the desired base, either neat or in a suitable inert solvent. Examples of pharmaceutically acceptable base addition salts include sodium, potassium, calcium, ammonium, organic amino, or magnesium salt, or a similar salt. When compounds of the present disclosure contain relatively basic functionalities, acid addition salts can be obtained by contacting the neutral form of such compounds with a sufficient amount of the desired acid, either neat or in a suitable inert solvent. Examples of pharmaceutically acceptable acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from relatively nontoxic organic acids like acetic, propionic, isobutyric, maleic, malonic, benzoic, succinic, suberic, fumaric, lactic, mandelic, phthalic, benzenesulfonic, p-tolylsulfonic, citric, tartaric, oxalic, methanesulfonic, and the like. Also included are salts of amino acids such as arginate and the like, and salts of organic acids like glucuronic or galactunoric acids and the like. Certain specific compounds of the present disclosure contain both basic and acidic functionalities that allow the compounds to be converted into either base or acid addition salts.

Thus, the compounds of the present disclosure may exist as salts, such as with pharmaceutically acceptable acids. The present disclosure includes such salts. Non-limiting examples of such salts include hydrochlorides, hydrobromides, phosphates, sulfates, methanesulfonates, nitrates, maleates, acetates, citrates, fumarates, proprionates, tartrates (e.g., (+)-tartrates, (−)-tartrates, or mixtures thereof including racemic mixtures), succinates, benzoates, and salts with amino acids such as glutamic acid, and quaternary ammonium salts (e.g. methyl iodide, ethyl iodide, and the like). These salts may be prepared by methods known to those skilled in the art.

The neutral forms of the compounds are preferably regenerated by contacting the salt with a base or acid and isolating the parent compound in the conventional manner. The parent form of the compound may differ from the various salt forms in certain physical properties, such as solubility in polar solvents.

"Pharmaceutically acceptable excipient" and "pharmaceutically acceptable carrier" refer to a substance that aids the administration of an active agent to and absorption by a subject and can be included in the compositions of the present disclosure without causing a significant adverse toxicological effect on the patient. Non-limiting examples of pharmaceutically acceptable excipients include water, NaCl, normal saline solutions, lactated Ringer's, normal sucrose, normal glucose, binders, fillers, disintegrants, lubricants, coatings, sweeteners, flavors, salt solutions (such as Ringer's solution), alcohols, oils, gelatins, carbohydrates such as lactose, amylose or starch, fatty acid esters, hydroxymethylcellulose, polyvinyl pyrrolidine, and colors, and the like. Such preparations can be sterilized and, if desired, mixed with auxiliary agents such as lubricants, preservatives, stabilizers, wetting agents, emulsifiers, salts for influencing osmotic pressure, buffers, coloring, and/or aromatic substances and the like that do not deleteriously react with the compounds of the disclosure. One of skill in the art will recognize that other pharmaceutical excipients are useful in the present disclosure.

As used herein, the term "preparation" refers to the formulation of the active compound with encapsulating material as a carrier providing a capsule in which the active component with or without other carriers, is surrounded by a carrier, which is thus in association with it. Similarly, cachets and lozenges are included. Tablets, powders, capsules, pills, cachets, and lozenges can be used as solid dosage forms suitable for oral administration.

As used herein, the term "about" means a range of values including the specified value, which a person of ordinary skill in the art would consider reasonably similar to the specified value. In embodiments, about means within a standard deviation using measurements generally acceptable in the art. In embodiments, about means a range extending to +/−10% of the specified value. In embodiments, about includes the specified value.

Biocompatible Magnetic Particles

In an aspect, provided herein are compositions including biocompatible magnetizeable nanoparticles. The nanoparticles are formed from iron oxide ($Fe_3O_4$ or $Fe_2O_3$). The nanoparticles have a diameter of about 10 to about 300 nanometers and are biocompatible and magnetizeable. The nanoparticles may be a disc. The nanoparticles may be conjugated to a target binding agent capable of binding a target. The target may be cancer cells, pathogens, fat cells, or atherosclerotic plaques. The target binding agent may be an antibody or an aptamer.

In embodiments, the nanoparticles may comprise one or more of iron, nickel and cobalt. In embodiments, the nanoparticles comprise iron. In embodiments, the nanoparticles comprise nickel. In embodiments, the nanoparticles comprise cobalt. In embodiments, the nanoparticles comprise a combination of iron, nickel and cobalt. In embodiments, the nanoparticles comprise iron oxide ($Fe_3O_4$ or $Fe_2O_3$). In embodiments, the nanoparticles comprise iron (II,III) oxide ($Fe_3O_4$) also known as magnetite. In embodiments, the nanoparticles comprise iron (III) oxide ($Fe_2O_3$) also known as ferric oxide and maghemite.

In embodiments, the nanoparticles have an average diameter of about 10 to about 1000 nanometers, about 100 to about 900 nanometers, from about 200 to about 800 nanometers, from about 300 to about 700 nanometers, or from 400 to about 600 nanometers. In some embodiments, the nanoparticle has a diameter of about 10 to about 500, about 20 to about 400, about 30 to about 300, about 40 to about 200, or about 50 to about 100 nanometers. In some embodiments, the nanoparticles have an average diameter of about 10 to about 250, about 20 to about 200, about 30 to about 150, or about 40 to about 100 nanometers. In some embodiments, the nanoparticles have an average diameter of about 10 nanometers, about 20 nanometers, about 30 nanometers, about 40 nanometers, about 50 nanometers, about 60 nanometers, about 70 nanometers, about 80 nanometers, about 90 nanometers, about 100 nanometers, about 110 nanometers, about 120 nanometers, about 130 nanometers, about 140 nanometers, about 150 nanometers, about 160 nanometers, about 170 nanometers, about 180 nanometers, or about 190 nanometers. In some embodiments, the nanoparticles have a diameter of about 200 nanometers, about 300 nanometers, about 400 nanometers, about 500 nanometers, about 600 nanometers, about 700 nanometers, about 800 nanometers, about 900 nanometers, or about 1000 nanometers. In some embodiments, the nanoparticle has a diameter of about 10 to about 300. In some embodiments, nanoparticles have an average diameter of about 20 to about 150 nanometers. In some embodiments, nanoparticles have an average diameter of about 40 to about 70 nanometers. In some embodiments, the nanoparticle has a diameter of about 10 nanometers. In some embodiments, the nanoparticles have an average diameter of about 20 nanometers. In some embodiments nanoparticles have an average diameter of about 30 nanometers. In some embodiments, nanoparticles have an average diameter of about 40 nanometers. In some embodiments, the nanoparticles have an average diameter of about 50 nanometers. In some embodiments, nanoparticles have an average diameter of about 60 nanometers. In some embodiments, the nanoparticle has a diameter of about 70 nanometers. In some embodiments, nanoparticles have an average diameter of about 80 nanometers. In some embodiments, the nanoparticle has a diameter of about 90 nanometers. In some embodiments, nanoparticles have an average diameter of about 100 nanometers. In some embodiments, nanoparticles have an average diameter of about 110 nanometers. In some embodiments, nanoparticles have an average diameter of about 120 nanometers. In some embodiments, the nanoparticle has a diameter of about 130 nanometers. In some embodiments, nanoparticles have an average diameter of about 140 nanometers. In some embodiments, nanoparticles have an average diameter of about 150 nanometers. Nanoparticle diameter may be any value or subrange within the recited ranges, including endpoints.

In embodiments, the nanoparticle has the shape of a sphere, rod, cube, triangular, hexagonal, cylinder, spherocylinder, ellipsoid, or disc. In embodiments, the nanoparticle is spherical. In embodiments, the nanoparticle is rod-shaped. In embodiments, the nanoparticle is cube shaped. In embodiments, the nanoparticle is triangular. In embodiments, the nanoparticle is hexagonal. In embodiments, the nanoparticle is cylindrical. In embodiments, the nanoparticle is spherocylindrical. In embodiments, the nanoparticle is ellipsoidal. In embodiments, the nanoparticle is a disc or disc-shaped and referred to as a nanodisc. For disc shaped nanoparticles, the diameter as used herein refers to the length of the disc from end to end.

In some embodiments, the nanodisc has a diameter of about 10 to about 300. In some embodiments, the nanodisc has a diameter of about 20 to about 150 nanometers. In some embodiments, the nanodisc has a diameter of about 40 to about 70 nanometers. In some embodiments, the nanodisc as a diameter of about 10 nanometers. In some embodiments, the nanoparticle has a diameter of about 20 nanometers. In some embodiments, the nanoparticle has a diameter of about 30 nanometers. In some embodiments, the nanodisc has a diameter of about 40 nanometers. In some embodiments, the nanodisc has a diameter of about 50 nanometers. In some embodiments, the nanodisc has a diameter of about 60 nanometers. In some embodiments, the nanodisc has a diameter of about 70 nanometers. In some embodiments, the nanodisc has a diameter of about 80 nanometers. In some embodiments, the nanodisc has a diameter of about 90 nanometers. In some embodiments, the nanodisc has a diameter of about 100 nanometers. In some embodiments, the nanodisc has a diameter of about 110 nanometers. In some embodiments, the nanodisc has a diameter of about 120 nanometers. In some embodiments, the nanodisc has a diameter of about 130 nanometers. In some embodiments, the nanodisc has a diameter of about 140 nanometers. In some embodiments, the nanodisc has a diameter of about 150 nanometers.

In embodiments, the nanoparticle is conjugated to a biocompatible agent selected from casein, bovine serum albumin, nitriloacetic acid, carboxylate, and R-hydroxy carboxylate ions such as citric, gluconic, or oleic acid. In embodiments, the nanoparticle is conjugated to a biocompatible agent comprising casein. In embodiments, the nanoparticle is conjugated to a biocompatible agent comprising bovine serum albumin. In embodiments, the nanoparticles is conjugated to a biocompatible agent comprising nitriloacetic acid. In embodiments, the nanoparticle is conjugated to a biocompatible agent comprising carboxylate. In embodiments, the nanoparticle is conjugated to a biocompatible agent comprising citric acid. In embodiments, the nanoparticle is conjugated to a biocompatible agent comprising gluconic acid. In embodiments, the nanoparticle is conjugated to a biocompatible agent comprising oleic acid.

In embodiments, the nanodisc is conjugated to a biocompatible agent selected from casein, bovine serum albumin, nitriloacetic acid, carboxylate, and R-hydroxy carboxylate ions such as citric, gluconic, or oleic acid. In embodiments, the nanodisc is conjugated to a biocompatible agent comprising casein. In embodiments, the nanodisc is conjugated to a biocompatible agent comprising bovine serum albumin. In embodiments, the nanodisc is conjugated to a biocompatible agent comprising nitriloacetic acid. In embodiments, the nanodisc is conjugated to a biocompatible agent comprising carboxylate. In embodiments, the nanodisc is conjugated to a biocompatible agent comprising citric acid. In embodiments, the nanodisc is conjugated to a biocompatible agent comprising gluconic acid. In embodiments, the nanodisc is conjugated to a biocompatible agent comprising oleic acid.

In embodiments, the nanodisc is conjugated to a biocompatible agent and further conjugated to a target-binding moiety capable of binding a target. In embodiments, target-binding moiety capable of binding a target is selected from an antibody, aptamer, lectin, and fusion protein. In embodiments, target-binding moiety capable of binding a target is comprises an antibody. In embodiments, target-binding moiety capable of binding a target is comprises an aptamer. In embodiments, target-binding moiety capable of binding a target is comprises a lectin. In embodiments, target-binding moiety capable of binding a target is comprises a fusion protein.

In embodiments, the target to which a target-binding moiety binds is selected from a cancer cell, pathogen, fat cell, and atherosclerotic plaque. In embodiments, the target to which a target-binding moiety binds comprises a cancer cell. In embodiments, the target to which a target-binding moiety binds comprises a pathogen. In embodiments, the target to which a target-binding moiety binds comprises a fat cell. In embodiments, the target to which a target-binding moiety binds comprises an atherosclerotic plaque. In embodiments, the target to which a target-binding moiety binds comprises an atherosclerotic plaque that comprises fat, cholesterol, calcium, and/or other blood components.

In embodiments, provided herein is a biocompatible magnetizeable nanoparticle, wherein the particle is disc shaped, has a diameter of about 10 to about 300 nanometers, comprises iron oxide, and is conjugated to a target-binding moiety capable of binding a target. In specific embodiments, the magnetizeable nanoparticle comprises iron oxide, is disc shaped, has a diameter of about 10 to about 300 nanometers, comprises casein and is conjugated to an antibody. In specific embodiments, the magnetizeable nanoparticle comprises iron oxide, is disc shaped, has a diameter of about 10 to about 300 nanometers, comprises casein and is conjugated to an aptamer. In specific embodiments, the magnetizeable nanoparticle comprises iron oxide, is disc shaped, has a diameter of about 10 to about 300 nanometers, comprises casein and is conjugated to an antibody capable of binding a cancer cell. In specific embodiments, the magnetizeable nanoparticle comprises iron oxide, is disc shaped, has a diameter of about 10 to about 300 nanometers, comprises casein and is conjugated to an aptamer capable of binding a cancer cell. In specific embodiments, the magnetizeable nanoparticle comprises iron oxide, is disc shaped, has a diameter of about 10 to about 300 nanometers, comprises casein and is conjugated to an antibody capable of binding a fat cell. In specific embodiments, the magnetizeable nanoparticle comprises iron oxide, is disc shaped, has a diameter of about 10 to about 300 nanometers, comprises casein and is conjugated to an aptamer capable of binding a fat cell. In specific embodiments, the magnetizeable nanoparticle comprises iron oxide, is disc shaped, has a diameter of about 10 to about 300 nanometers, comprises casein and is conjugated to an antibody capable of binding an atherosclerotic plaque. In specific embodiments, the magnetizeable nanoparticle comprises iron oxide, is disc shaped, has a diameter of about 10 to about 300 nanometers, comprises casein and is conjugated to an aptamer capable of binding an atherosclerotic plaque.

In embodiments, provided herein is a biocompatible magnetizeable nanoparticle, wherein the particle is disc shaped, has a diameter of about 10 to about 300 nanometers, comprises iron oxide, and is conjugated to a target-binding moiety capable of binding a target. In specific embodiments, the magnetizeable nanoparticle comprises iron oxide, is disc shaped, has a diameter of about 10 to about 300 nanometers, comprises bovine serum albumin and is conjugated to an antibody. In specific embodiments, the magnetizeable nanoparticle comprises iron oxide, is disc shaped, has a diameter of about 10 to about 300 nanometers, comprises bovine serum albumin and is conjugated to an aptamer. In specific embodiments, the magnetizeable nanoparticle comprises iron oxide, is disc shaped, has a diameter of about 10 to about 300 nanometers, comprises bovine serum albumin and is conjugated to an antibody capable of binding a cancer cell. In specific embodiments, the magnetizeable nanoparticle comprises iron oxide, is disc shaped, has a diameter of about 10 to about 300 nanometers, comprises bovine serum albumin and is conjugated to an aptamer capable of binding a cancer cell. In specific embodiments, the magnetizeable nanoparticle comprises iron oxide, is disc shaped, has a diameter of about 10 to about 300 nanometers, comprises bovine serum albumin and is conjugated to an antibody capable of binding a fat cell. In specific embodiments, the magnetizeable nanoparticle comprises iron oxide, is disc shaped, has a diameter of about 10 to about 300 nanometers, comprises bovine serum albumin and is conjugated to an aptamer capable of binding a fat cell. In specific embodiments, the magnetizeable nanoparticle comprises iron oxide, is disc shaped, has a diameter of about 10 to about 300 nanometers, comprises bovine serum albumin and is conjugated to an antibody capable of binding an atherosclerotic plaque. In specific embodiments, the magnetizeable nanoparticle comprises iron oxide, is disc shaped, has a diameter of about 10 to about 300 nanometers, comprises bovine serum albumin and is conjugated to an aptamer capable of binding an atherosclerotic plaque.

In embodiments, provided herein is a biocompatible magnetizeable nanodisc, wherein the nanodisc has a diameter of about 20 to about 150 nanometers, comprises iron oxide, and is conjugated to a target-binding moiety capable of binding a target. In specific embodiments, the magnetizeable nanodisc comprises iron oxide, has a diameter of about 20 to about 150 nanometers, comprises casein and is conjugated to an antibody. In specific embodiments, the magnetizeable nanodisc comprises iron oxide, has a diameter of about 20 to about 150 nanometers, comprises casein and is conjugated to an aptamer. In specific embodiments, the magnetizeable nanodisc comprises iron oxide, has a diameter of about 20 to about 150 nanometers, comprises casein and is conjugated to an antibody capable of binding a cancer cell. In specific embodiments, the magnetizeable nanodisc comprises iron oxide, has a diameter of about 20 to about 150 nanometers, comprises casein and is conjugated to an aptamer capable of binding a cancer cell. In specific embodiments, the magnetizeable nanodisc comprises iron oxide, has a diameter of about 20 to about 150 nanometers, comprises casein and is conjugated to an antibody capable of binding a fat cell. In specific embodiments, the magnetizeable nanodisc comprises iron oxide, has a diameter of about 20 to about 150 nanometers, comprises casein and is conjugated to an aptamer capable of binding a fat cell. In specific embodiments, the magnetizeable nanodisc comprises iron oxide, i has a diameter of about 20 to about 150 nanometers, comprises casein and is conjugated to an antibody capable of binding an atherosclerotic plaque. In specific embodiments, the magnetizeable nanodisc comprises iron oxide, has a diameter of about 20 to about 150 nanometers, comprises casein and is conjugated to an aptamer capable of binding an atherosclerotic plaque.

In embodiments, provided herein is a biocompatible magnetizeable nanodisc, wherein the nanodisc has a diameter of about 20 to about 150 nanometers, comprises iron oxide, and is conjugated to a target-binding moiety capable of binding a target. In specific embodiments, the magnetizeable nanodisc comprises iron oxide, has a diameter of about 20 to about 150 nanometers, comprises bovine serum albumin and is conjugated to an antibody. In specific embodiments, the magnetizeable nanodisc comprises iron oxide, has a diameter of about 20 to about 150 nanometers, comprises bovine serum albumin and is conjugated to an aptamer. In specific embodiments, the magnetizeable nanodisc comprises iron oxide, has a diameter of about 20 to about 150 nanometers, comprises bovine serum albumin and is conjugated to an antibody capable of binding a cancer cell. In specific embodiments, the magnetizeable nanodisc comprises iron oxide, has a diameter of about 20 to about 150 nanometers, comprises bovine serum albumin and is conjugated to an aptamer capable of binding a cancer cell. In specific embodiments, the magnetizeable nanodisc comprises iron oxide, is disc shaped, has a diameter of about 20 to about 150 nanometers, comprises bovine serum albumin and is conjugated to an antibody capable of binding a fat cell. In specific embodiments, the magnetizeable nanodisc comprises iron oxide, is disc shaped, has a diameter of about 20 to about 150 nanometers, comprises bovine serum albumin and is conjugated to an aptamer capable of binding a fat cell. In specific embodiments, the magnetizeable nanodisc comprises iron oxide, has a diameter of about 20 to about 150 nanometers, comprises bovine serum albumin and is conjugated to an antibody capable of binding an atherosclerotic plaque. In specific embodiments, the magnetizeable nanodisc comprises iron oxide, has a diameter of about 20 to about 150 nanometers, comprises bovine serum albumin and is conjugated to an aptamer capable of binding an atherosclerotic plaque.

In embodiments, provided herein is a biocompatible magnetizeable nanodisc, wherein the nanodisc has a diameter of about 40 to about 70 nanometers, comprises iron oxide, and is conjugated to a target-binding moiety capable of binding a target. In specific embodiments, the magnetizeable nanodisc comprises iron oxide, has a diameter of about 40 to about 70 nanometers, comprises casein and is conjugated to an antibody. In specific embodiments, the magnetizeable nanodisc comprises iron oxide, has a diameter of about 40 to about 70 nanometers, comprises casein and is conjugated to an aptamer. In specific embodiments, the magnetizeable nanodisc comprises iron oxide, has a diameter of about 40 to about 70 nanometers, comprises casein and is conjugated to an antibody capable of binding a cancer cell. In specific embodiments, the magnetizeable nanodisc comprises iron oxide, has a diameter of about 40 to about 70 nanometers, comprises casein and is conjugated to an aptamer capable of binding a cancer cell. In specific embodiments, the magnetizeable nanodisc comprises iron oxide, has a diameter of about 40 to about 70 nanometers, comprises casein and is conjugated to an antibody capable of binding a fat cell. In specific embodiments, the magnetizeable nanodisc comprises iron oxide, has a diameter of about 40 to about 70 nanometers, comprises casein and is conjugated to an aptamer capable of binding a fat cell. In specific embodiments, the magnetizeable nanodisc comprises iron oxide, i has a diameter of about 240 to about 70 nanometers, comprises casein and is conjugated to an antibody capable of binding an atherosclerotic plaque. In specific embodiments, the magnetizeable nanodisc comprises iron oxide, has a diameter of about 40 to about 70 nanometers, comprises casein and is conjugated to an aptamer capable of binding an atherosclerotic plaque.

In embodiments, provided herein is a biocompatible magnetizeable nanodisc, wherein the nanodisc has a diameter of about 40 to about 70 nanometers, comprises iron oxide, and is conjugated to a target-binding moiety capable of binding a target. In specific embodiments, the magnetizeable nanodisc comprises iron oxide, has a diameter of about 40 to about 70 nanometers, comprises bovine serum albumin and is conjugated to an antibody. In specific embodiments, the magnetizeable nanodisc comprises iron oxide, has a diameter of about 40 to about 70 nanometers, comprises bovine serum albumin and is conjugated to an aptamer. In specific embodiments, the magnetizeable nanodisc comprises iron oxide, has a diameter of about 40 to about 70 nanometers, comprises bovine serum albumin and is conjugated to an antibody capable of binding a cancer cell. In specific embodiments, the magnetizeable nanodisc comprises iron oxide, has a diameter of about 40 to about 70 nanometers, comprises bovine serum albumin and is conjugated to an aptamer capable of binding a cancer cell. In specific embodiments, the magnetizeable nanodisc comprises iron oxide, is disc shaped, has a diameter of about 40 to about 70 nanometers, comprises bovine serum albumin and is conjugated to an antibody capable of binding a fat cell. In specific embodiments, the magnetizeable nanodisc comprises iron oxide, is disc shaped, has a diameter of about 40 to about 70 nanometers, comprises bovine serum albumin and is conjugated to an aptamer capable of binding a fat cell. In specific embodiments, the magnetizeable nanodisc comprises iron oxide, has a diameter of about 40 to about 70 nanometers, comprises bovine serum albumin and is conjugated to an antibody capable of binding an atherosclerotic plaque. In specific embodiments, the magnetizeable nanodisc comprises iron oxide, has a diameter of about 40 to about 70 nanometers, comprises bovine serum albumin and is conjugated to an aptamer capable of binding an atherosclerotic plaque.

Target-Binding Moiety

The nanoparticles and nanodiscs provided herein can be directed to relevant sites by the addition of particular target-binding moiety (also referred to as a target-binding agent). These target-binding moieties bind specific ligands on the target cell or specific components of a target lesion. The target-binding moiety enables targeting of the nanoparticles to the site requiring ablation. Target-binding moiety can include but are not limited to antibodies lectins, fusion proteins, and aptamers. Appropriate antibodies would be those that, for instance, bind to molecules preferentially expressed on cancer cells or bacterial/viral infected cells. Appropriate aptamers would be those that, for instance, have a conformational structure that enabled preferential binding to particular pathogens, cancer cells, tumor cells, cells infected with a pathogen, or particular tissue types.

In embodiments provided herein, the nanoparticles are conjugated to target binding moieties, which can act as address tags, to direct the nanoparticles to specific sites within the body, specific organelles within the cell, or to follow specifically the movement of individual protein or RNA molecules in living cells. Common address tags are monoclonal antibodies, aptamers, streptavidin or peptides. These targeting moiety may be covalently linked or conjugated to the nanoparticle and may be present in a controlled number per nanoparticle. Multivalent nanoparticles, bearing multiple targeting groups, can cluster receptors, which can activate cellular signaling pathways, and give stronger anchoring.

In embodiments, the magnetizable nanoparticle is conjugated to a target-binding moiety capable of binding a target. Target-binding moiety enable the magnetizable nanoparticle to bind to appropriate target cells such as cancer cells, pathogens, and/or fat cells. In embodiments, the target-binding moiety is an antibody, antibody fragment, or aptamer. In embodiments, the target-binding moiety binds a ligand on a target cell or a component of a target lesion. In embodiments, the magnetizable nanoparticle is conjugated to a target-binding moiety that binds a single ligand. In embodiments, the magnetizable nanoparticle is conjugated to a target-binding moiety that binds a plurality of distinct ligands. In embodiments, the magnetizable nanoparticle is conjugated to a plurality of distinct target-binding moieties that binds a plurality of distinct ligands. In embodiments, the target-binding moiety an antibody. In embodiments, the target-binding moiety is an HL-60 antibody and the ligand is HL-60 on a cancer cell.

In embodiments, the magnetizable nanoparticle is conjugated to a target-binding moiety capable of binding a target cell through binding a ligand on a target. In embodiments, the target is selected from a cancer cell, a pathogen, a fat cell, and atherosclerotic plaque. In embodiments, the target is a cancer cell. In embodiments, the ligand is a cancer cell marker. In embodiments, the cancer cell is a leukemia cell. In embodiments, the ligand is a leukemia cell marker. In embodiments, the cancer cell is a lymphoma cell. In embodiments, the ligand is a lymphoma cell marker. In embodiments, the target is an atherosclerotic plaque. In embodiments, the ligand is a. atherosclerotic plaque component. In embodiments, the target cell is a fat cell. In embodiments, the ligand is a fat cell marker.

Ligands on target cells include but are not limited to antigens, antibodies, nucleic acids, and aptamers.

Targets include but are not limited to bacteria, viruses, fat cells, tumor cells, and atherosclerotic plaque.

In embodiments, the magnetizable nanoparticle is conjugated to a target-binding moiety capable of binding a B-cell surface marker selected from CD28, CD38, CD69, CD80, CD83, CD86, DPP4, FCER2, IL2RA, TNFRSF8, CD70 (TNFSF7), CD19, CD22, CD24, CD37, CD40, CD72, CD74, CD79A, CD79B, CR2, IL1R2, ITGA2, ITGA3, MS4A1, ST6GAL1, CD1C, CHST10, HLA-A, HLA-DRA, and NT5E. In embodiments, the magnetizable nanoparticle is conjugated to an antibody capable of binding a B-cell surface marker selected from CD28, CD38, CD69, CD80, CD83, CD86, DPP4, FCER2, IL2RA, TNFRSF8, CD70 (TNFSF7), CD19, CD22, CD24, CD37, CD40, CD72, CD74, CD79A, CD79B, CR2, IL1R2, ITGA2, ITGA3, MS4A1, ST6GAL1, CD1C, CHST10, HLA-A, HLA-DRA, and NT5E. In embodiments, the magnetizable nanoparticle is conjugated to an aptamer capable of binding a B-cell surface marker selected from CD28, CD38, CD69, CD80, CD83, CD86, DPP4, FCER2, IL2RA, TNFRSF8, CD70 (TNFSF7), CD19, CD22, CD24, CD37, CD40, CD72, CD74, CD79A, CD79B, CR2, IL1R2, ITGA2, ITGA3, MS4A1, ST6GAL1, CD1C, CHST10, HLA-A, HLA-DRA, and NT5E.

In embodiments, the magnetizable nanoparticle is conjugated to a target-binding moiety capable of binding a T-cell surface marker selected from CD8A, CD8B1, CD4, ALCAM, CD2, CD38, CD40LG, CD69, CD83, CD96, CTLA4, DPP4, HLA-DRA, IL12RB1, IL2RA, ITGA1, TNFRSF4, TNFRSF8, CD70 (TNFSF7), CD160, CD28, CD37, CD3D, CD3G, CD3Z, CD5, CD6, CD7, FAS, KLRB1, KLRD1, NT5E, and ST6GAL1. In embodiments, the magnetizable nanoparticle is conjugated to an antibody capable of binding a T-cell surface marker selected from CD8A, CD8B1, CD4, ALCAM, CD2, CD38, CD40LG, CD69, CD83, CD96, CTLA4, DPP4, HLA-DRA, IL12RB1, IL2RA, ITGA1, TNFRSF4, TNFRSF8, CD70 (TNFSF7), CD160, CD28, CD37, CD3D, CD3G, CD3Z, CD5, CD6, CD7, FAS, KLRB1, KLRD1, NT5E, and ST6GAL1. In embodiments, the magnetizable nanoparticle is conjugated to an aptamercapable of binding a T-cell surface marker selected from CD8A, CD8B1, CD4, ALCAM, CD2, CD38, CD40LG, CD69, CD83, CD96, CTLA4, DPP4, HLA-DRA, IL12RB1, IL2RA, ITGA1, TNFRSF4, TNFRSF8, CD70 (TNFSF7), CD160, CD28, CD37, CD3D, CD3G, CD3Z, CD5, CD6, CD7, FAS, KLRB1, KLRD1, NT5E, and ST6GAL1.

In embodiments, the magnetizable nanoparticle is conjugated to a target-binding moiety capable of binding a Natural Killer (NK) cell surface marker selected from CD2, CD244, CD3Z, CD7, CD96, CHST10, IL12RB1, KLRB1, KLRC1, KLRD1, and NCAM1. In embodiments, the magnetizable nanoparticle is conjugated to an antibody capable of binding a Natural Killer (NK) cell surface marker selected from CD2, CD244, CD3Z, CD7, CD96, CHST10, IL12RB1, KLRB1, KLRC1, KLRD1, and NCAM1. In embodiments, the magnetizable nanoparticle is conjugated to an aptamer capable of binding a Natural Killer (NK) cell surface marker selected from CD2, CD244, CD3Z, CD7, CD96, CHST10, IL12RB1, KLRB1, KLRC1, KLRD1, and NCAM1.

In embodiments, the magnetizable nanoparticle is conjugated to a target-binding moiety capable of binding a monocyte or macrophage cell surface marker selected from CD69, ENG, FCER2, IL2RA, C5R1, CD163, CD40, CD63, CD74, CD86, CHST10, CSF1R, DPP4, FCGR1A, HLA-DRA, ICAM2, IL1R2, ITGA1, ITGA2, S100A8, TNFRSF8, and CD70 (TNFSF7). In embodiments, the magnetizable nanoparticle is conjugated to an antibody capable of binding a monocyte or macrophage cell surface marker selected from CD69, ENG, FCER2, IL2RA, C5R1, CD163, CD40, CD63, CD74, CD86, CHST10, CSF1R, DPP4, FCGR1A, HLA-DRA, ICAM2, IL1R2, ITGA1, ITGA2, S100A8, TNFRSF8, and CD70 (TNFSF7). In embodiments, the magnetizable nanoparticle is conjugated to an aptamer capable of binding a monocyte or macrophage cell surface marker selected from CD69, ENG, FCER2, IL2RA, C5R1, CD163, CD40, CD63, CD74, CD86, CHST10, CSF1R, DPP4, FCGR1A, HLA-DRA, ICAM2, IL1R2, ITGA1, ITGA2, S100A8, TNFRSF8, and CD70 (TNFSF7). 1.

In embodiments, the magnetizable nanoparticle is conjugated to a target-binding moiety capable of binding an endothelial cell surface markers selected from ENG, ICAM2, NOS3, PECAM1, SELP, VCAM1, and VWF. In embodiments, the magnetizable nanoparticle is conjugated to an antibody capable of binding an endothelial cell surface markers selected from ENG, ICAM2, NOS3, PECAM1, SELP, VCAM1, and VWF. In embodiments, the magnetizable nanoparticle is conjugated to an aptamer capable of binding an endothelial cell surface markers selected from ENG, ICAM2, NOS3, PECAM1, SELP, VCAM1, and VWF.

In embodiments, the magnetizable nanoparticle is conjugated to a target-binding moiety capable of binding a smooth muscle cell surface markers selected from MYH10, MYH9, and MYOCD. In embodiments, the magnetizable nanoparticle is conjugated to an antibody capable of binding a smooth muscle cell surface markers selected from MYH10, MYH9, and MYOCD. In embodiments, the magnetizable nanoparticle is conjugated to an aptamer capable of binding a smooth muscle cell surface markers selected from MYH10, MYH9, and MYOCD.

In embodiments, the magnetizable nanoparticle is conjugated to a target-binding moiety capable of binding a dendritic cell surface marker selected from CD1A, CD209, CD40, CD83, CD86, CR2, and FCER2. In embodiments, the magnetizable nanoparticle is conjugated to an antibody capable of binding a dendritic cell surface marker selected from CD1A, CD209, CD40, CD83, CD86, CR2, and FCER2. In embodiments, the magnetizable nanoparticle is conjugated to an aptamer capable of binding a dendritic cell surface marker selected from CD1A, CD209, CD40, CD83, CD86, CR2, and FCER2.

In embodiments, the magnetizable nanoparticle is conjugated to a target-binding moiety capable of binding a mast cell surface marker selected from C5R1, FCER1A, FCER2, and TPSAB1. In embodiments, the magnetizable nanoparticle is conjugated to an antibody capable of binding a mast cell surface marker selected from C5R1, FCER1A, FCER2, and TPSAB1. In embodiments, the magnetizable nanoparticle is conjugated to an aptamer capable of binding a mast cell surface marker selected from C5R1, FCER1A, FCER2, and TPSAB1.

In embodiments, the magnetizable nanoparticle is conjugated to a target-binding moiety capable of binding a fibroblast (Stromal) surface marker selected from ALCAM, COL1A1, and COL1A2. In embodiments, the magnetizable nanoparticle is conjugated to an antibody capable of binding a fibroblast (Stromal) surface marker selected from ALCAM, COL1A1, and COL1A2. In embodiments, the magnetizable nanoparticle is conjugated to an aptamer capable of binding a fibroblast (Stromal) surface marker selected from ALCAM, COL1A1, and COL1A2.

In embodiments, the magnetizable nanoparticle is conjugated to a target-binding moiety capable of binding an epithelial cell surface marker selected from CD1D, KRT18, KRT5, KRT8, and TACSTD1. In embodiments, the magnetizable nanoparticle is conjugated to an antibody capable of binding an epithelial cell surface marker selected from CD1D, KRT18, KRT5, KRT8, and TACSTD1. In embodiments, the magnetizable nanoparticle is conjugated to an aptamer capable of binding an epithelial cell surface marker selected from CD1D, KRT18, KRT5, KRT8, and TACSTD1.

In embodiments, the magnetizable nanoparticle is conjugated to a target-binding moiety capable of binding an adipocyte surface marker such as RETN. In embodiments, the magnetizable nanoparticle is conjugated to an antibody capable of binding the adipocyte surface marker RETN. In embodiments, the magnetizable nanoparticle is conjugated to an aptamer capable of binding an adipocyte surface marker RETN.

In embodiments, the magnetizable nanoparticle is conjugated to a target-binding moiety capable of binding a cancer markers selected from HL60 cell marker, CD44v, MCA, CEA, CA19-9, HER2/neu, CA-15-3, CA-125, AFP, and PSA. In embodiments, the magnetizable nanoparticle is conjugated to an antibody capable of binding a cancer markers selected from HL60 cell marker, CD44v, MCA, CEA, CA19-9, HER2/neu, CA-15-3, CA-125, AFP, and PSA. In embodiments, the magnetizable nanoparticle is conjugated to an aptamer capable of binding a cancer markers selected from HL60 cell marker, CD44v, MCA, CEA, CA19-9, HER2/neu, CA-15-3, CA-125, AFP, and PSA.

In specific embodiments, provided herein is a biocompatible magnetizeable nanodisc comprising iron oxide, where the nanodisc has a diameter of about 20 to about 150 nanometers, comprises casein and is conjugated to an anti-HL60 antibody capable of binding a cancer cell comprising HL60 ligand. In specific embodiments, is a biocompatible magnetizeable nanodisc comprising iron oxide, where the nanodisc has a diameter of about 20 to about 150 nanometers, comprises casein and is conjugated to an anti-HL60 aptamer capable of binding a cancer cell comprising HL60 ligand.

In specific embodiments, provided herein is a biocompatible magnetizeable nanodisc comprising iron oxide, where the nanodisc has a diameter of about 20 to about 150 nanometers, comprises casein and is conjugated to an anti-RETN antibody capable of binding an adipocyte comprising RETN. In specific embodiments, provided herein is a biocompatible magnetizeable nanodisc comprising iron oxide, where the nanodisc has a diameter of about 20 to about 150 nanometers, comprises casein and is conjugated to an anti-RETN aptamer capable of binding an adipocyte comprising RETN.

Specific cell markers for any variety of tissues and physiological systems are well known in the art. Such markers can be used with the biocompatible magnetizeable nanoparticles of the present disclosure.

Methods of Manufacture

In an aspect, provided herein are methods of manufacturing a biocompatible magnetizeable nanoparticle including (i) combining iron oxide powder with water, a biocompatible agent, and a buffer until an immiscible solution of about $Fe_2O_3$ is formed; (ii) adjusting pH to about 10; (iii) adding a target-binding moiety under conditions sufficient for the target-binding moiety to conjugate to the nanoparticle and to form a solution; and (iv) spray drying the solution to form a nanoparticle with a diameter (or a plurality of nanoparticles having an average diameter) of about 10 to about 300 nanometers.

In embodiments, methods of manufacturing a biocompatible magnetizeable nanoparticle includes controlling particle size. Particle size may be controlled by very short nucleation period. Adjusting the nucleation period may be accomplished by adjusting pH to alkaline, by maintaining the temperature range of 20° C. to 22° C., maintaining the concentration of $Fe^{2+}$ to $Fe^{3+}$ in a 1:2 ratio, using salts such as percholates, chlorides, sulfates, and nitrates, and/or controlling ionic strength of the solutions. In embodiments, the nucleation period may be controlled by adjusting the production reaction pH to alkaline. In embodiments, the nucleation period may be controlled by maintaining the temperature range of 20° C. to 22° C. In embodiments, the nucleation period may be controlled by maintaining the concentration of $Fe^{2+}$ to $Fe^{3+}$ in a 1:2 ratio. In embodiments, the nucleation period may be controlled by using salts such as percholates, chlorides, sulfates, and nitrates. In embodiments, the nucleation period may be controlled by controlling ionic strength.

In embodiments, methods of manufacturing a biocompatible magnetizeable nanoparticle includes combining iron oxide powder with water, casein, and a buffer until an immiscible solution of 5% $Fe_2O_3$ is formed. In embodiments, ferrous and ferric salts are combined in an aqueous medium The chemical reaction is as follows:

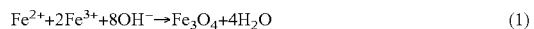  (1)

Magnetite is transformed into maghemite ($yFe_2O_3$) in the presence of oxygen according to the following formulation.

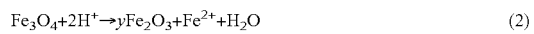  (2)

In specific embodiments of the method of manufacture, a solution of iron oxide powder (nanoparticles) in water and casein in 1×PBS (phosphate buffered saline) may be prepared and mixed. In embodiments, the solution of iron oxide powder (nanoparticles) in water is a 1-10% solution of $Fe_2O_3$. In embodiments, the solution of iron oxide powder (nanoparticles) in water is a 1% solution of $Fe_2O_3$. In embodiments, the solution of iron oxide powder (nanoparticles) in water is a 2% solution of $Fe_2O_3$. In embodiments, the solution of iron oxide powder (nanoparticles) in water is a 3% solution of $Fe_2O_3$. In embodiments, the solution of iron oxide powder (nanoparticles) in water is a 4% solution of $Fe_2O_3$. In embodiments, the solution of iron oxide powder (nanoparticles) in water is a 5% solution of $Fe_2O_3$. In embodiments, the solution of iron oxide powder (nanoparticles) in water is a 6% solution of $Fe_2O_3$. In embodiments, the solution of iron oxide powder (nanoparticles) in water is a 7% solution of $Fe_2O_3$. In embodiments, the solution of iron oxide powder (nanoparticles) in water is a 8% solution of $Fe_2O_3$. In embodiments, the solution of iron oxide powder (nanoparticles) in water is a 9% solution of $Fe_2O_3$. In embodiments, the solution of iron oxide powder (nanoparticles) in water is a 10% solution of $Fe_2O_3$. In embodiments, the solution of iron oxide may be totally immiscible. In embodiment, the water is Millipore water. In embodiments, the solution of iron oxide is mixed until there is even distribution of the powder to form an evenly-mixed solution.

In embodiments, methods of manufacturing a biocompatible magnetizeable nanoparticle include combining mixing ferrous and ferric salts in an aqueous medium, and transforming magnetite to maghemite in the presence of oxygen. The methods include maintaining the reaction temperature at about 20° C. to about 30° C. The methods include maintaining the reaction temperature at about 20° C. to about 25°

C. The methods include maintaining the reaction temperature at about 20° C. to about 22° C. The methods include maintaining the reaction temperature at about 20° C. The methods include maintaining the reaction temperature at about 21° C. The methods include maintaining the reaction temperature at about 22° C. The methods include maintaining the reaction temperature at about 23° C. The methods include maintaining the reaction temperature at about 24° C. The methods include maintaining the reaction temperature at about 25° C. The methods include maintaining the reaction temperature at about 26° C. The methods include maintaining the reaction temperature at about 27° C. The methods include maintaining the reaction temperature at about 28° C. The methods include maintaining the reaction temperature at about 29° C. The methods include maintaining the reaction temperature at about 30° C.

In embodiments, methods of manufacturing a biocompatible magnetizeable nanoparticle include maintaining the $Fe^{2+}$ to $Fe^{3+}$ concentration at a ratio of 1:2.

In specific embodiments of the method of manufacture, a solution of casein in a buffer is prepared. In embodiments, the solution of casein in a buffer is a 1-20% casein solution. In embodiments, the solution of casein in a buffer is a 1% casein solution. In embodiments, the solution of casein in a buffer is a 2% casein solution. In embodiments, the solution of casein in a buffer is a 3% casein solution. In embodiments, the solution of casein in a buffer is a 4% casein solution. In embodiments, the solution of casein in a buffer is a 5% casein solution. In embodiments, the solution of casein in a buffer is a 6% casein solution. In embodiments, the solution of casein in a buffer is a 7% casein solution. In embodiments, the solution of casein in a buffer is an 8% casein solution. In embodiments, the solution of casein in a buffer is a 9% casein solution. In embodiments, the solution of casein in a buffer is a 10% casein solution. In embodiments, the solution of casein in a buffer is an 11% casein solution. In embodiments, the solution of casein in a buffer is a 12% casein solution. In embodiments, the solution of casein in a buffer is a 13% casein solution. In embodiments, the solution of casein in a buffer is a 14% casein solution. In embodiments, the solution of casein in a buffer is a 15% casein solution. In embodiments, the solution of casein in a buffer is a 16% casein solution. In embodiments, the solution of casein in a buffer is a 17% casein solution. In embodiments, the solution of casein in a buffer is an 18% casein solution. In embodiments, the solution of casein in a buffer is a 19% casein solution. In embodiments, the solution of casein in a buffer is a 20% casein solution. In embodiments, the solution of casein in a PBS buffer. In embodiments, the solution of casein in a 1×PBS buffer. In embodiments, the casein solution is immiscible.

In specific embodiments of the method of manufacture, a solution of bovine serum albumin (BSA) in a buffer is prepared. In embodiments, the solution of bovine serum albumin in a buffer is a 1-20% bovine serum albumin solution. In embodiments, the solution of BSA in a buffer is a 1% BSA solution. In embodiments, the solution of bovine serum albumin in a buffer is a 2% BSA solution. In embodiments, the solution of BSA in a buffer is a 3% BSA solution. In embodiments, the solution of BSA in a buffer is a 4% BSA solution. In embodiments, the solution of BSA in a buffer is a 5% BSA solution. In embodiments, the solution of BSA in a buffer is a 6% BSA solution. In embodiments, the solution of BSA in a buffer is a 7% BSA solution. In embodiments, the solution of BSA in a buffer is an 8% BSA solution. In embodiments, the solution of BSA in a buffer is a 9% BSA solution. In embodiments, the solution of BSA in a buffer is a 10% BSA solution. In embodiments, the solution of BSA in a buffer is an 11% BSA solution. In embodiments, the solution of BSA in a buffer is a 12% BSA solution. In embodiments, the solution of BSA in a buffer is a 13% BSA solution. In embodiments, the solution of BSA in a buffer is a 14% BSA solution. In embodiments, the solution of BSA in a buffer is a 15% BSA solution. In embodiments, the solution of BSA in a buffer is a 16% BSA solution. In embodiments, the solution of BSA in a buffer is a 17% BSA solution. In embodiments, the solution of BSA in a buffer is an 18% BSA solution. In embodiments, the solution of BSA in a buffer is a 19% BSA solution. In embodiments, the solution of BSA in a buffer is a 20% BSA solution. In embodiments, the solution of c BSA in a PBS buffer. In embodiments, the solution of BSA in a 1×PBS buffer.

In specific embodiments of the method of manufacture, a solution of iron oxide powder (nanoparticles) in water and casein in 1×PBS (phosphate buffered saline) may be prepared and mixed. In specific embodiments of the method of manufacture, a 5% solution of iron oxide powder (nanoparticles) in water and a solution of 10% casein in 1×PBS (phosphate buffered saline) may be prepared and mixed. In embodiments, the pH of the iron oxide/casein mixture is adjusted to abouafter adding base (NaOH), the pH is adjusted. Biological pH may be reached by addition of Tris HCl. In embodiments, a solution of iron oxide nanoparticles and casein is produced.

In specific embodiments of the method of manufacture, a solution of iron oxide powder (nanoparticles) in water and bovine serum albumin in 1×PBS (phosphate buffered saline) may be prepared and mixed. In specific embodiments of the method of manufacture, a 5% solution of iron oxide powder (nanoparticles) in water and a solution of 10% BSA in 1×PBS (phosphate buffered saline) may be prepared and mixed. In embodiments, the pH of the iron oxide/BSA mixture is adjusted to abouafter adding base (NaOH), the pH is adjusted. Biological pH may be reached by addition of Tris HCl. In embodiments, a solution of iron oxide nanoparticles and BSA is produced In embodiments, methods of manufacturing a biocompatible magnetizeable nanoparticle includes adjusting the pH of the chemical reaction to about 10. In embodiments, the pH of the reaction is shifted from 9 to about 9.9, to about 10, to about 10.1, to about 10.2, to about 10.3, to about 10.4, to about 10.5 by adding acid or base. In embodiments, the pH of the reaction is shifted from 9 to about 9.9 by adding acid or base. In embodiments, the pH of the reaction is shifted from 9 to about 10.0 by adding acid or base. In embodiments, the pH of the reaction is shifted from 9 to about 10.1 by adding acid or base. In embodiments, the pH of the reaction is shifted from 9 to about 10.2 by adding acid or base. In embodiments, the pH of the reaction is shifted from 9 to about 10.3 by adding acid or base. In embodiments, the pH of the reaction is shifted from 9 to about 10.4 by adding acid or base. In embodiments, the pH of the reaction is shifted from 9 to about 10.5 by adding acid or base.

In embodiments, provided herein are methods of manufacturing a biocompatible magnetizeable nanoparticle including adding a target-binding moiety under conditions sufficient for the target-binding moiety to conjugate to the nanoparticle. In embodiments, a target-binding moiety is added to a solution of iron oxide nanoparticles and casein. In embodiments, a target-binding moiety comprising an antibody is added to a solution of iron oxide nanoparticles and casein. In embodiments, a target-binding moiety comprising an aptamer is added to a solution of iron oxide nanoparticles and casein. In embodiments, an anti-cancer cell antibody is added to a solution of iron oxide nanoparticles and casein. In embodiments, anti-HL60 antibody is added to a solution of iron oxide nanoparticles and casein. In embodiments, an anti-cancer cell aptamer is added to a solution of iron oxide nanoparticles and casein. In embodiments, an anti-HL60 aptamer is added to a solution of iron oxide nanoparticles and casein. In embodiments, an anti-adipocyte antibody is added to a solution of iron oxide nanoparticles and casein. In embodiments, an anti-RETN antibody is added to a solution of iron oxide nanoparticles and casein. In embodiments, an anti-adipocyte aptamer is added to a solution of iron oxide nanoparticles and casein. In embodiments, an anti-RETN aptamer is added to a solution of iron oxide nanoparticles and casein.

In embodiments, provided herein are methods of manufacturing a biocompatible magnetizeable nanoparticle including adding a target-binding moiety under conditions sufficient for the target-binding moiety to conjugate to the nanoparticle. In embodiments, a target-binding moiety is added to a solution of iron oxide nanoparticles and bovine serum albumin (BSA). In embodiments, a target-binding moiety comprising an antibody is added to a solution of iron oxide nanoparticles and BSA. In embodiments, a target-binding moiety comprising an aptamer is added to a solution of iron oxide nanoparticles and BSA. In embodiments, an anti-cancer cell antibody is added to a solution of iron oxide nanoparticles and BSA. In embodiments, anti-HL60 antibody is added to a solution of iron oxide nanoparticles and BSA. In embodiments, an anti-cancer cell aptamer is added to a solution of iron oxide nanoparticles and BSA. In embodiments, an anti-HL60 aptamer is added to a solution of iron oxide nanoparticles and BSA. In embodiments, an anti-adipocyte antibody is added to a solution of iron oxide nanoparticles and BSA. In embodiments, an anti-RETN antibody is added to a solution of iron oxide nanoparticles and BSA. In embodiments, an anti-adipocyte aptamer is added to a solution of iron oxide nanoparticles and casein. In embodiments, an anti-RETN aptamer is added to a solution of iron oxide nanoparticles and casein.

In embodiments, provided herein are methods of manufacturing a biocompatible magnetizeable nanoparticle including using an electrospray apparatus to spray dry a solution comprising iron oxide nanoparticles, biocompatible agent, and a target-binding moiety capable of binding a target, to form nanodiscs. The solution is electrosprayed onto a shim with nano-sized disc-shaped apertures. After the solution is electrosprayed onto the shim, the magnetizeable nanodiscs may be lifted off or removed from the shim, thereby producing biocompatible magnetizeable nanodiscs comprising iron oxide, biocompatible agent such as casein or bovine serum antigen, and a target-binding moiety such as an antibody or aptamer.

In embodiments, provided herein are methods of manufacturing a biocompatible magnetizeable nanoparticle including using an electrospray apparatus to spray dry a solution comprising iron oxide nanoparticles, casein, and a target-binding moiety capable of binding a target, to form nanoparticles with a diameter of (or a plurality of nanoparticles having an average diameter of) about 10 to about 300 nanometers. In embodiments, provided herein are methods of manufacturing a biocompatible magnetizeable nanoparticle including spray drying a solution comprising iron oxide nanoparticles, casein, and a target-binding moiety capable of binding a target, to form nanoparticles with a diameter of (or a plurality of nanoparticles having an average diameter of) about 20 to about 150 nanometers. In embodiments, provided herein are methods of manufacturing a biocompatible magnetizeable nanoparticle including spray drying a solution comprising iron oxide nanoparticles, casein, and a target-binding moiety capable of binding a target, to form nanoparticles with a diameter of (or a plurality of nanoparticles having an average diameter of) about 40 to about 70 nanometers.

In embodiments, the methods of manufacturing a biocompatible magnetizeable nanoparticle produce a nanodisc comprising iron, casein, and an antibody, wherein the nanodisc has a diameter of about 10 to about 300 nanometers and wherein the antibody is capable of binding a cancer cell. In embodiments, the methods of manufacturing a biocompatible magnetizeable nanoparticle produce a nanodisc comprising iron, casein, and an antibody, wherein the nanodisc has a diameter of about 20 to about 150 nanometers and wherein the antibody is capable of binding a cancer cell. In embodiments, the methods of manufacturing a biocompatible magnetizeable nanoparticle produce a nanodisc comprising iron, casein, and an antibody, wherein the nanodisc has a diameter of about 40 to about 70 nanometers and wherein the antibody is capable of binding a cancer cell. In embodiments, the methods of manufacturing a biocompatible magnetizeable nanoparticle produce a nanodisc comprising iron, casein, and a HL-60 antibody, wherein the nanodisc has a diameter of about 10 to about 300 nanometers, and wherein the antibody is capable of binding a cancer cell. In embodiments, the methods of manufacturing a biocompatible magnetizeable nanoparticle produce a nanodisc comprising iron, casein, and a HL-60 antibody, wherein the nanodisc has a diameter of about 20 to about 150 nanometers and wherein the antibody is capable of a cancer cell. In embodiments, the methods of manufacturing a biocompatible magnetizeable nanoparticle produce a nanodisc comprising iron, casein, and a HL-60 antibody, wherein the nanodisc has a diameter of about 40 to about 70 nanometers and wherein the antibody is capable of binding a cancer cell.

In embodiments, the methods of manufacturing a biocompatible magnetizeable nanoparticle produce a nanodisc comprising iron, casein, and an aptamer, wherein the nanodisc has a diameter of about 10 to about 300 nanometers and wherein the aptamer is capable of binding a cancer cell. In embodiments, the methods of manufacturing a biocompatible magnetizeable nanoparticle produce a nanodisc comprising iron, casein, and an aptamer, wherein the nanodisc has a diameter of about 20 to about 150 nanometers and wherein the aptamer is capable of binding a cancer cell. In embodiments, the methods of manufacturing a biocompatible magnetizeable nanoparticle produce a nanodisc comprising iron, casein, and an aptamer, wherein the nanodisc has a diameter of about 40 to about 70 nanometers and wherein the aptamer is capable of binding a cancer cell. In embodiments, the methods of manufacturing a biocompatible magnetizeable nanoparticle produce a nanodisc comprising iron, casein, and an anti-HL-60 aptamer, wherein the nanodisc has a diameter of about 10 to about 300 nanometers, and wherein the aptamer is capable of binding a cancer cell. In embodiments, the methods of manufacturing a biocompatible magnetizeable nanoparticle produce a nanodisc comprising iron, casein, and an anti-HL-60 aptamer, wherein the nanodisc has a diameter of about 20 to about 150 nanometers and wherein the aptamer is capable of binding a cancer cell. In embodiments, the methods of manufacturing a biocompatible magnetizeable nanoparticle produce a nanodisc comprising iron, casein, and an anti HL-60 aptamer, wherein the nanodisc has a diameter of about 40 to about 70 nanometers and wherein the aptamer is capable of binding a cancer cell.

In embodiments, the methods of manufacturing a biocompatible magnetizeable nanoparticle produce a nanodisc comprising iron, casein, and an antibody, wherein the nanodisc has a diameter of about 10 to about 300 nanometers and wherein the antibody is capable of binding a fat cell or adipocyte. In embodiments, the methods of manufacturing a biocompatible magnetizeable nanoparticle produce a nanodisc comprising iron, casein, and an antibody, wherein the nanodisc has a diameter of about 20 to about 150 nanometers and wherein the antibody is capable of binding a fat cell or adipocyte. In embodiments, the methods of manufacturing a biocompatible magnetizeable nanoparticle produce a nanodisc comprising iron, casein, and an antibody, wherein the nanodisc has a diameter of about 40 to about 70 nanometers and wherein the antibody is capable of binding a fat cell or adipocyte. In embodiments, the methods of manufacturing a biocompatible magnetizeable nanoparticle produce a nanodisc comprising iron, casein, and a RETN antibody, wherein the nanodisc has a diameter of about 10 to about 300 nanometers, and wherein the antibody is capable of binding a fat cell or adipocyte. In embodiments, the methods of manufacturing a biocompatible magnetizeable nanoparticle produce a nanodisc comprising iron, casein, and a RETN antibody, wherein the nanodisc has a diameter of about 20 to about 150 nanometers and wherein the antibody is capable of binding a fat cell or adipocyte. In embodiments, the methods of manufacturing a biocompatible magnetizeable nanoparticle produce a nanodisc comprising iron, casein, and a RETN antibody, wherein the nanodisc has a diameter of about 40 to about 70 nanometers and wherein the antibody is capable of binding a fat cell or adipocyte.

In embodiments, the methods of manufacturing a biocompatible magnetizeable nanoparticle produce a nanodisc comprising iron, casein, and an aptamer, wherein the nanodisc has a diameter of about 10 to about 300 nanometers and wherein the aptamer is capable of binding a fat cell or adipocyte. In embodiments, the methods of manufacturing a biocompatible magnetizeable nanoparticle produce a nanodisc comprising iron, casein, and an aptamer, wherein the nanodisc has a diameter of about 20 to about 150 nanometers and wherein the aptamer is capable of binding a fat cell or adipocyte. In embodiments, the methods of manufacturing a biocompatible magnetizeable nanoparticle produce a nanodisc comprising iron, casein, and an aptamer, wherein the nanodisc has a diameter of about 40 to about 70 nanometers and wherein the aptamer is capable of binding a fat cell or adipocyte. In embodiments, the methods of manufacturing a biocompatible magnetizeable nanoparticle produce a nanodisc comprising iron, casein, and a RETN aptamer, wherein the nanodisc has a diameter of about 10 to about 300 nanometers, and wherein the aptamer is capable of binding a fat cell or adipocyte. In embodiments, the methods of manufacturing a biocompatible magnetizeable nanoparticle produce a nanodisc comprising iron, casein, and a RETN aptamer, wherein the nanodisc has a diameter of about 20 to about 150 nanometers and wherein the aptamer is capable of binding a fat cell or adipocyte. In embodiments, the methods of manufacturing a biocompatible magnetizeable nanoparticle produce a nanodisc comprising iron, casein, and a RETN aptamer, wherein the nanodisc has a diameter of about 40 to about 70 nanometers and wherein the aptamer is capable of binding a fat cell or adipocyte.

In embodiments, provided herein are methods of manufacturing a biocompatible magnetizeable nanoparticle including using an electrospray apparatus to spray dry a solution comprising iron oxide nanoparticles, bovine serum albumin (BSA), and a target-binding agent capable of binding a target, to form nanoparticles with a diameter of about 10 to about 300 nanometers. In embodiments, provided herein are methods of manufacturing a biocompatible magnetizeable nanoparticle including spray drying a solution comprising iron oxide nanoparticles, BSA, and a target-binding moiety capable of binding a target, to form nanoparticles with a diameter of about 20 to about 150 nanometers. In embodiments, provided herein are methods of manufacturing a biocompatible magnetizeable nanoparticle including spray drying a solution comprising iron oxide nanoparticles, BSA, and a target-binding moiety capable of binding a target, to form nanoparticles with a diameter of about 40 to about 70 nanometers.

In embodiments, the methods of manufacturing a biocompatible magnetizeable nanoparticle produce a nanodisc comprising iron, bovine serum albumin (BSA), and an antibody, wherein the nanodisc has a diameter of about 10 to about 300 nanometers and wherein the antibody is capable of binding a cancer cell. In embodiments, the methods of manufacturing a biocompatible magnetizeable nanoparticle produce a nanodisc comprising iron, BSA, and an antibody, wherein the nanodisc has a diameter of about 20 to about 150 nanometers and wherein the antibody is capable of binding a cancer cell. In embodiments, the methods of manufacturing a biocompatible magnetizeable nanoparticle produce a nanodisc comprising iron, BSA, and an antibody, wherein the nanodisc has a diameter of about 40 to about 70 nanometers and wherein the antibody is capable of binding a cancer cell. In embodiments, the methods of manufacturing a biocompatible magnetizeable nanoparticle produce a nanodisc comprising iron, BSA, and a HL-60 antibody, wherein the nanodisc has a diameter of about 10 to about 300 nanometers, and wherein the antibody is capable of binding a cancer cell. In embodiments, the methods of manufacturing a biocompatible magnetizeable nanoparticle produce a nanodisc comprising iron, BSA, and a HL-60 antibody, wherein the nanodisc has a diameter of about 20 to about 150 nanometers and wherein the antibody is capable of a cancer cell. In embodiments, the methods of manufacturing a biocompatible magnetizeable nanoparticle produce a nanodisc comprising iron, BSA and a HL-60 antibody, wherein the nanodisc has a diameter of about 40 to about 70 nanometers and wherein the antibody is capable of binding a cancer cell.

In embodiments, the methods of manufacturing a biocompatible magnetizeable nanoparticle produce a nanodisc comprising iron, bovine serum albumin (BSA), and an aptamer, wherein the nanodisc has a diameter of about 10 to about 300 nanometers and wherein the aptamer is capable of binding a cancer cell. In embodiments, the methods of manufacturing a biocompatible magnetizeable nanoparticle produce a nanodisc comprising iron, BSA, and an aptamer, wherein the nanodisc has a diameter of about 20 to about 150 nanometers and wherein the aptamer is capable of binding a cancer cell. In embodiments, the methods of manufacturing a biocompatible magnetizeable nanoparticle produce a nanodisc comprising iron, BSA, and an aptamer, wherein the nanodisc has a diameter of about 40 to about 70 nanometers and wherein the aptamer is capable of binding a cancer cell. In embodiments, the methods of manufacturing a biocompatible magnetizeable nanoparticle produce a nanodisc comprising iron, BSA, and an anti-HL-60 aptamer, wherein the nanodisc has a diameter of about 10 to about 300 nanometers, and wherein the aptamer is capable of binding a cancer cell. In embodiments, the methods of manufacturing a biocompatible magnetizeable nanoparticle produce a nanodisc comprising iron, BSA, and an anti-HL-60 aptamer, wherein the nanodisc has a diameter of about 20 to about 150 nanometers and wherein the aptamer is capable of binding a cancer cell. In embodiments, the methods of manufacturing a biocompatible magnetizeable nanoparticle produce a nanodisc comprising iron, BSA, and an anti HL-60 aptamer, wherein the nanodisc has a diameter of about 40 to about 70 nanometers and wherein the aptamer is capable of binding a cancer cell.

In embodiments, the methods of manufacturing a biocompatible magnetizeable nanoparticle produce a nanodisc comprising iron, bovine serum albumin (BSA), and an antibody, wherein the nanodisc has a diameter of about 10 to about 300 nanometers and wherein the antibody is capable of binding a fat cell or adipocyte. In embodiments, the methods of manufacturing a biocompatible magnetizeable nanoparticle produce a nanodisc comprising iron, BSA, and an antibody, wherein the nanodisc has a diameter of about 20 to about 150 nanometers and wherein the antibody is capable of binding a fat cell or adipocyte. In embodiments, the methods of manufacturing a biocompatible magnetizeable nanoparticle produce a nanodisc comprising iron, BSA, and an antibody, wherein the nanodisc has a diameter of about 40 to about 70 nanometers and wherein the antibody is capable of binding a fat cell or adipocyte. In embodiments, the methods of manufacturing a biocompatible magnetizeable nanoparticle produce a nanodisc comprising iron, BSA, and a RETN antibody, wherein the nanodisc has a diameter of about 10 to about 300 nanometers, and wherein the antibody is capable of binding a fat cell or adipocyte. In embodiments, the methods of manufacturing a biocompatible magnetizeable nanoparticle produce a nanodisc comprising iron, BSA, and a RETN antibody, wherein the nanodisc has a diameter of about 20 to about 150 nanometers and wherein the antibody is capable of binding a fat cell or adipocyte. In embodiments, the methods of manufacturing a biocompatible magnetizeable nanoparticle produce a nanodisc comprising iron, BSA, and a RETN antibody, wherein the nanodisc has a diameter of about 40 to about 70 nanometers and wherein the antibody is capable of binding a fat cell or adipocyte.

In embodiments, the methods of manufacturing a biocompatible magnetizeable nanoparticle produce a nanodisc comprising bovine serum albumin (BSA), casein, and an aptamer, wherein the nanodisc has a diameter of about 10 to about 300 nanometers and wherein the aptamer is capable of binding a fat cell or adipocyte. In embodiments, the methods of manufacturing a biocompatible magnetizeable nanoparticle produce a nanodisc comprising iron, BSA, and an aptamer, wherein the nanodisc has a diameter of about 20 to about 150 nanometers and wherein the aptamer is capable of binding a fat cell or adipocyte. In embodiments, the methods of manufacturing a biocompatible magnetizeable nanoparticle produce a nanodisc comprising iron, BSA, and an aptamer, wherein the nanodisc has a diameter of about 40 to about 70 nanometers and wherein the aptamer is capable of binding a fat cell or adipocyte. In embodiments, the methods of manufacturing a biocompatible magnetizeable nanoparticle produce a nanodisc comprising iron, BSA, and a RETN aptamer, wherein the nanodisc has a diameter of about 10 to about 300 nanometers, and wherein the aptamer is capable of binding a fat cell or adipocyte. In embodiments, the methods of manufacturing a biocompatible magnetizeable nanoparticle produce a nanodisc comprising iron, BSA, and a RETN aptamer, wherein the nanodisc has a diameter of about 20 to about 150 nanometers and wherein the aptamer is capable of binding a fat cell or adipocyte. In embodiments, the methods of manufacturing a biocompatible magnetizeable nanoparticle produce a nanodisc comprising iron, BSA, and a RETN aptamer, wherein the nanodisc has a diameter of about 40 to about 70 nanometers and wherein the aptamer is capable of binding a fat cell or adipocyte.

Methods of Use

In an aspect, provided herein are methods of treating a subject with a disease condition. The method includes administering to a subject with a disease condition an effective amount of a composition that includes a magnetizeable nanoparticle and exposing the subject to an energy source for a time period sufficient to allow the magnetizeable nanoparticle to move in a manner that causes disruption, apoptosis, and/or ablation of the target. The nanoparticles have a diameter of about 10 to about 300 nanometers. The nanoparticles may be disc-shaped and formed from iron oxide ($Fe_3O_4$ or $Fe_2O_3$). The nanoparticles may be conjugated to a biocompatible agent. The nanoparticles may be conjugated to a target-binding moiety that binds a target. The disease condition may be cancer, bacterial infection, viral infection, obesity and/or fat accumulation, or atherosclerotic plaque. The target may be the causative agent of the disease. The target may be, for example and without limitation, cancer cells, fat cells, pathogens, or atherosclerotic plaques. The target binding moiety may be an antibody or an aptamer.

In an aspect, provided herein are methods of treating a disease lesion in a subject having a lesion associated with a disease or condition, including intravenously administering to the subject a conjugate comprising a nanoparticle conjugated to a biocompatible agent and/or a target-binding moiety; and after administering the conjugate, exposing the lesion to an energy sufficient to cause the nanoparticles to cause disruption, apoptosis, and/or ablation. The energy may include variable force, variable frequency magnetic field, where the variable field has a force (amplitude) of about 1 Gauss to about 300 Gauss and the variable frequency has a range of about 1 to about 500 Hz.

In embodiments, the methods of treating a disease or lesion in a subject include administering an effective amount of a composition comprising any of the biocompatible nanoparticles described herein. In embodiments, the methods of treating a disease or lesion in a subject include administering an effective amount of a composition comprising any of the biocompatible nanoparticles described and waiting a suffient amount of time for the nanoparticles to bind a target.

In embodiments, the compositions may be administered by intravenous, parenteral, intraperitoneal, intramuscular, intralesional, intrathecal, intranasal or subcutaneous administration. Administration is by any route, including parenteral and transmucosal (e.g., buccal, sublingual, palatal, gingival, nasal, vaginal, rectal, or transdermal). Parenteral administration includes, e.g., intravenous, intramuscular, intra-arteriole, intradermal, subcutaneous, intraperitoneal, intraventricular, and intracranial. In embodiments, the composition is administered in a single injection. In embodiments, the composition is administered in a multiple injections. In embodiments, the composition is administered in a single infusion. In embodiments, the composition is administered in a multiple infusions.

In embodiments, the methods of treating a disease or lesion in a subject include administering an effective amount of a composition comprising any of the biocompatible nanoparticles described and waiting a suffient amount of time for the nanoparticles to bind a target. In embodiments, a sufficient amount of time includes from about 1 minute to about 1 hour. In embodiments, a sufficient amount of time includes 1, 2, 3, 4, 5, 6, 7, 8, 9, 10 or greater than 10 minutes. In embodiments, a sufficient amount of time includes 10, 20, 30, 40, 50, or about 60 minutes. In embodiments, a sufficient amount of time includes from about 1 hour to about 24 hours. In embodiments, a sufficient amount of time includes about 1, 2, 3, 4, 5, 6, 7, 8, 9, 10, 11, 12, or greater than 12 hours. In embodiments, a sufficient amount of time includes from about 12 to about 24 hours. In embodiments, a sufficient amount of time includes about 12, 13, 14, 15, 16, 17, 18, 19, 20, 21, 22, 23, 24, or greater than 24 hours.

In embodiments, the dosing and/or treatment schedule is repeated, the dosing schedule is repeated if a residual lesion remains at a time that is more than or is 2 weeks, 3 weeks, 4 weeks, 2 months, 6 months or 1 year after initiation of the prior administration of the composition.

In embodiments, the methods of treating a disease or lesion in a subject include administering an effective amount of a composition comprising any of the biocompatible nanoparticles described and waiting a suffient amount of time for the nanoparticles to bind a target, and exposing the subject to an energy source. In embodiments, the energy source is a magnetic field. In embodiments, the magnetic field is is a variable force variable frequency magnetic field. In embodiments, the energy source is produced from a device capable of producing a variable force variable frequency magnetic field (VFVF). In embodiments, the device can be controlled to provide a magnetic field that causes a nanoparticle as described herein to move in a manner that causes disruption, apoptosis, and/or ablation of a target.

In embodiments, the VFVF has a force (also referred to as amplitude or strength) of about 1 Gauss to about 300 Gauss. In embodiments, the VFVF has a force of about 20 to about 150 Gauss. In embodiments, the VFVF has a force (also referred to as amplitude or strength) of about 1, 10, 20, 30, 40, 50, 60, 70, 80, 90, 100, 110, 120, 130, 140, 150, 160, 170, 180, 190, 200, 210, 220, 230, 240, 250, 260, 270, 280, 290, or about 300 Gauss.

In embodiments, the variable force variable frequency magnetic field (VFVF) has a frequency of about 1 to about 500 Hz. In embodiments, the variable force variable frequency magnetic field (VFVF) has a frequency of about 20 to about 80 Hz. In embodiments, the variable force variable frequency magnetic field (VFVF) has a frequency of about 1, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or about 500 Hz.

In embodiments, the administered nanoparticle binds a target and is capable of moving in a manner that causes disruption, apoptosis, and/or ablation of the target when exposed to an energy source. In embodiments, the manner of moving is oscillation, vibration, shaking, or the like caused by exposure to a variable force variable frequency magnetic field (VFVF) produced by a device. In embodiments, the administered nanoparticle binds its target and oscillates when exposed to a variable force variable frequency magnetic field (VFVF) produced by a device, thereby causing disruption, apoptosis, and/or ablation of the target. In embodiments, the administered nanoparticle binds its target and oscillates when exposed to a variable force variable frequency magnetic field (VFVF) produced by a device, thereby causing apoptosis of the target. In embodiments, the administered nanoparticle binds its target and oscillates when exposed to a variable force variable frequency magnetic field (VFVF) produced by a device, thereby causing ablation of the target.

Magnetic Oscillation Device

In embodiments, the methods provided herein include a magnetic oscillation device. In embodiments, the magnetic oscillation device provides a variable force variable frequency (VFVF) magnetic field. In embodiments, the device can be controlled to provide a magnetic field that causes a nanoparticle as described herein to move in a manner that causes disruption, apoptosis, and/or ablation of a target.

In embodiments, the magnetic oscillation device produces a VFVF magnetic field with a force (also referred to as amplitude or strength) of about 1 Gauss to about 300 Gauss. In embodiments, the VFVF has a force of about 20 to about 150 Gauss. In embodiments, the VFVF has a force (also referred to as amplitude or strength) of about 1, 10, 20, 30, 40, 50, 60, 70, 80, 90, 100, 110, 120, 130, 140, 150, 160, 170, 180, 190, 200, 210, 220, 230, 240, 250, 260, 270, 280, 290, or about 300 Gauss.

In embodiments, the magnetic oscillation device produces a VFVF magnetic field with a frequency of about 1 to about 500 Hz. In embodiments, the variable force variable frequency magnetic field (VFVF) has a frequency of about 20 to about 80 Hz. In embodiments, the variable force variable frequency magnetic field (VFVF) has a frequency of about 1, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or about 500 Hz.

Hemofiltration Method and Device

In an aspect, provided here in are methods of treating a subject that include administering ex vivo hemofiltration, and/or hemo-separation. The methods include administering ex vivo hemofiltration to the subject where blood is removed from the subject and passed through a device, incubating the blood or plasma with for a sufficient time to allow binding of magnetizeable nanoparticles to a target cell, where the nanoparticles are conjugated to a target-binding moiety; exposing the device to an energy source for a time period sufficient to allow the magnetizeable nanoparticles to move in a manner that causes disruption, apoptosis, and/or ablation of the target; and returning blood to said subject, wherein the blood is at least 80% free of target cells. The device includes (1) a filtration chamber configured to receive blood or plasma comprising target cells, and (2) a matrix comprising magnetizeable nanoparticles disposed within said device. The magnetizeable nanoparticles have a diameter (average diameter) of about 10 to about 300 nanometers, comprise iron oxide, and are conjugated to a target-binding moiety capable of binding target. The target-binding moiety may be selected from antibodies, aptamers, and fusion proteins.

In embodiments of the methods of treating a subject, the subject has a target to be removed from blood. The target may be a cancer cell or pathogen. In embodiments, ex vivo hemofiltration is administered whereby blood that includes a cancer cell or pathogen is removed from the subject and passed through a device. The method includes a device that includes a filtration chamber configured to receive blood or plasma comprising target cells, and a matrix comprising magnetizeable nanoparticles disposed within said filtration chamber, wherein the nanoparticles are conjugated to a target-binding moiety. The method includes incubating the blood or plasma with for a sufficient time to allow binding of magnetizeable nanoparticles to a target within the blood.

After the incubation, the matrix comprising the magnetizeable nanoparticles is exposed to an energy source for a time period sufficient to allow the magnetizeable nanoparticles to move in a manner that causes disruption, apoptosis, and/or ablation of the target cells. In embodiments, the energy source is a magnetic field. In embodiments, the magnetic field is a variable force variable frequency magnetic field. In embodiments, the variable force variable frequency magnetic field causes the nanoparticles to oscillate and cause apoptosis of the target cell. The methods include returning the blood to the subject, where the blood is at least 80% free of target cells.

In embodiments, at least 80% free of target cells means the target cells have been reduced by 80% of the starting quantity. In embodiments, at least 80% free of target cells means the target cells have been reduced by 80%, 81%, 82%, 83%, 84%, 85%, 86%, 87%, 88%, 89%, 90%, 91%, 92%, 93%, 94%, 95%, 96%, 97%, 98%, 99% or greater than 99% of the starting number of target cells. In embodiments, the methods include returning the blood to the subject, where the blood is substantially free of target cells.

In alternative embodiments, the magnetic field does not produce oscillation of the nanoparticles but simply moves them to a separate chamber or area such that the target bound nanoparticles are removed from the remainder of the blood. In such embodiments, the nanoparticles bind the target cells without causing disruption or apoptosis but removes them from blood.

In embodiments of the methods of treating a subject, the subject has a target to be removed from blood. The target may be a cancer cell or pathogen. In embodiments, ex vivo hemofiltration is administered whereby blood that includes a cancer cell or pathogen is removed from the subject and passed through a device. In some embodiments, biocompatible magnetizable nanoparticles as described herein have been administered to the patient intravenously. In embodiments, ex vivo hemofiltration is administered whereby blood that includes a cancer cell or pathogen is removed from the subject and passed through a device. The device includes a filtration chamber configured to receive blood or plasma comprising target cells bound to magnetizeable nanoparticles. As blood fills the chamber, the blood is exposed to an energy source for a time period sufficient to allow the magnetizeable nanoparticles to move in a manner that causes disruption, apoptosis, and/or ablation of the target cells. In embodiments, the energy source is a magnetic field. In embodiments, the magnetic field is a variable force variable frequency magnetic field. In embodiments, the variable force variable frequency magnetic field causes the nanoparticles to oscillate and cause apoptosis of the target cell. The methods include returning the blood to the subject, where the blood is at least 80% free of target cells. In embodiments, at least 80% free of target cells means the target cells have been reduced by 80% of the starting quantity. In embodiments, at least 80% free of target cells means the target cells have been reduced by 80%, 81%, 82%, 83%, 84%, 85%, 86%, 87%, 88%, 89%, 90%, 91%, 92%, 93%, 94%, 95%, 96%, 97%, 98%, 99% or greater than 99% of the starting number of target cells. In embodiments, the methods include returning the blood to the subject, where the blood is substantially free of target cells.

In an aspect, provided herein is a device that includes a chamber configured to receive blood or plasma including target cells, a matrix disposed within the chamber, and is configured to remove target cells from blood or plasma. The target cells may be cancer cells or pathogens. The matrix includes magnetizeable nanoparticles that have a diameter of about 10 to about 300 nanometers, comprises iron oxide, and is conjugated to a target-binding moiety capable of binding target. The target-binding moiety may be selected from antibodies, aptamers, and fusion proteins.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

EXAMPLES

Example 1: Method of Preparation of Biocompatible Magnetizeable Nanodiscs

As described herein, the present disclosure relates compositions, methods of manufacture, and methods of use of biocompatible, magnetizeable nanodiscs. In some embodiments, magnetizeable nanodiscs are conjugated to a biocompatible agent such as casein or bovine serum albumin and a target-binding moiety such as an antibody or aptamer capable of binding a target. The biocompatible, magnetizeable nanodiscs are injected into a subject, where the target-binding moiety binds to unique ligands located on the target. In embodiments, the target is a cancer cell, atherosclerotic plaque, or adipocyte. These nanodiscs are activated by an oscillating magnetic field placed near the surface of the subject causing the nanodiscs to gently/vibrate or oscillate. This movement disrupts the integrity of the target, thereby triggering natural programmed cell death (apoptosis), ablation, or disintegration. The cell contents of apoptotic cells or the debris from disrupted atherosclerotic plaques then enter the blood stream and are processed naturally by the body. Since the induction of the biocompatible, magnetizeable nanodisc requires no dangerous heat or chemicals and does not affect surrounding healthy cells, deleterious side effects and inflammation are thereby eliminated and/or significantly reduced. Moreover, the ablation procedure offers the added benefits of a minimal recovery time, higher potential for target reduction (i.e. significant tumor reduction, significant reduction of fat cell volume, significant reduction of atherosclerotic plaque volume), and fewer required office visits. The general scheme is depicted pictorially in FIG. 1.

Experiments described herein provide evidence for a method of manufacture of nanoparticles using a scalable, cost effective procedure. These nanoparticles are conjugated to targeting moieties such as antibodies that bind cancer-specific antigens. This is accomplished using electrospray to deposit a uniform thin biofilm onto shims that include nano cavities that were then cooled to release individual functional, magnetizeable nanodiscs.

Solutions of iron oxide powder (nanoparticles) in millipore water were made to create a 5% iron oxide solution. A solution of a biocompatible agent was made. In some experiments, 10% casein in 1×PBS (phosphate buffered saline) was prepared. In other experiments, 10% bovine serum albumin in 1×PBS (phosphate buffered saline) was prepared. The solution of 5% iron oxide ($Fe_2O_3$) was totally immiscible. The iron oxide was evenly-mixed, and this was added to 10% casein solution. 10% casein was immiscible and after adding NaOH, the pH increased to around 12. The biological pH was reached by addition of Tris HCl. pH was adjusted to about 10. The basic ingredients for the reaction mixture to be sprayed through electron spray were as follows: 1 ml of 10% casein in PBS, 50 microliters of evenly mixed iron oxide solution, 1 mg/ml IgG goat antibody (10 microliters). In other experiments, the reaction mixture to be sprayed through electron spray were as follows: 1 ml of 10% BSA in PBS, 50 microliters of evenly mixed iron oxide solution, 1 mg/ml anti-HL60 antibody (10 microliters IPO-MG monoclonal mouse antibody that recognized HL60 cancer cells).

Commercially available electro spraying devices utilize electrical forces for liquid atomization. The ElectroSpray platform utilized in these experiments is pictured in FIG. 2A. Droplets obtained by this method are highly charged to a fraction of the Rayleigh limit. The advantage of electro spraying is that the droplets can be extremely small, down to the order of tens of nanometers, and the charge and size of the droplets can be controlled to some extent be electrical means. Motion of the charged droplets can be controlled by electric field.

The deposition efficiency of the charged spray on an object is usually higher than that for uncharged droplets. These films are made on surfaces that can be subjected to imprinting using selected customized "shims." Disc preparation using shims are illustrated in FIG. 2B.

Voltage between emitter and collector: the voltage was varied from 0 KV to 20 KV and flow rate from 1 to 50 microliter/min to select appropriate flow rate and voltage combination: a) the voltage was set at 4.5-4.8 kV and flow rate 10 microliter 10 min.; b) the voltage was set at 5-5.3 kV and flow rate 10 microliter 10 min.; or c) the voltage was set at 4-4.3 kV and flow rate 10 microliter 10 min.

The observations were recorded by the camera of the electron spray system. The Taylor cone and plume of a representative experiment is shown in FIG. 2C. The best voltage input at this flow rate was observed to be 4.5-4.8 kV. Three sets of samples were sent for atomic force microscopy to determine the size range and distribution of the nanodiscs produced by these experiments. Representative results are show in FIGS. 3 and 4. The nanodiscs in FIG. 3 comprise iron oxide, IgG antibody and casein. FIG. 3A is a scanning electron micrograph of the nanodiscs. FIGS. 3B-F are various graphs and measurements showing the nanoparticle size distribution of about 80 to 120 nm. The nanodiscs in FIG. 4 comprise iron oxide, IPO-M6 antibody (targets HL-60 cells), and bovine serum albumin. FIG. 4A is a scanning electron micrograph of the nanodiscs. FIGS. 4B-F are various graphs and measurements showing an average nanoparticle size of 22 nm.

Optimization of key parameters including voltage, flow rate, collection mode and exposure time for the materials being sprayed was conducted. (Results not shown). As it related to voltage, experiments suggest that the optimized voltage for working with casein was 4.5 KV. As it related to voltage, experiments suggest that the optimized voltage for working with BSA was 4.8 KV. As it related to flow rate, the optimized flow rate was 3 μl/min for IgG antibody. As it related to flow rate, the optimized flow rate was 2 μl/min for IPO-Mg antibody. Collection was done in 5% dextrose.

To test the function of biocompatible, magnetizable nanodiscs produced by the method as follow: 1. FITC was conjugated with BSA through dialysis. 2. This FITC-BSA was used as reaction mixture in the Nano-disc preparation along with 2% BSA, 5% iron oxide solution and 20 μl mouse monoclonal [IPO-M6] antibody. 3. The mixture was sprayed through electron spray at a controlled voltage of 4.8 kV and a flow rate of 2 μl/min. 4.5% dextrose was added to screen stainless steel collection plate in the process of electron spraying to avoid HL-60 cell death as observed in the earlier results (data not shown). 5. The spray was recovered in 5% Dextrose and collected in 1.5 ml centrifuge tubes. 6. This was later treated to HL-60 cells in log phase at two different volumes i.e. 100 and 200 μl. 7. All the samples were done in duplicate per sample and were observed under EVOS FL Cell Imaging System AFM 4300 40× resolution.

The control cells were HL-60 alone. No fluorescence was observed in the control. Test groups HL-60 cells treated with 100 and 200 μl fluoresced. The conclusion was that the biocompatible magnetizeable nanodiscs (BMND) conjugated to IPO-M6 antibody adhered to its target, HL-60 cells. (data not shown).

To study in vitro target cell ablation under magnetic oscillation, the nanoparticles with IPO-M6 antibody and BSA were made as described above. HL-60 cells were grown in six-well plates. 1. Nearly 50,000 cells were taken in a well in 2 ml media (without FCS) per well in three wells of a six well plate. 2. One well was taken as control which was not treated with anything but oscillated and stained with neutral red. 3. Second well was treated with 100 μl BMND suspended in 5% dextrose. 4. Third well was treated with 200 μl BMND suspended in 5% dextrose.

Observations were one at 10× under an inverted microscope. The control cells were live and most of them were round with regular physical properties. Cells treated with 100 μl Nano-discs suspended in 5% dextrose were either irregular in shape or broken into debris. Cells treated with 200 μl Nano-discs suspended in 5% dextrose were irregular mostly broken into debris. The conclusion was made that BMNDs conjugated to target-binding moiety is capable of binding target cells, oscillating under magnetic force, and destroying cells.

Example 2: Magnetic Device Commissioning Tests

In order to conduct the experiments herein, a lab scale magnetic oscillator was developed. The magnetic oscillator used for in vitro, ex vivo, and in vivo methods described herein is illustrated in FIG. 5.

A variable force variable field (VFVF) magnetizer was developed for subjecting biological samples to magnetic field of variable force (amplitude) strength of 20 to 150 Oe (1 Oe=1 G) & variable frequency of the range of about 20 to 80 Hz. Main features of the unit was an air gap of 50 mm & large area of 150 mm×150 mm providing giving enough room as a sample chamber. Design of electromagnetic poles with cross section of 22,500 square millimeter and space clearance of 50 millimeter was achieved. This was required as critical aspect of the design of power system particularly when dealing with variable frequency.

The setup included 1) a low frequency signal generator as a controlling AC input signal; 2) a power amplifier to generate desired output power; 3) load matching device to match magnets impedance with amplifier output; and 4) electro magnets to provide 150 mm×150 mm×50 mm space of magnetizing field. All components were designed and integrated to deliver variable magnetic field strength of variable frequency.

An example of operations of the device was as follows:

1) Connect unit components and power supply.
2) Switch on power supply.
3) Set Frequency and Magnetic Field Strength and measure field strength with the hall Probe.
4) Place sample in a 6 well/96 well plate or nude mice strapped to an aluminum plate.

5) Subject the sample to the required duration of time.
6) Check the results.
7) Record the test parameters and results.

To find out how the field is distributed within the chamber, the chamber was divided in three planes, Top, Middle and Bottom and five points. Four corners and one middle point of each plane were selected, thus 15 points were used for measuring field strength within the chamber. See FIG. 10. Then while keeping frequency constant, magnetic field strength was varied within minimum and maximum range (2.2 & 96 Gauss) and measured at all 15 points and recorded. These readings were repeated by setting frequency at lowest value 5 Hz & increasing it by an increment of 5 Hz up to maximum value of 60 Hz. The instrument used was a hall probe.

Observations: The readings indicate near uniform field distribution within the chamber, minor variations observed may be attributed to manual placement of Hall probe. See Table 1.

TABLE 1

Test Results.

To check how magnetic field is distribiuted within test chamber

Decimal Values rounded off to nearest value

| Objective Probe Location | Fre-quency | Probe postion in magntic field | | | | | Avergae |
|---|---|---|---|---|---|---|---|
| | | 1 | 2 | 3 | 4 | 5 | |
| B-BOTTOM | 5 | 190 | 190 | 197 | 196 | 180 | 190.6 |
| C-CENTRE | 5 | 180 | 170 | 182 | 180 | 180 | 178.4 |
| T-TOP | 5 | 180 | 180 | 181 | 178 | 180 | 179.8 |
| B-BOTTOM | 10 | 171 | 180 | 180 | 170 | 170 | 174.2 |
| C-CENTRE | 10 | 160 | 160 | 160 | 161 | 172 | 162.6 |
| T-TOP | 10 | 150 | 154 | 170 | 150 | 160 | 156.8 |
| B-BOTTOM | 15 | 146 | 146 | 148 | 142 | 145 | 145.4 |
| C-CENTRE | 15 | 140 | 135 | 140 | 137 | 140 | 138.4 |
| T-TOP | 15 | 140 | 140 | 141 | 141 | 141 | 140.6 |
| B-BOTTOM | 20 | 119 | 118 | 117 | 119 | 119 | 118.4 |
| C-CENTRE | 20 | 117 | 120 | 119 | 118 | 118 | 118.4 |
| T-TOP | 20 | 122 | 116 | 120 | 117 | 119 | 118.8 |
| B-BOTTOM | 25 | 101 | 107 | 104 | 101 | 98 | 102.2 |
| C-CENTRE | 25 | 80 | 82 | 79 | 79 | 81 | 80.2 |
| T-TOP | 25 | 96 | 86 | 88 | 85 | 80 | 87 |
| B-BOTTOM | 30 | 84 | 86 | 86 | 84 | 81 | 84.2 |
| C-CENTRE | 30 | 80 | 82 | 79 | 79 | 81 | 80.2 |

Example 3: Induction of Apoptosis in HL60 Cells Treated with Biocompatible Magnetizable Nanodiscs (BMND)

To test the ability of BMND conjugated to a target-binding moiety to bind a target and cause cell death, the following protocol was followed.

Conjugation of anti-HL60 antibody: The anti-HL60 antibody was conjugated to the iron oxide nanoparticles. Briefly, the iron oxide nanoparticles (5 mg Fe/mL) were activated by adding and incubating with sulfo-N-hydroxysuccinimide (NHS, Sigma-Aldrich, St. Louis, MO) at a molar ratio 1000:1 and 1-ethyl-3,3-dimethylaminopropyl carbodiimide hydrochloride (EDC, Sigma-Aldrich, St. Louis, MO) at molar ratio 2000:1 for 20 minutes in borate buffer, pH 5.5 (Nature protocols), after which the pH was adjusted to 8.0. Next, the antibody 10 μl of anti-HL60 (also used the dilution of 1:4000, 1:10000 and 1:100 (this was prepared from the original tube of antibody) was added immediately, mixed well, and incubated for 2 h at room temperature. (Procedure from [15]).

Exposure to Magnetic Field
1. 1000 μl of the HL60 cells [approximately 1000 cells/10 μl] were centrifuged and fresh medium without serum added before the addition of Ab.
2. Then 2 μl of anti-HL60ab-BMND was added to the wells. (1 μl per 500 μl of medium).
3. Incubated for 30 minutes at room temperature.
4. 1000 μl of fresh medium was used for gentle washing of cells.
5. The plate was exposed to the magnetic field (VFVF magnetizer) for 5 or 10 min (10 htz, 90 G).
6. Cells were incubated for 24 h.

Figure 6A:
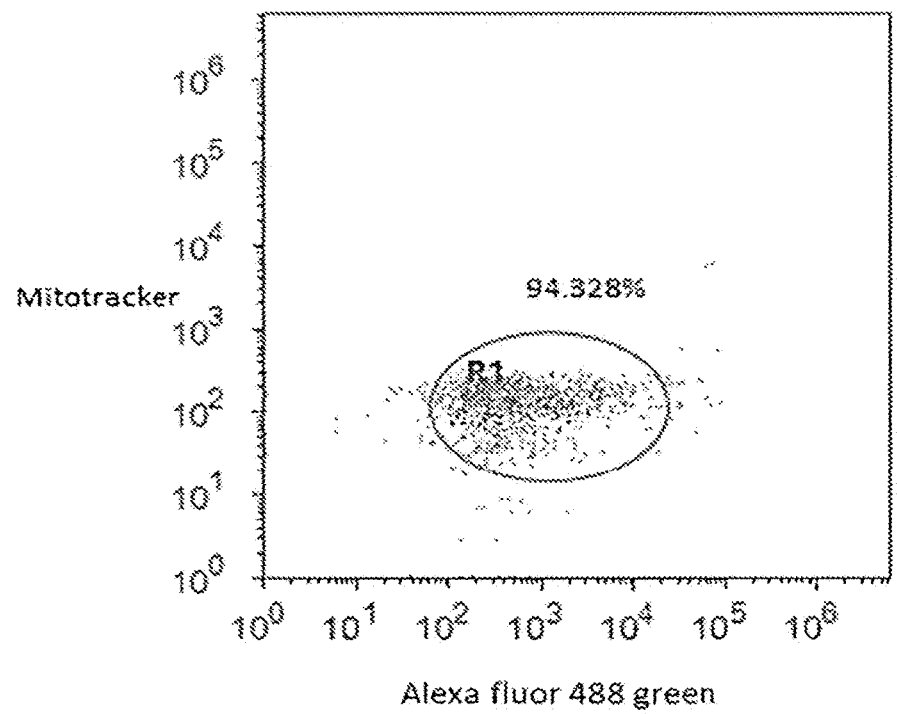
FIG. 6A-C shows the induction of apoptosis in HL60 cells treated with biocompatible magnetizeable nanodiscs (BMND) described herein. Apoptosis evaluation using mitochondrial membrane potential/annexin V apoptosis analysis with MitoTracker® Red and Alexa® Fluor 488 annexin V by Flow Cytometry.
Figure 6B:
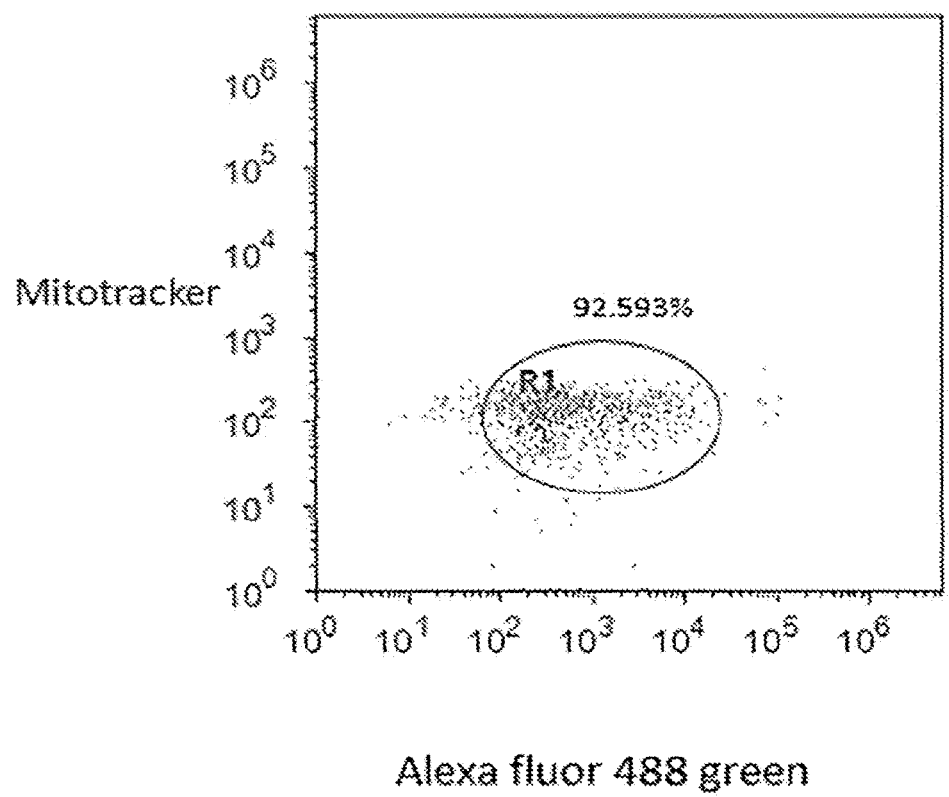
Figure 6C:
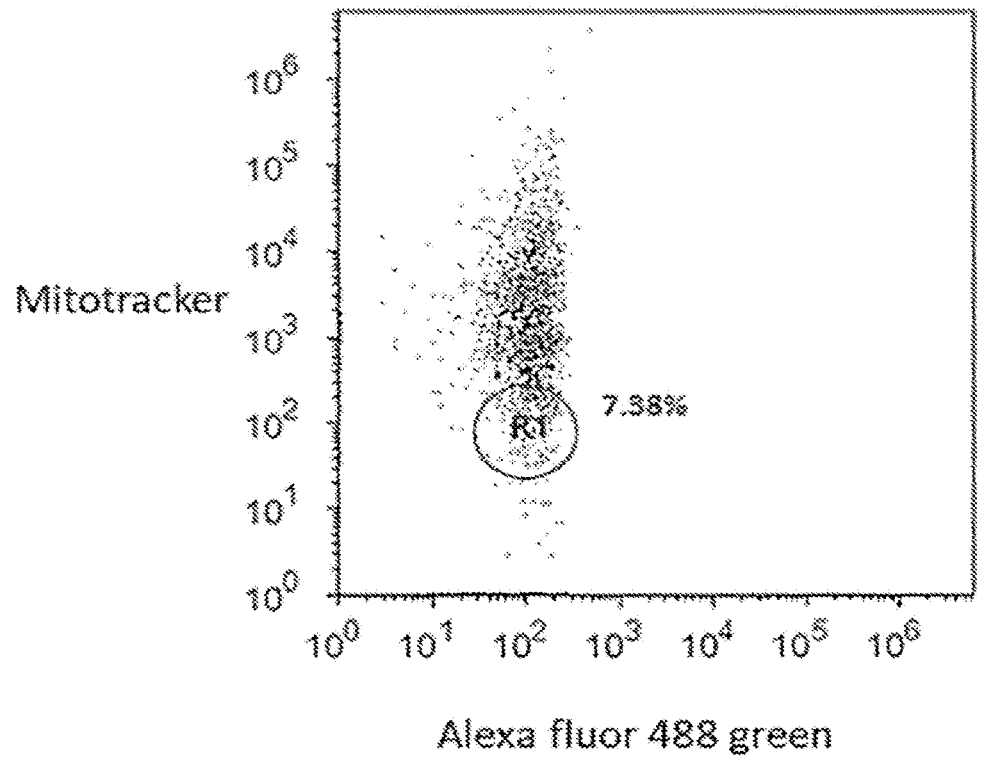

Analysis of Apoptosis by Flow Cytometry
1. The cells were harvested and used for the assay.
2. For the assay, Mitochondrial Membrane Potential/Annexin V Apoptosis Kit with MitoTracker® Red and Alexa® Fluor 488 annexin V (Life technologies, Inc, USA) was used.
3. After staining a cell population with Alexa Fluor® 488 annexin V and Mito Tracker® Red dye in the provided binding buffer, apoptotic cells show green fluorescence with decreased red fluorescence, and live cells show very little green fluorescence and bright red fluorescence Results shown in FIG. 6A-C. FIG. 6A-C showed the induction of apoptosis in HL60 cells treated with biocompatible magnetizeable nanodiscs (BMND) described herein. Apoptosis evaluation using mitochondrial membrane potential/annexin V apoptosis analysis with MitoTracker® Red and Alexa® Fluor 488 annexin V by Flow Cytometry. FIG. 6A shows cells treated with BMND conjugated to anti-HL-60 antibody and exposed to magnetic field (10 min) 10 Htz, 90 Gauss. FIG. 6B shows cells treated with BMND conjugated to anti-HL-60 antibody and exposed to magnetic field (5 min) 10 Htz, 90 Gauss. FIG. 6C show untreated control. Green cells represent apoptotic cells/dead cells (circled for clarity) and red cells represent cells with intact mitochondrial membrane. About 92-94% cells were found apoptotic/dead in samples of HL60 cells treated with BMND-conjugated to HL-60 antibody treated compared to untreated control. The cells became apoptotic after 4-6 h of incubation, with no red cells found in treated cells population. No necrotic cells were found in treated cells population.

Example 4: Ex-Vivo Nanoablation of Leukemic Cells

The preliminary studies as described in Examples 1-3 on targeted nanoablation using HL60 cells were shown to be effective. Those experiments were conducted in vitro in the absence of non-target cells. The following experiments were designed to test the efficacy of biocompatible magnetizeable nanodiscs conjugated to a target-binding moiety to kill target cells in the presence of a large excess of other non-target cells.

Experimental approach: Normal human blood containing anti-coagulants [EDTA or heparin] was spiked with cultured leukemic cells [HL60 in this case] and exposed to BMNDs conjugated to anti HL60 antibody. One set of the tubes was subjected to magnetic oscillation and the other served as control. Both sets were processed for estimating the number of living HL60 cells by flow cytometry.

Materials: Whole blood (10 ml), HL-60 cells, Lysis buffer for red blood cells.

Procedure: The whole blood (10 ml) with heparin was used for the experiment. Red blood cells (RBCs) were lysed by using lysis buffer. The remaining cells were centrifuged and re-suspended in PBS.

Results are shown in Table 2 and FIG. 7.

TABLE 2

Experimental Setup and Results

| Tube 1 | Tube 2 | Tube 3 | Tube 4 | Tube 5 | Tube 6 |
|---|---|---|---|---|---|
| Control HL 60 cells | Blood without RBCs Without HL 60 cells | Blood without RBCs HL 60 cells added 1 × $10^{5/ml}$ | Blood without RBCs HL 60 cells added 1 × $10^{5/ml}$ | From Tube 4- (Dilution $10^{-2}$) | From Tube 5 (Dilution $10^{-3}$) |
| | | Incubation of 10 mins at room temp. Biodegradable Magnetizable Nanodiscs 30 min incubation | | | |
| No exposure | | Exposure to the magnetic field for 20 mins at 10 htz, 90 G | | No exposure | |
| Secondary FITC antibody | Secondary FITC antibody | Secondary FITC antibody | Secondary FITC antibody | Secondary FITC antibody | Secondary FITC antibody |
| | | Incubation 30 min Flow cytometry | | | |
| | | Results From FIG. 7 Panels A-F represent percentage of Labeled HL60 (target) cells in a population of non-target cells | | | |
| A | B | C | D | E | F |
| 42.7% | 1.79% | 1.9% | 16.06% | 5.79% | 4.75% |

Column A (FIG. 7A) represented the positive control. HL-60 cells incubated with BMND and no magnetic exposure showing binding of BMND to the target and fluorescence through the secondary FITC antibody.

Column B (FIG. 7B) represented the negative control where whole blood without HL-60 cells spiked in was incubated with BMND and no magnetic exposure. No fluorescence was observed because there was nothing for the BMND to bind to.

Percentage of cell population (1.9%) in Column C (FIG. 7C) represented the test sample where whole blood with 105 HL-60 cells spiked in was incubated with BMND and exposed to magnetic field. No fluorescence was observed due to the death of cells from oscillation of the bound BMND causing apoptosis or rupture.

Columns D (FIG. 7D) represented the test sample where whole blood with 105 HL-60 cells spiked in was incubated with BMND and not exposed to magnetic field. The percentage of cell population (16%) in Column D (FIG. 7D) represents the separation of cells with BMND (via flow cytometry) from large population of blood cells. (In cancer patients, the population of promyolocytic (cancer stem cells) cells is high at various stages of disease.)

Figure 7A:
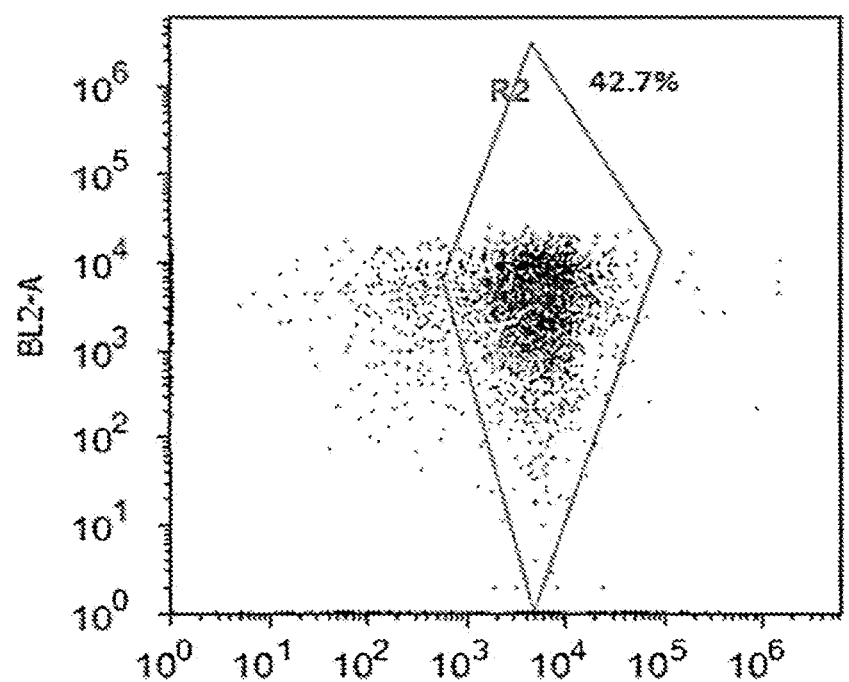
FIGS. 7A-F shows the results from experiments are designed to test the efficacy of biocompatible magnetizeable nanodiscs (BMND) to ablate target cells in the presence of large excess of non-target cells. Apoptosis evaluation using mitochondrial membrane potential/annexin V apoptosis analysis with MitoTracker® Red and Alexa® Fluor 488 annexin V by Flow Cytometry was conducted. All results are shown as a percentage of HL60 (target) cells in a population of non-target cells bound by BMND conjugated to HL-60 antibody and either exposed to magnetic oscillation or not.
Figure 7B:
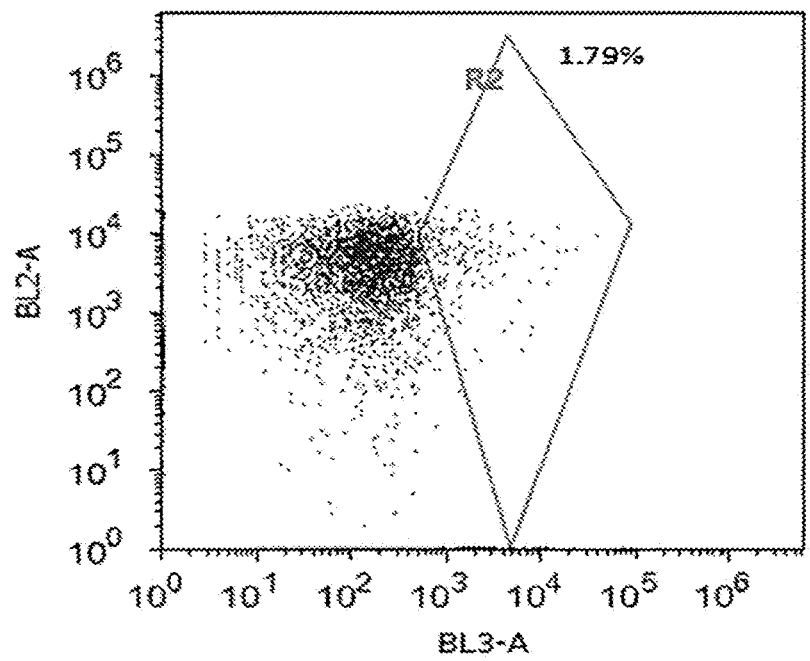
Figure 7C:
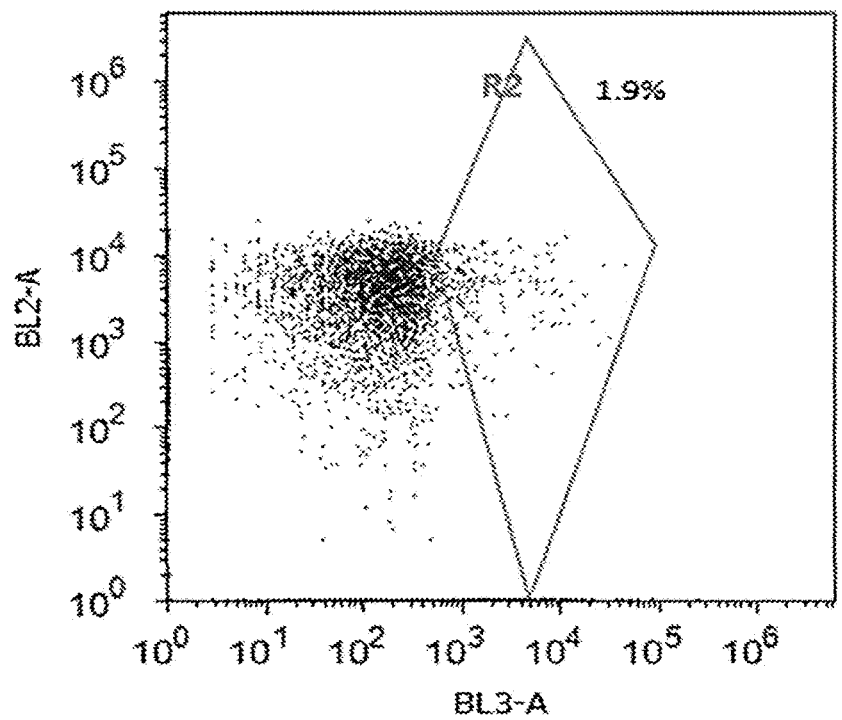
Figure 7D:
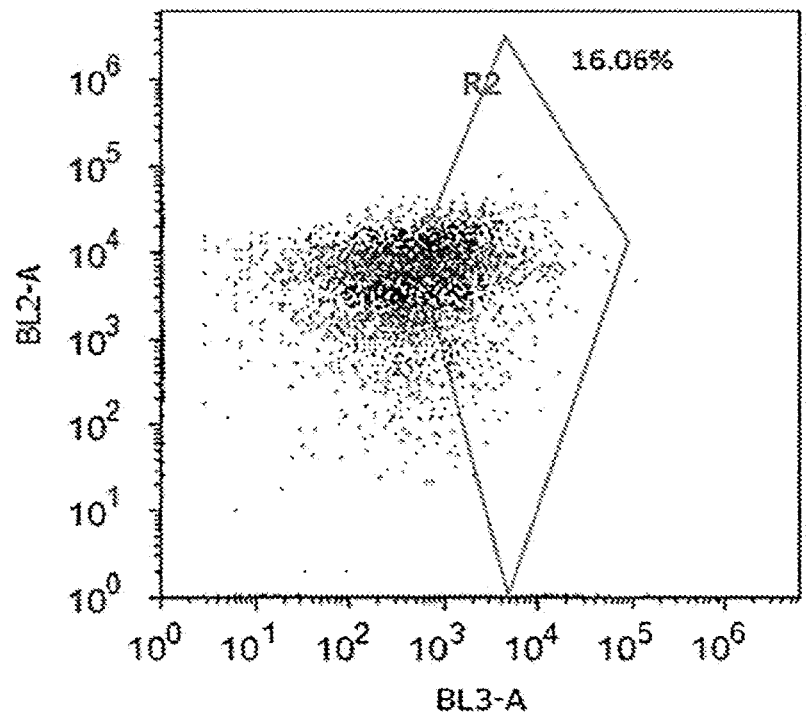
Figure 7E:
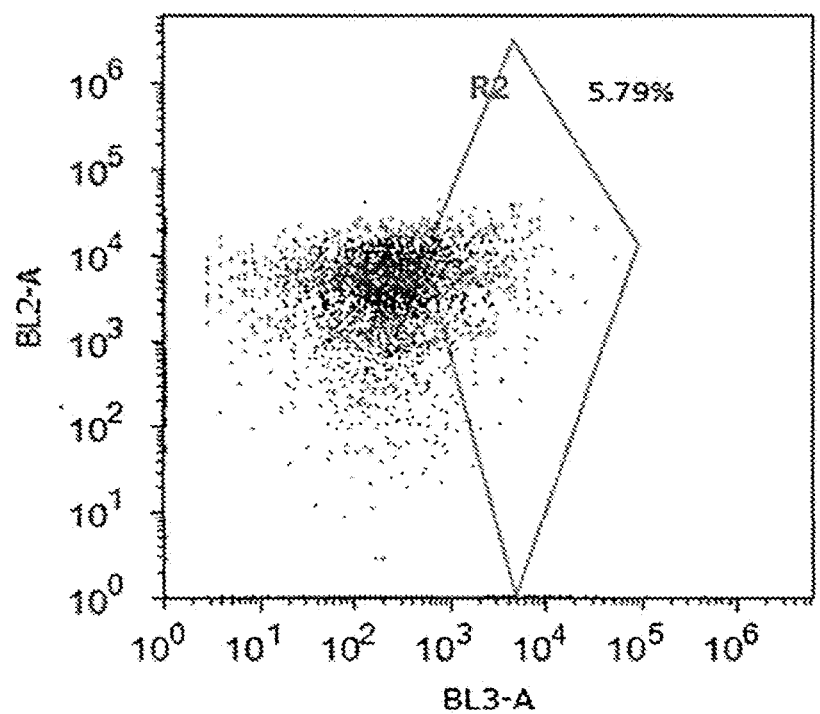
Figure 7F:
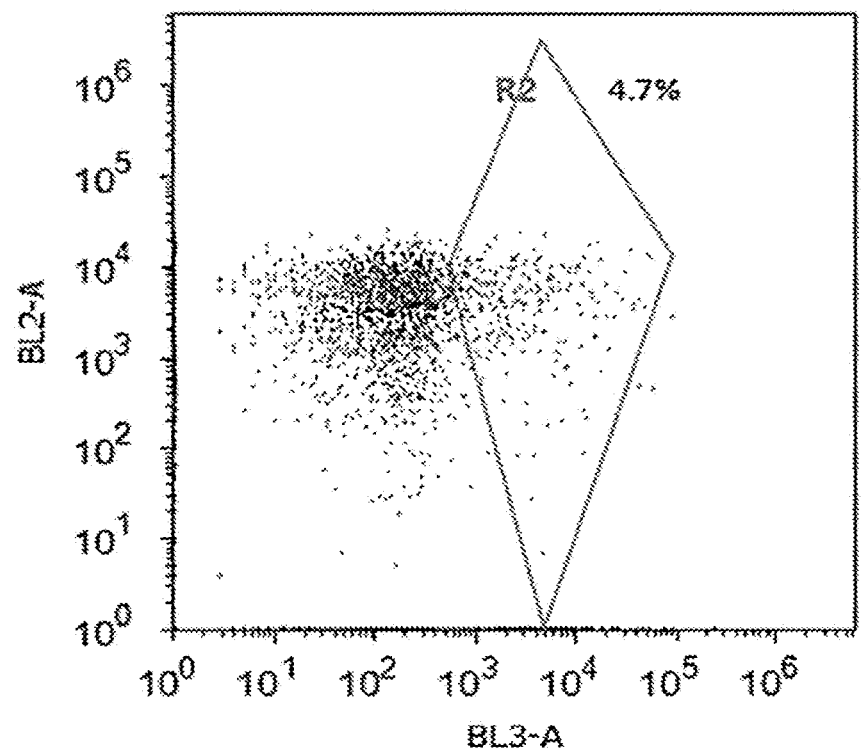
Figure 8A:
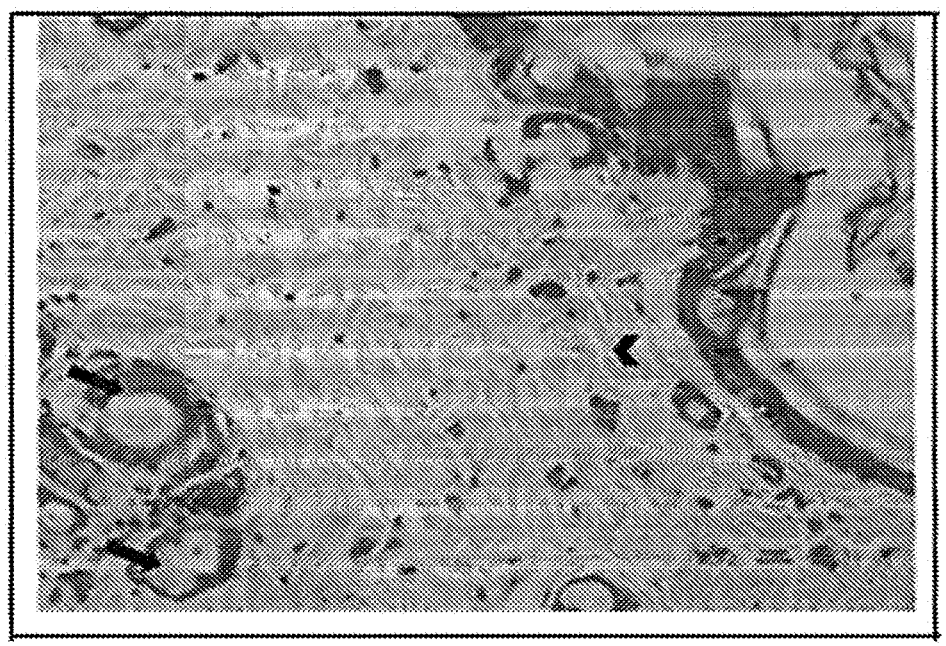
FIGS. 8A-F show the histopathology results from in vivo rat experiments.
Figure 8B:
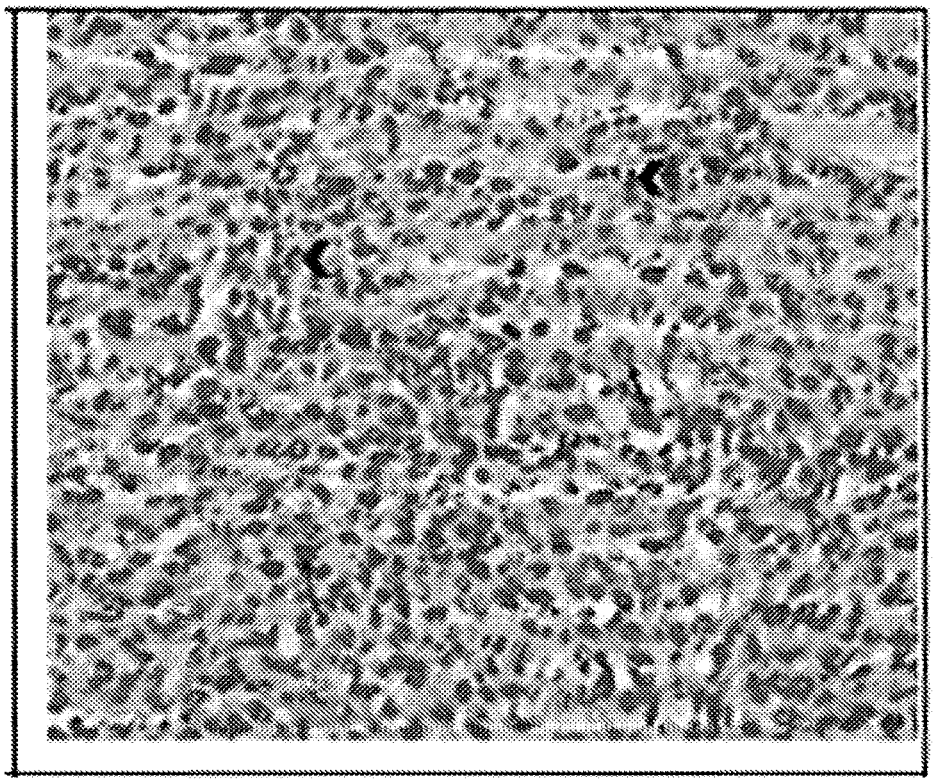
Figure 8C:
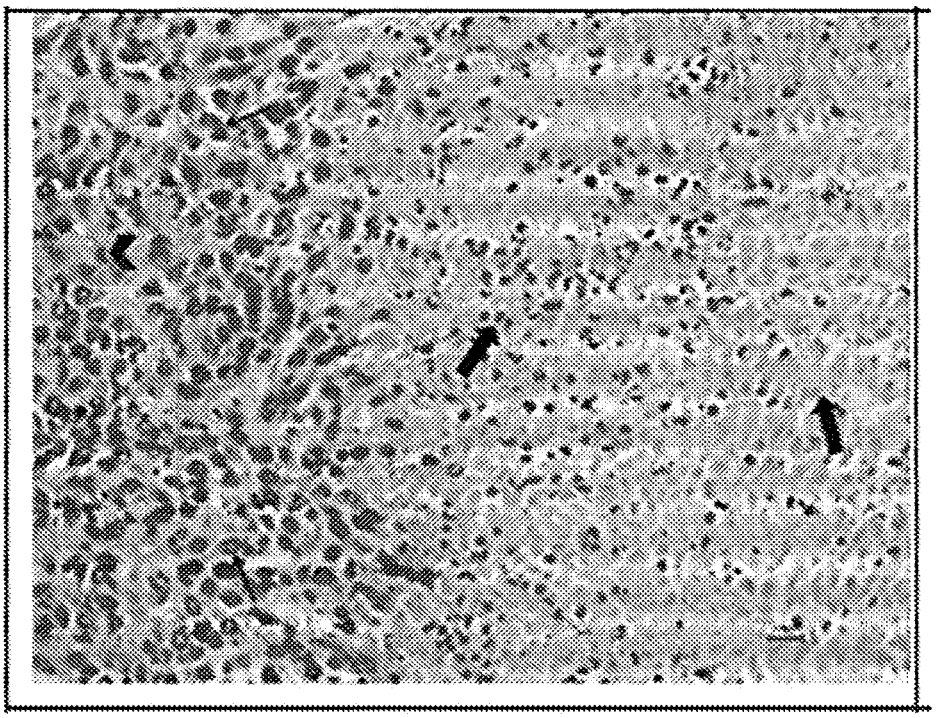
Figure 8D:
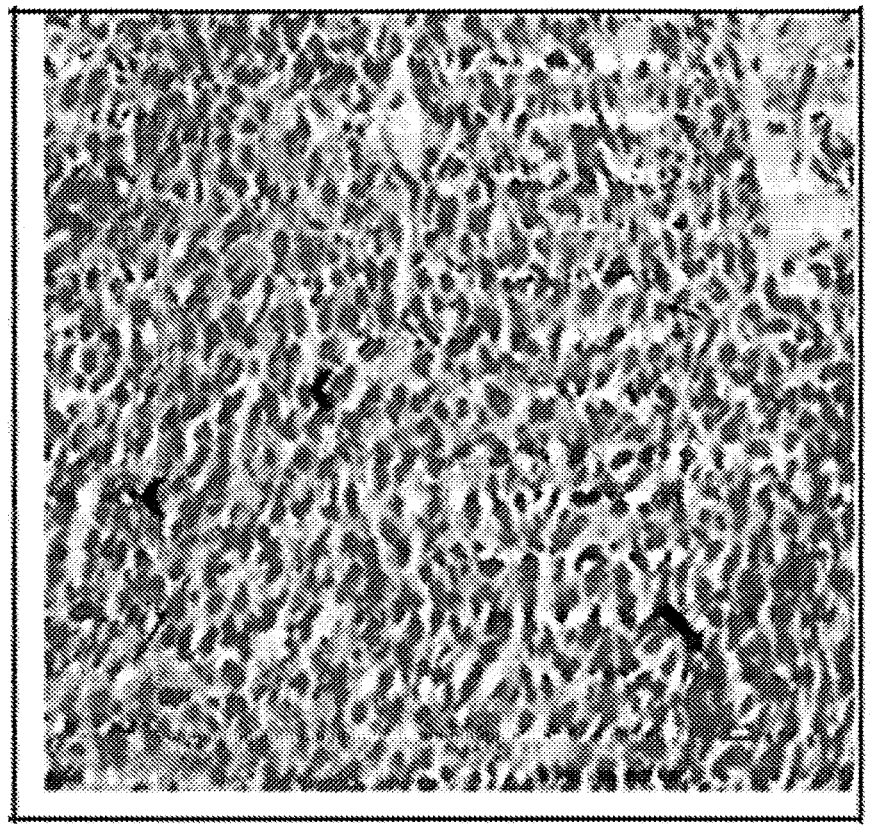
Figure 8E:
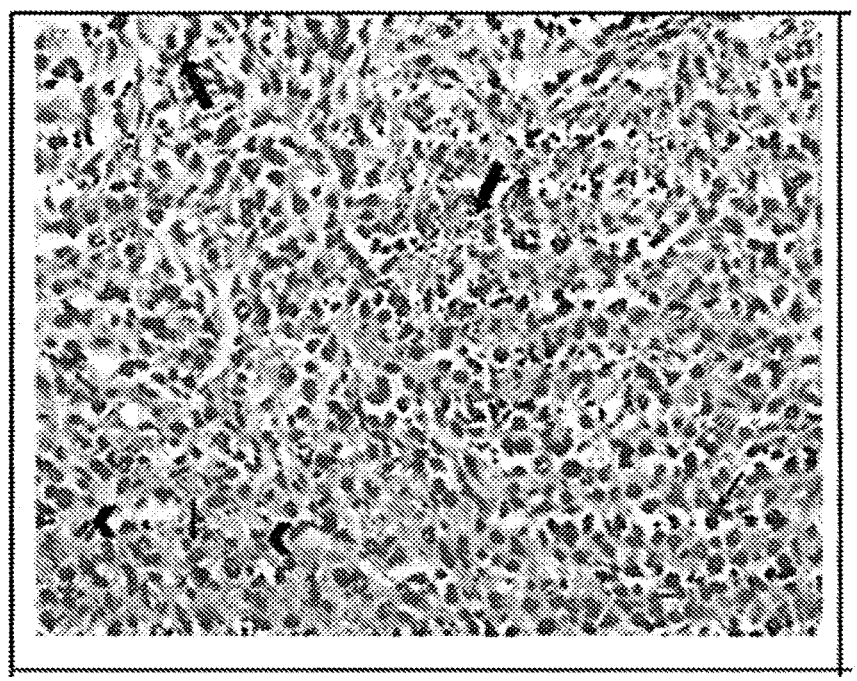
Figure 8F:
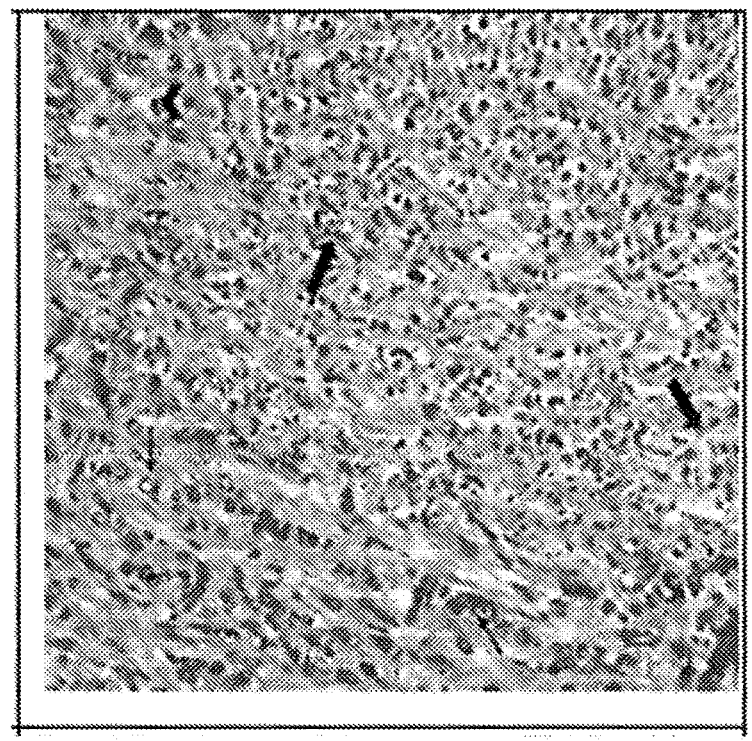

The spiked whole blood sample was diluted (Column E and F; FIGS. 7E-F) and treated as in Column D. Percentage of cell population (5.79% to 4.7%) in Column E (FIG. 7E) and F (FIG. 7F) represents the separation of cells with BMND from low density of cancer cells in the population of blood cells.

Conclusion: The biocompatible magnetizable nanodiscs (BMND) were capable of attaching to the blood cancer cells in a population of normal blood cells (lymphocytes). Based on the fluorescence tagged secondary antibodies, blood cancer cells separated from other cells. (FIGS. 7D-F). When exposed to external magnetic field, the BMND induces apoptosis (cell death) in cancer cells. (FIG. 7C).

Example 5: Evaluation of BMND In Vivo

To test in vivo efficacy of biocompatible, magnetizeable nanodiscs, the BMND were produced as described, specifically iron oxide nanodiscs conjugated to anti-HL-60 antibody. The acute toxic effect of BMND-conjugated to antibody in WISTAR ALBINO FEMALE RAT were determined as per the OECD guideline 423, where the limit test dose of 2000 µg/kg was used. No treatment related toxic symptom or mortality were observed after oral administration of the FEAB at a dose of 1000 and 2000 µg/kg. The general behavioral of the treated animals and control group was observed normal. Therefore, the formulations seems to be safe at a dose level of 2000 µg/kg.

The parameters observed for acute toxicity study are presented in Table 3 below.

TABLE 3

Acute Toxicity Parameters

| SR. NO. | PARAMETERS | OBSERVATIONS |
|---|---|---|
| 1 | Body position | Normal |
| 2 | Locomotion | Normal |
| 3 | Rearing | Normal |
| 4 | Respiration | Normal |
| 5 | Righting reflex | Normal |
| 6 | Lacrimation | Normal |
| 7 | Alertness, reactivity to touch stimuli | Normal |

For the evaluation of anticancer activity, Paclitaxel was used as standard drug at a dose of 0.2 mg/kg orally. Whereas the dose of test samples was taken as per acute toxicity study.

Efficacy studies of BMND were conducted in a rat model. Rats were injected with HL60 cells and estradiol to induce the generation of tumors on various organs. This is a well-established rat model of human tumors. The positive control comprised six healthy rats with no tumor induction and no drug treatment. The negative control comprised six tumor bearing rats with no drug treatment. The test groups included six rats in each group, all induced for tumors, and treated with either paclitaxel (gold standard chemotherapeutic; 40 mg/KG body weight), anti-HL60-BMND at 100 µg/kG body weight, or anti-HL60-BMND at 200 µg/KG body weight.

Procedure: Rats were inoculated with estradiol-17ß (1.7 mg/pellet) before an injection of $1 \times 10^7$ HL60 cells intravenously into tail vein. If tumor observed at various organs, the tumor size could be measured in three dimensions with calipers every 2 days starting at day 7. If tumor was not observed/not palpable, then tumor induction was confirmed by histopathology. Rats were observed for any change in behavior, appearance or weight. After confirmation of tumor induction by histopathology, treatment was started.

The rat test groups are described as in Table 4.

TABLE 4

Test Groups

| Gr I | Gr II | Gr III | Gr IV | Gr V |
|---|---|---|---|---|
| POSITIVE CONTROL | NEGATIVE CONTROL | STD | FEAB | FEAB |
| 6 F/M Rats Healthy Without Tumor | 6 F/M Rats Tumor Bearing | 6 F/M Rats Tumor Bearing | 6 F/M Rats Tumor Bearing | 6 F/M Rats Tumor Bearing |
| Untreated with any Drug | No Treatment | Paclitaxel 40 mg/kg Body Weight | 100 ug/kg Body Weight | FEAB 200 ug/kg Body Weight |

The dosing schedule was as provided in table 5.

TABLE 5

Dosing Interval

| Dose no. | Dosing interval |
|---|---|
| 1 | 0 |
| 2 | After 24 hrs |
| 3 | After 48 hrs |
| 4 | After 72 hrs |
| 5 | After 96 hrs |
| 6 | After 144 hrs |

The rats were exposed to magnetic field according to the following protocol. Rats strapped to the VFVF magnetizer as described above. The device was switched on to apply magnetic force of known intensity, frequency and duration to cause "flip/flop" action in the biocompatible magnetic nanodiscs. This application of oscillating field force is expected to cause the Nanomagnetic particles bound to the cell to "flip/flop." This action is expected to damage the cell wall leading to apoptosis. The following parameters were recorded: Treatment Time—60 minutes; Magnetic field intensity—90 G (Gauss); Frequency—20 Hz. Waveform—sinusoidal Confirmation of tumor was assessed as follows: Formalin fixed tissue of tumor area samples from various organs were received. These tissues were trimmed and processed routinely. Paraffin wax embedded tissue blocks were sections at 3-4 µm thickness with the Rotary Microtome. All the prepared slides were stained with Hematoxylin & Eosin (H & E) stain. These slides were examined under microscope by Pathologist to note histopathological lesions, if any. Wherever applicable, severity of the observed lesions were recorded as No abnormality detected, Minimal (<1%), Mild (1-25%), Moderate (26-50%), Marked/Moderately Severe (51-75%), Severe (76-100%) and distribution was recorded as focal, multifocal and diffuse.

The results are shown in FIG. 8. FIG. 8A is a representative tumor histogram from the positive control group showing normal histology, epidermis (small arrow), dermis (arrow head), hair follicles and sebaceous gland (large arrow) Hematoxylin and eosin-stained 400×. FIG. 8B is a representative tumor histogram from the negative control group showing neoplastic cells (small arrow) with stromal reaction, mitotic figures (arrow head) Hematoxylin and eosin-stained 400×. FIG. 8C is a representative tumor histogram from the paclitaxel treated group showing neoplastic cells (small arrow) with stromal reaction, mitotic figures (arrow head), inflammation and necrosis (large arrow) Hematoxylin and eosin-stained 400×. FIG. 8D is a representative tumor histogram from the test group treated with 100 µg/kg body weigh of biocompatible magnetizeable nanodiscs conjugated to antibody that recognizes the tumor; results show neoplastic cells (small arrow) with stromal reaction, mitotic figures (arrow head), necrosis (large arrow) Hematoxylin and eosin-stained 400×. FIG. 8E is a representative tumor histogram from the test group treated with 200 µg/kg body weigh of biocompatible magnetizeable nanodiscs conjugated to antibody that recognizes the tumor; neoplastic cells (small arrow) with stromal reaction, mitotic figures (arrow head), inflammation and necrosis (large arrow) Hematoxylin and eosin-stained 400× FIG. 8F is a representative tumor histogram from the test group treated with 100 µg/kg body weigh of biocompatible magnetizeable nanodiscs conjugated to antibody that recognizes the tumor.

Cancer cell count in blood was ascertained for the treatment groups. Results are shown in Table 6.

TABLE 6

Cancer cell count in blood.

| Treatment group | Viable cancer cells present per ml of blood | | Apoptotic cancer cells present per ml in the blood | |
|---|---|---|---|---|
| | Before treatment | After treatment 144 hrs | Before treatment | After treatment 144 hrs |
| PC | 00 | 00 | 00 | 00 |
| NC | $16 \times 10^3$ | $17.1 \times 10^3$ | 700 | 955 |
| FEAB 100 | $15.7 \times 10^3$ | $3.8 \times 10^3$ | 641 | $2.04 \times 10^3$ |
| FEAB 200 | $16.3 \times 10^3$ | $4.3 \times 10^3$ | 1201 | $5.3 \times 10^3$ |
| STD | $16.08 \times 10^3$ | $5.47 \times 10^3$ | 852 | $5.20 \times 10^3$ |

When comparing the number of leukemia cells present in a ml of blood before and after treatment, one can see that the BMNDs (FEAB 100 and FEAB 200) performed as well as the treatment standard paclitaxel (STD). When comparing the number of apoptotic cancer cells present in a ml of blood before and after treatment, one can see that the BMNDs (FEAB 100 and FEAB 200) performed as well as the treatment standard paclitaxel (STD) in causing cancer cell death.

The results demonstrated that the anti-cancer BMND were highly effective at clearing cancer cells compared to controls and at least as effective as the gold standard, paclitaxel. Paclitaxel is a highly effective anti-cancer chemotherapy with serious, toxic side effects. The data provides support that BMND is a promising anti-cancer therapeutic that is efficacious but without toxic side effects.

Example 6: Protocols

FL Microscopy: First, 1000 microliters of the HL60 cells [approximately 100 cells/10 µl (V. low cell density)] were centrifuged and fresh medium without serum added before the addition of Ab. Then, 2 microliters of anti-HL60ab-IONP was added to the wells: (1 microliter per 500 microliters of medium) and incubated for 30 minutes at room temperature. One thousand microliters (1000 µl) of fresh medium was used for gentle washing of cells. Secondary FL-antibody at 1:500 dilution added to the wells and incubated for 30 minutes at room temperature. Washed two times with medium without serum. Observed under fluorescence microscope.

Prussian blue staining of the IO-Ab captured HL60 cells: modified from [15]. To determine tagging of the HL60 with the IO-Ab, potassium ferrocyanide and HCl staining was used. Approximately 1×10³ cells were seeded in each well of a 6-well cell culture plate on the day before Prussian blue staining. The IO-Ab nanoparticles in the binding buffer (20 mM Tris, 150 mM NaCl, 2 mM CaCl$_2$), 1 mM MnCl$_2$, 1 mM MgCl$_2$, 0.1% (wt/vol) BSA; pH 7.4) was added. The wells were incubated at room temperature for 1 h with gentle shaking. The cells were washed three times with DPBS buffer. Subsequently, the cells were incubated with Prussian blue staining solution (equal volumes of 20% hydrochloric acid and 10% potassium ferrocyanide aqueous solution) for 30 min at room temperature. The cells were washed twice with DPBS buffer (Himedia India) and then placed under the microscope for inspection.

Example 7: Hemofiltration

Figure 9:
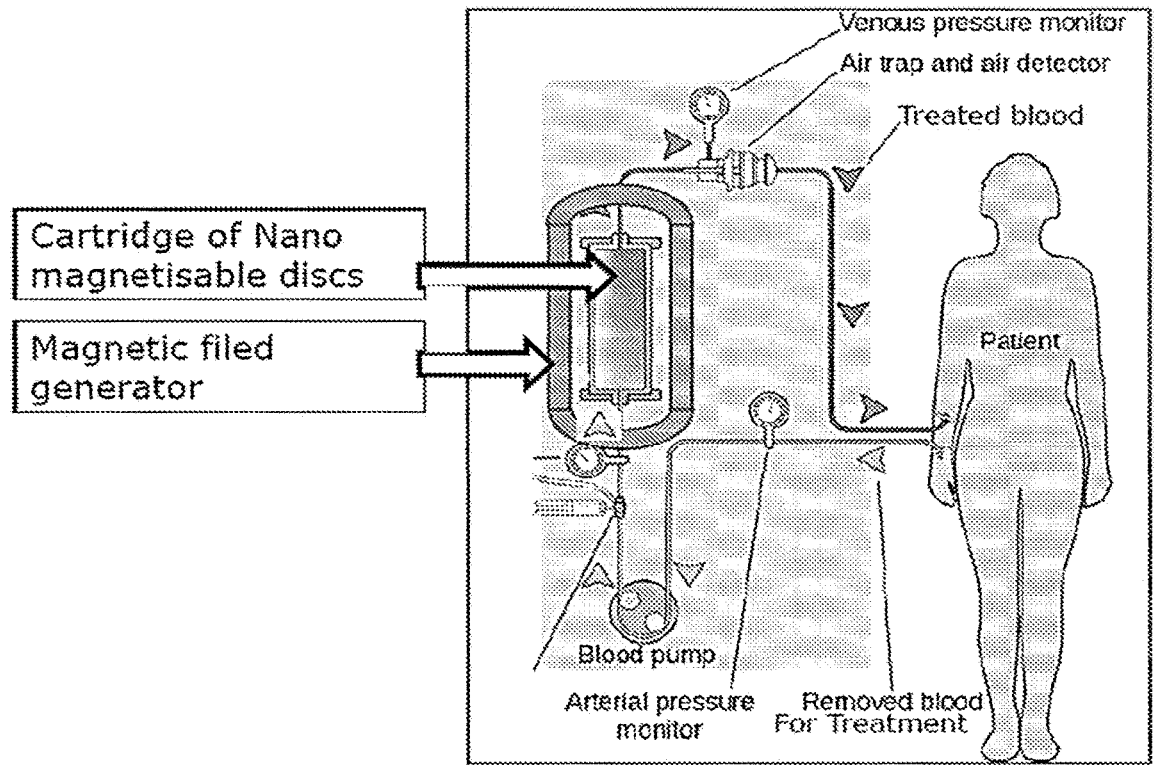
FIG. 9 is a pictorial of the hemofiltration concept for treating a blood cancer or pathogen using a device as described herein.

FIG. 9 shows a concept diagram of the basic components of a hemofiltration method and device as described herein. Blood from a subject with a blood cancer or pathogen is drawn out using a blood pump. The cancerous or infected blood is passed through a cartridge containing magnetizeable nanodiscs as described herein or a matrix comprising the magnetizeable nanodiscs. Blood is allowed to stay for a duration sufficient to allow magnetizeable nanodiscs to bind with target cells (cancer cells or pathogen). External magnetic field is applied to pull these cells out of blood toward the cartridge wall. The target cells bound to the nanodiscs are scavenged using moving magnetic field and deposited in apoptosis chamber. These nanodiscs-target cell conjugates are subjected to low intensity low frequency magnetic field for a short duration to break the cells. Blood that is substantially free of target cells is returned to the subject.

In an alternative method, the subject is injected or infused with compositions as described herein, namely magnetizeable nanodiscs conjugated to a target-binding moiety. Blood from a subject with a blood cancer or pathogen is drawn out using a blood pump. The cancerous or infected blood is passed through a chamber where an external magnetic field is applied to pull these cells out of blood toward the cartridge wall. The target cells bound to the nanodiscs are scavenged using moving magnetic field and deposited in apoptosis chamber. These nanodiscs-target cell conjugates are subjected to low intensity low frequency magnetic field for a short duration to break the cells. Blood that is substantially free of target cells is returned to the subject.

REFERENCES

1. Sambrook, et al., Molecular Cloning: A Laboratory Manual (3rd Edition, 2001)
2. Sambrook, et al., Molecular Cloning: A Laboratory Manual (2nd Edition, 1989)
3. Maniatis et al., Molecular Cloning: A Laboratory Manual (1982); Ausubel et al.
4. Current Protocols in Molecular Biology (John Wiley and Sons, updated July 2008),
5. Short Protocols in Molecular Biology: A Compendium of Methods from Current Protocols in Molecular Biology, Greene Pub. Associates and Wiley-Interscience
6. Glover, DNA Cloning: A Practical Approach, vol: I & II (IRL Press, Oxford, 1985)
7. Anand, Techniques for the Analysis of Complex Genomes, (Academic Press, New York, 1992)
8. Transcription and Translation (B. Hames & S. Higgins, Eds., 1984)
9. Perbal, A Practical Guide to Molecular Cloning (1984)
10. Harlow and Lane, Antibodies, (Cold Spring Harbor Laboratory Press, Cold Spring Harbor, N. Y., 1998)
11. Lieberman, Pharmaceutical Dosage Forms (vols. 1-3, 1992).
12. Lloyd, The Art, Science and Technology of Pharmaceutical Compounding (1999).
13. Pickar, Dosage Calculations (1999).
14. Remington: The Science and Practice of Pharmacy, 20th Edition, 2003, Gennaro, Ed., Lippincott, Williams & Wilkins.
15. Biomaterials. 2011 December; 32 (36): 9758-9765.

P-EMOBODIMENTS

Embodiment P-1. A composition comprising a biodegradable magnetic particle wherein the particle is disc shaped, has a diameter of about 30 to about 150 nanometers, comprises ferric oxide, and is conjugated to a target-binding agent.

Embodiment P-2. The composition of Embodiment P-1, wherein the particle has a diameter of about 40 to about 70 nanometers.

Embodiment P-3. The composition of c Embodiment P-1, wherein the particle oscillates when exposed to a magnetic field.

Embodiment P-4. The composition of Embodiment P-1, wherein the target is a cancer cell.

Embodiment P-5. The composition of Embodiment P-4, wherein the cancer cell is selected from brain cancer, glioma, glioblastoma, neuroblastoma, prostate cancer, colorectal cancer, pancreatic cancer, Medulloblastoma, melanoma, cervical cancer, gastric cancer, ovarian cancer, lung cancer, cancer of the head, cancer of the thyroid, endocrine system, breast, cervix, head & neck, liver, kidney, lung, ovary, rectum, stomach, uterus, leukemia, and lymphoma.

Embodiment P-6. The composition of Embodiment P-1, wherein the target is a fat cell.

Embodiment P-7. The composition of Embodiment P-1, wherein the target is an atherosclerotic plaque.

Embodiment P-8. A method of treating a subject with a disease condition, the method comprising: (i) administering to a subject an effective amount of a composition comprising a biodegradable magnetic nanoparticle, wherein the nanoparticle has a diameter of about 30 to about 150 nanometers, comprises ferric oxide, and is conjugated to a target-binding agent that binds a target, wherein the target is the causative agent of the disease condition; and (ii) exposing the subject to a variable field variable frequency (VFVF) magnetic field for a time period sufficient to allow the magnetic discs to oscillate and rupture the target.

Embodiment P-9. A cancer cell affinity hemofiltration cartridge, comprising a filtration chamber configured to receive blood or plasma comprising cancer cells and a matrix comprising antibody-conjugated biodegradable magnetic nanoparticle disposed within said filtration chamber.

Embodiment P-10. The cancer cell affinity hemofiltration cartridge of Embodiment P-9, wherein the cartridge is configured to remove greater than about 50% of cancer cells present in the blood or plasma.

Embodiment P-11. The cancer cell affinity hemofiltration cartridge of Embodiment P-9, wherein the cartridge is configured to remove greater than about 90% of cancer cells in the blood or plasma.

Embodiment P-12. A method of treating a subject with a blood cancer, the method comprising: (i) administering ex vivo hemofiltration to said subject wherein blood is removed from the subject and filtered through a cancer cell affinity hemofiltration cartridge, the cancer cell affinity hemofiltration cartridge comprising (1) a filtration chamber configured to receive blood or plasma comprising cancer cells, and (2) a matrix comprising antibody-conjugated biodegradable magnetic nanoparticles disposed within said filtration chamber; (ii) incubating the blood or plasma with the matrix for a sufficient time to allow binding of the antibody-conjugated magnetic nanoparticles to the cancer cells; (iii) exposing the hemodialysis cartridge with the blood to a variable field variable frequency magnetic field for a time period sufficient to allow the magnetic nanoparticles to oscillate and rupture the target cancer cells; and (ii) returning blood to said subject, wherein the blood is at least 80% free of cancer cells.

Embodiment P-13. A method of manufacturing a biodegradable magnetic, antibody labelled nanoparticle, the method comprising: (i) combining iron oxide powder with water, casein, and buffer until an immiscible solution of 5% $Fe_2O_3$ is formed; (ii) adjusting pH to about 10; (iii) adding a target-binding agent; and (iv) spray drying the mixture to form nanoparticles with a diameter of about 40 to about 70 nanometers.

What is claimed is:

1. A method of treating a subject with a disease condition, the method comprising:
   (i) administering to the subject an effective amount of a composition comprising a magnetizeable nanoparticle, wherein the nanoparticle is disc shaped, has a length from end to end of about 20 to about 150 nanometers, comprises iron oxide and a biocompatible agent, and is conjugated to a target-binding moiety capable of binding a target cell; and
   (ii) exposing the subject to an energy source, wherein the energy source is a magnetic field and comprising a variable force variable frequency (VFVF) field of about 1 to about 500 Hz for a time period sufficient to allow the nanoparticle to oscillate, wherein oscillation of the nanoparticle causes disruption, apoptosis, and/or ablation of the target cell.

2. The method of claim 1, wherein the nanoparticle has a length from end to end of about 40 to about 70 nanometers.

3. The method of claim 1, wherein the biocompatible agent is selected from casein and bovine serum albumin.

4. The method of claim 1, wherein the target-binding moiety is an antibody.

5. The method of claim 1, wherein the target-binding moiety is an aptamer.

6. The method of claim 1, wherein the target cell is a cancer cell.

7. The method of claim 6, wherein the cancer cell is selected from brain cancer, glioma, glioblastoma, neuroblastoma, prostate cancer, colorectal cancer, pancreatic cancer, Medulloblastoma, melanoma, cervical cancer, gastric cancer, ovarian cancer, lung cancer, cancer of the head, cancer of the thyroid, endocrine system, breast, cervix, head & neck, liver, kidney, lung, ovary, rectum, stomach, uterus, leukemia, and lymphoma.

8. The method of claim 7, wherein the cancer cell is a leukemia cell.

9. The method of claim 7, wherein the cancer cell is a lymphoma cell.

10. The method of claim 1, wherein the target cell is an adipocyte.

11. The method of claim 1, wherein the target-binding moiety is capable of binding an atherosclerotic plaque or fragment thereof.

12. The method of claim 1, wherein the VFVF field comprises a frequency of about 20 to about 80 Hz.

13. The method of claim 1, wherein the VFVF is applied from a source external to the body of the subject.

14. The method of claim 1, wherein the magnetizable nanoparticle is biodegradable.

* * * * *